US010767708B1

(12) United States Patent
Logan et al.

(10) Patent No.: US 10,767,708 B1
(45) Date of Patent: Sep. 8, 2020

(54) CLUTCH ASSEMBLY AND SYSTEM

(71) Applicant: Logan Clutch Corporation, Cleveland, OH (US)

(72) Inventors: W. Andrew Logan, Lakewood, OH (US); Scott W. Stevens, Columbia Station, OH (US); Robert P McClain, Westlake, OH (US); Stefan Vinca, Westlake, OH (US); Michael S. Vining, Westlake, OH (US)

(73) Assignee: LOGAN CLUTCH CORPORATION, Westlake, OH (US)

( * ) Notice: Subject to any disclaimer, the term of this patent is extended or adjusted under 35 U.S.C. 154(b) by 101 days.

(21) Appl. No.: 16/148,228

(22) Filed: Oct. 1, 2018

Related U.S. Application Data

(63) Continuation-in-part of application No. 15/424,974, filed on Feb. 6, 2017, now Pat. No. 10,190,644, which is a continuation-in-part of application No. 14/731,517, filed on Jun. 5, 2015, now Pat. No. 9,841,067.

(60) Provisional application No. 62/680,684, filed on Jun. 5, 2018, provisional application No. 62/295,735, filed on Feb. 16, 2016, provisional application No. 62/008,621, filed on Jun. 6, 2014.

(51) Int. Cl.
*F16D 48/02* (2006.01)
*F16D 25/0638* (2006.01)
*B63H 23/30* (2006.01)

(52) U.S. Cl.
CPC ......... *F16D 25/0638* (2013.01); *B63H 23/30* (2013.01); *F16D 25/14* (2013.01); *F16D 2300/10* (2013.01); *F16D 2300/14* (2013.01); *F16D 2500/1045* (2013.01); *F16D 2500/30408* (2013.01); *F16D 2500/30415* (2013.01); *F16D 2500/30426* (2013.01)

(58) Field of Classification Search
CPC ................ F16D 25/0638; F16D 25/14; F16D 2500/1045; F16D 2300/14; F16D 2500/30415; F16D 2300/10; F16D 2500/30426; F16D 2500/30408; B63H 23/30
See application file for complete search history.

(56) References Cited

U.S. PATENT DOCUMENTS

| | | | | |
|---|---|---|---|---|
| 8,727,093 | B2* | 5/2014 | Maerkl | F16H 61/688 192/70.12 |
| 2002/0119865 | A1* | 8/2002 | Fukumoto | F16D 48/066 477/174 |
| 2004/0159523 | A1* | 8/2004 | Duan | F16D 25/123 192/70.12 |
| 2008/0236978 | A1* | 10/2008 | Kummer | F16D 25/0638 192/48.1 |

(Continued)

*Primary Examiner* — David J Hlavka
(74) *Attorney, Agent, or Firm* — Ralph E. Jocke; Walker & Jocke

(57) ABSTRACT

Power transmission systems including clutch arrangement and control systems are adapted to be used in numerous different operational environments. Such power transmission systems may include clutch arrangements that provide more effective power transmission capabilities as well as greater durability and longer life. Control arrangements are provided to more effectively control and monitor clutch operation in ways that provide for greater system flexibility and drive options.

29 Claims, 38 Drawing Sheets

(56) References Cited

U.S. PATENT DOCUMENTS

2009/0288927 A1\* 11/2009 Dougan .............. F16D 25/0638
192/52.1

\* cited by examiner

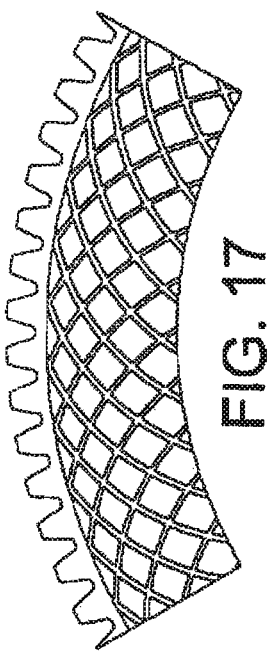
FIG. 17 DIFFERENTIAL (SUNBURST) GROOVING
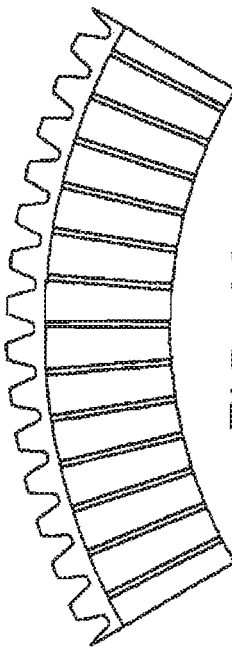
FIG. 18 RADIAL GROOVING
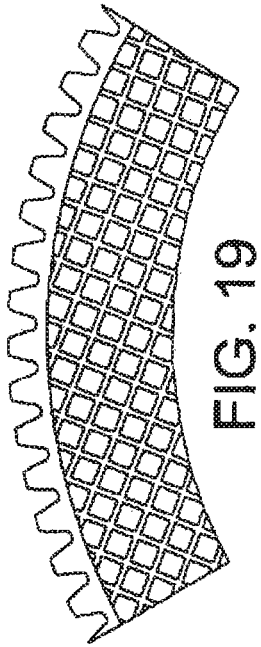
FIG. 19 WAFFLE GROOVING
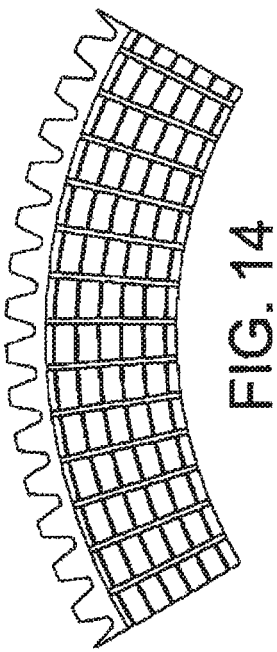
FIG. 14 SPIRADIAL GROOVING
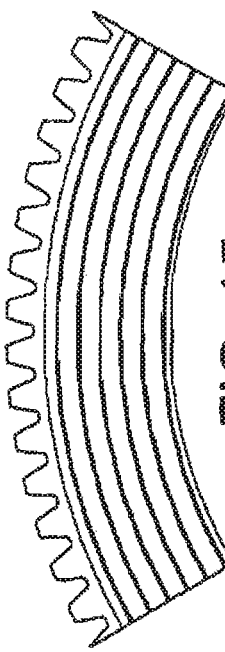
FIG. 15 SPIRAL GROOVING
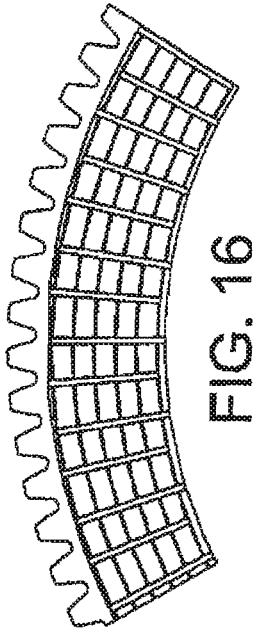
FIG. 16 ISOS (INSIDE-OUTSIDE SPIRAL) GROOVING

CLUTCH ASSEMBLY AND SYSTEM

TECHNICAL FIELD

This disclosure relates to mechanical power transmission systems. Exemplary embodiments particularly relate to clutch assemblies and systems in which clutch assemblies are used for selectively transmitting power.

BACKGROUND OF THE DISCLOSURE

Power transmission systems are used to selectively deliver rotational power from a driver device such as an internal combustion engine, electric motor or other source of rotational power, to a driven device. Driven devices may commonly include such things as pumps, electric generators, the tires of a vehicle or the propeller of a watercraft. Clutches are used to selectively operatively engage and disengage the driver from the driven device.

Mechanical clutches commonly operate to selectively engage and disengage the driver and driven devices by having a stack of adjacent clutch discs. The discs in the stack which is also referred to herein as a disc pack, are alternatively mechanically operatively engaged with driving and driven members. The axial force that acts between the discs can be selectively varied. When the clutch is not engaged, the discs that move with the driving member are sufficiently movable relative to the discs that are engaged with the driven member such that they can rotate relative thereto. To engage the clutch, the discs in the stack are axially compressed such that the discs connected to the driving member are in pressurized abutting engagement with the discs connected to the driven member. As a result, the driven member is caused to rotate with the driving member, and the driven device is engaged with the driver.

High friction material is often attached to the discs to provide enhanced frictional engagement when the clutch is engaged. Releasing the axial compression force causes the discs to again be able to rotate relative to one another and the clutch is disengaged. Springs or similar mechanisms can be positioned to act on the discs to facilitate the discs sufficiently separating to disengage the clutch when the axial compression force is released.

Mechanical clutches commonly experience certain types of issues which limit their capabilities and useful life. These include wearing of the clutch discs over time with repeated engagement and disengagement of the clutch. Other issues may include providing sufficient axial force to the discs in order to transmit the level of power needed to operate the driven device. Other issues include avoiding excessive heat which can shorten the life of clutch discs and also limit power transmission capabilities. Other issues include shock and jarring which can damage driven devices when clutches are rapidly engaged. Other issues include damage to clutch components when the clutch is operated in a slipping mode for an extended period of time. Additional problems and drawbacks can be encountered with mechanical clutches and systems depending upon the particular system in which a clutch is used.

Mechanical clutches and related systems may benefit from improvements.

OBJECTS OF EXEMPLARY EMBODIMENTS

It is an object of some exemplary embodiments to provide an improved mechanical clutch.

It is a further object of some exemplary embodiments to provide an improved mechanical clutch with greater power transmission capabilities.

It is a further object of some exemplary embodiments to provide an improved mechanical clutch with longer life.

It is a further object of some exemplary embodiments to provide an improved mechanical clutch for use in marine applications.

It is a further object of some exemplary embodiments to provide an improved mechanical clutch that is more economical to operate.

It is a further object of some exemplary embodiments to provide an improved mechanical clutch that is lighter in weight.

It is a further object of some exemplary embodiments to provide an improved mechanical clutch that provides for controlled engagement.

It is a further object of some exemplary embodiments to provide an improved mechanical clutch that can operate for extended periods in a slipping mode without adverse consequences.

It is a further object of some exemplary embodiments to provide an improved mechanical clutch that can be used in hybrid drive systems.

It is a further object of some exemplary embodiments to provide an improved mechanical clutch and system that can provide benefits in performance.

It is a further object of some exemplary embodiments to provide an improved mechanical clutch and system that can be more readily serviced.

It is a further object of some exemplary embodiments to provide methods of making improved mechanical clutches and systems.

It is a further object of some exemplary embodiments to provide a method for repairing mechanical clutches.

Further objects of exemplary embodiments will be made apparent in the following Detailed Description of Exemplary Embodiments and the appended claims.

The foregoing objects are accomplished by the exemplary embodiments employing the principles described herein.

BRIEF DESCRIPTION OF DRAWINGS

FIGS. 14-19 show alternative types of grooving in clutch discs which may be used with the clutch shown in FIG. 9.

DETAILED DESCRIPTION OF EXEMPLARY EMBODIMENTS

It will be readily understood that features of exemplary embodiments may be arranged and designed in a wide variety of different configurations. Thus the following detailed description of the exemplary apparatus and method embodiments is not intended to limit the scope of the claims appended hereto, but are merely representative of selected exemplary embodiments that implement the principles described herein.

The features, structures and/or characteristics described herein may be combined in any suitable manner in one or more embodiments or arrangements. That is, a particular feature, structure or characteristic described in connection with one embodiment may be included in other embodiments or arrangements.

Figure 1:
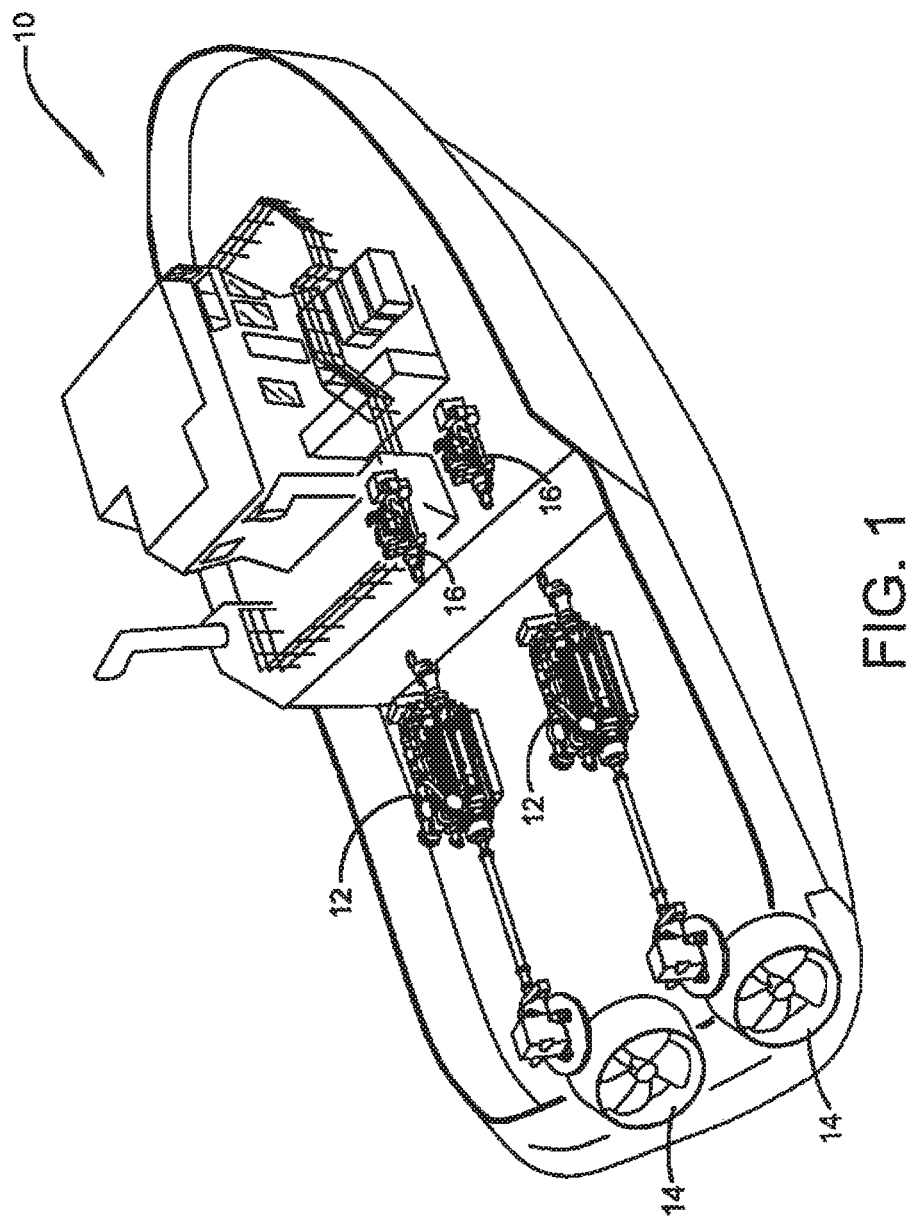
FIG. 1 is an isometric schematic view of a ship including clutch systems of some exemplary embodiments.

Referring now to the drawings and particularly to FIG. 1, there is shown therein an exemplary embodiment of a ship or other seagoing vessel generally indicated 10. The exemplary embodiment of the ship 10 as shown in this partially transparent view includes a pair of engines 12. Engines 12 drive respective azimuth thrusters 14. Thrusters 14 include propellers that are driven by the engines 12 to propel the ship 10.

The exemplary arrangement further includes a pair of electric generator sets 16. The generator sets include electrical generators powered by respective engines. The generator sets 16 are suitable for producing electricity used in the operation of the ship.

Figure 2:
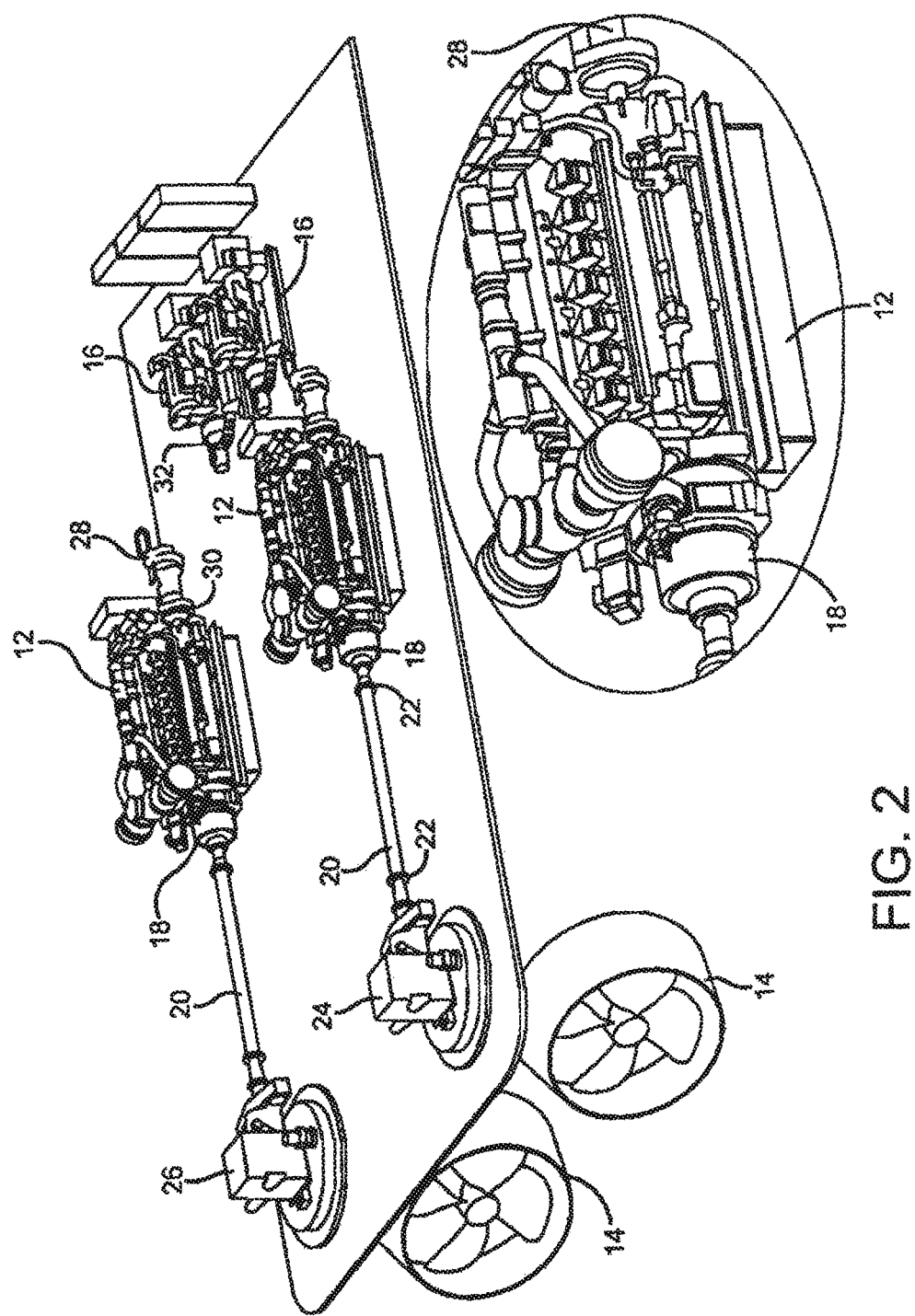
FIG. 2 is an isometric view including components of a drive system for a ship.

As shown in more detail in FIG. 2 engines 12 of the exemplary embodiment, each have attached thereto a mechanical clutch 18. Clutches 18 may be one of the types of clutches described herein. Each of the clutches is in operative connection with a drive shaft 20. Drive shaft 20 of the exemplary embodiment is a lightweight high strength shaft such as a carbon fiber shaft. Each shaft 20 is connected by couplings 22 to the clutch assembly 18 and the azimuth thrusters 14. Each of the azimuth thrusters is in connection with a gear box 24. Each gear box is in connection with a mechanical clutch 26.

In the exemplary arrangement each engine 12 has mounted on an end opposite to clutch 18, a firefighting pump 28. The firefighting pumps 28 are used to pump water such as may be used in a fire boat application to shoot water onto a fire. Each of the firefighting pumps 28 is driven through a respective clutch 30.

In the exemplary arrangement each of the generator sets 16 includes an engine such as a diesel engine which is connected to an electrical generator. The generator is operatively connected to the engine through clutches 32. It should be understood that in the exemplary embodiment each of the clutches may be selectively controlled to mechanically engage and disengage the driven device from the driver device. In some arrangements the clutches may be actuated by air. In such cases the clutches may be engaged and disengaged through the application of pneumatic pressure. Such pneumatic pressure may be applied and released through appropriate valves that change condition responsive to control circuitry. Alternatively in other arrangements the clutches may be engaged and disengaged via hydraulic pressure. Hydraulic pressure actuated clutches like those described hereafter are engaged and disengaged via the application and release of hydraulic pressure. The hydraulic pressure can be controlled through appropriate valves and circuitry. The particular type of clutch utilized depends on the particular application and the nature of the force and speed that need to be controlled. It should be understood that the clutches described herein are but examples of the numerous varieties of clutches that may be used in the applications discussed.

Figure 3:
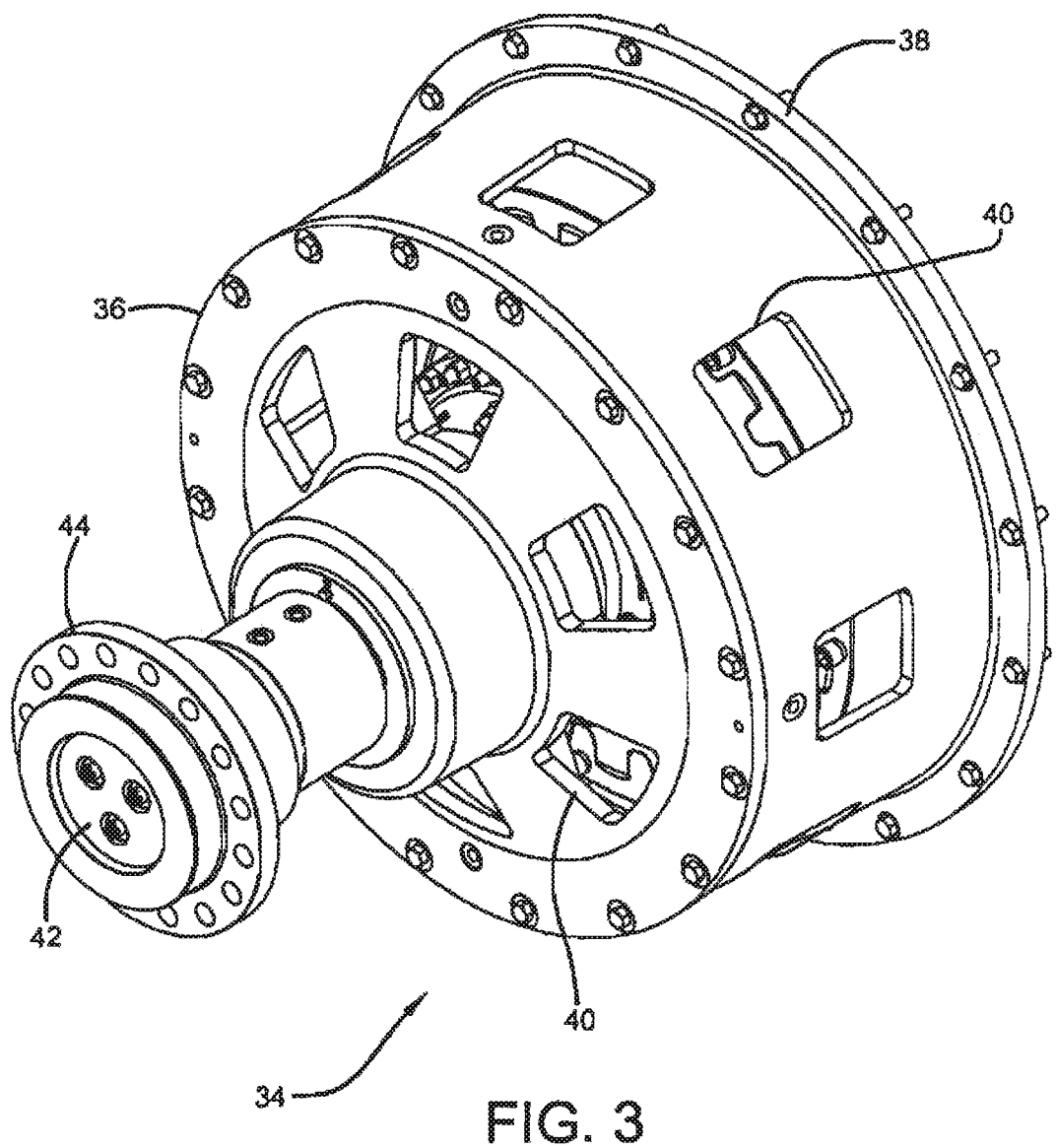
FIG. 3 is an isometric view of an exemplary clutch.

FIG. 3 shows an exemplary embodiment of a clutch 34. Clutch 34 is a hydraulic actuated clutch that may be used to selectively engage a driver such as an engine to a driven device such as a generator, propeller or a pump. The driven device generally constitutes a load that has an associated load force that must be overcome to be rotated by the driver device. The exemplary clutch 34 includes a housing 36.

Housing 36 includes a mounting flange portion 38. Flange portion 38 includes openings through which fasteners may be extended as shown, to attach the housing 36 to a bell housing or other structure associated with a driver. The exemplary housing 36 includes a plurality of openings 40. Openings 40 extend in the annular and radially extending sides of the housing to facilitate cooling of clutch components within the interior of the housing.

Figure 4:
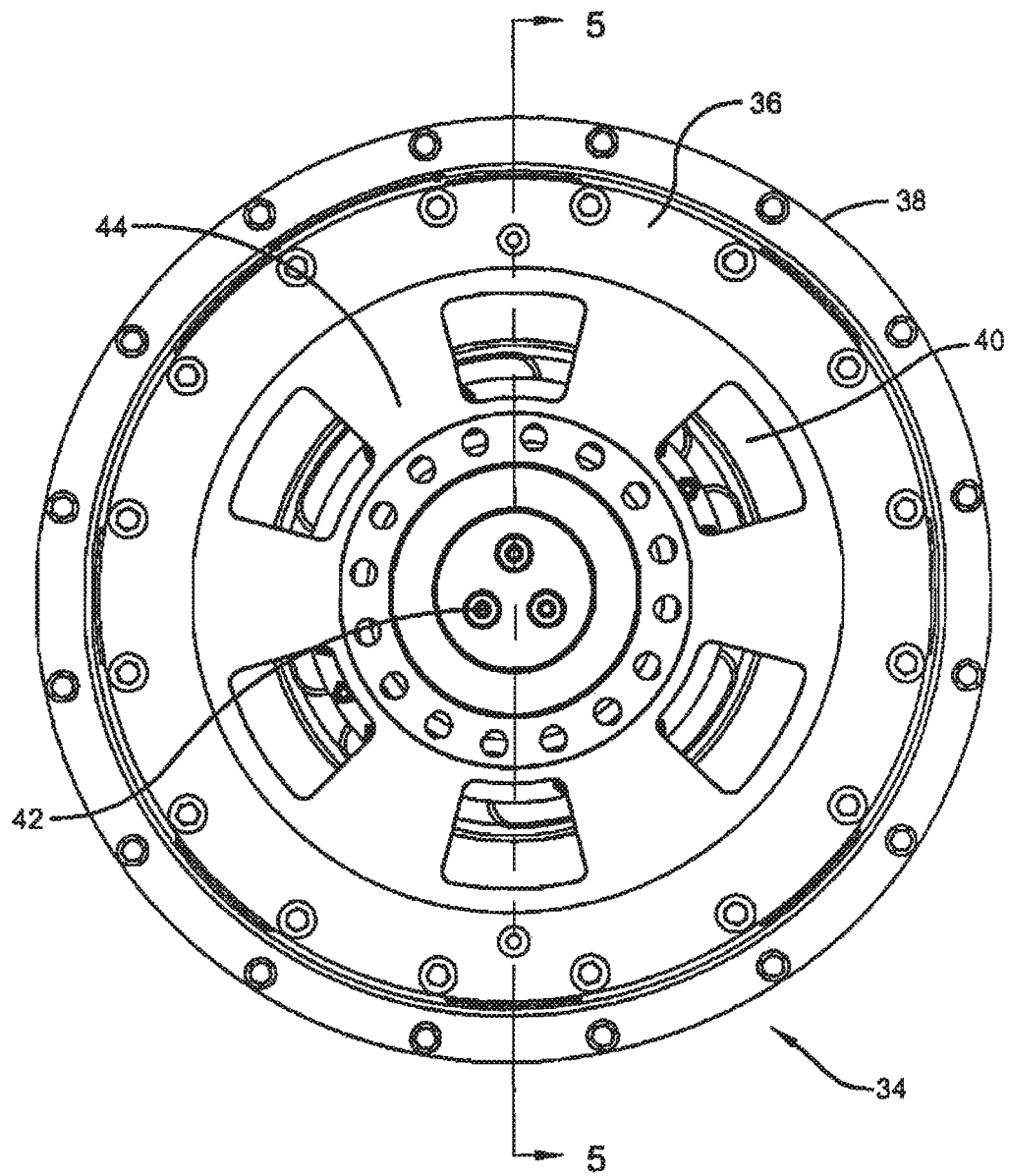
FIG. 4 is a rear view of the clutch shown in FIG. 3.

Clutch 34 includes a shaft 42 which has a coupling 44 thereon. Coupling 44 is mounted in fixed engagement with the shaft 42. As can be appreciated, FIGS. 3-5 only shows one half of the coupling arrangement which would couple the shaft 42 to a drive shaft or other suitable driven structure.

Figure 5:
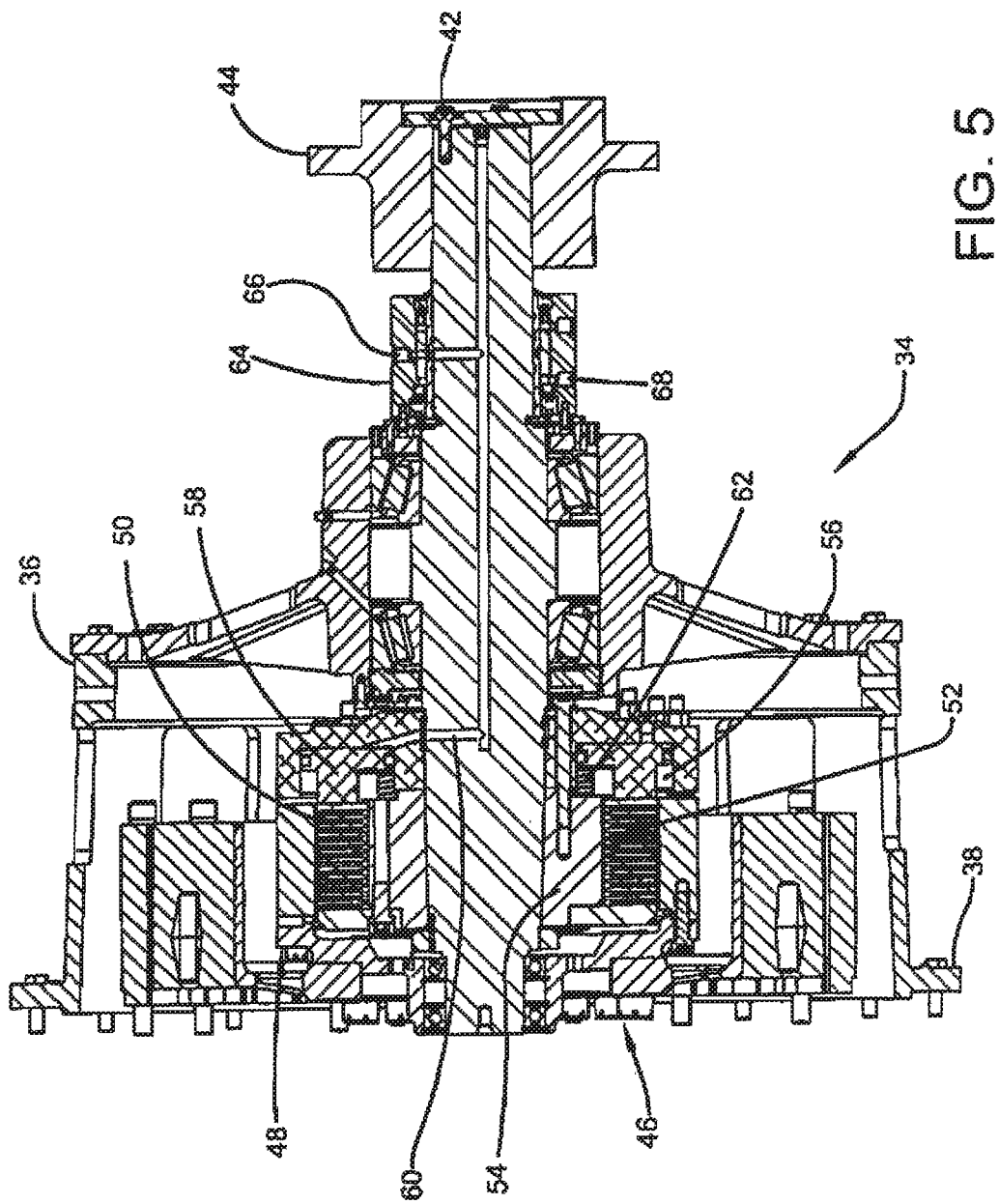
FIG. 5 is a cross-sectional view of the clutch taken along line 5-5 in FIG. 4.

As best shown in the cross-sectional view in FIG. 5, clutch 34 includes an input coupling 46. Coupling 46 couples to a flywheel of an engine or other member of a driver. In some embodiments the coupling 46 may be a vibration damping coupling of the types later discussed herein. Coupling 46 is in operative connection with a rotatable clutch disc housing 48. Clutch disc housing 48 is rotatable relative to the shaft 42 on bearings as shown.

A plurality of spaced clutch discs 50 are positioned in the clutch disc housing 48. In the exemplary embodiment the clutch discs have outer circumferential toothed edges that engage with correspondingly contoured grooves on the interior annular face of the disc housing 48. This arrangement enables the clutch discs 50 to move in the axial direction within the disc housing.

Intermediate of each adjacent pair of clutch discs within the disc housing is a separator disc 52. Each separator disc includes a toothed annular inside contour that engagingly conforms with a splined hub portion 54. Hub portion 54 is attached to the shaft and rotates therewith. The configuration of the splined hub and the toothed separator discs enables the separator discs to move in the axial direction on the splined hub.

In the exemplary embodiment the disc housing 48 includes therein a piston cavity 56. Cavity 56 is sized to enable axial movement of an annular piston 58 therein. Cavity 56 is operatively connected to a fluid passage 60. Hydraulic pressure applied to the fluid passage 60 causes the piston to move to the left as shown in FIG. 5. Movement of the piston to the left causes the clutch discs and separator discs to be axially compressed and moved relative to the disc housing and the hub portion. As the separator discs and clutch discs are axially compressed by the piston, the separator discs can no longer rotationally move relative to the clutch discs. This engages the clutch so that rotation of the coupling 46 causes the shaft 42 to rotate in coordination therewith.

As can be appreciated, relieving the hydraulic pressure from the cavity 56 causes the piston to no longer compress the discs and to retract to the right as shown in FIG. 5. The retraction of the piston is aided through the operation of springs 62. As the piston moves to the right, the force on the previously axially compressed friction discs and separator discs is relieved. This enables the friction discs and the separator discs to again rotationally move relative to one another. In such condition the clutch is disengaged. Of course it should be understood that this structure is exemplary and in other embodiments other approaches may be used.

As represented in FIG. 5, clutch 34 includes a clutch actuation fluid coupling 64. Clutch actuation fluid coupling 64 includes an opening 66 which is fluidly connected to a hydraulic fluid line through a suitable fitting. Opening 66 remains stationary relative to the rotating shaft. The exemplary clutch actuation coupling 64 further includes a pair of outlet ports 68. Outlet ports 68 provide a drain to allow hydraulic fluid that is used to lubricate the clutch actuation coupling to drain out of the coupling structure.

Figure 6:
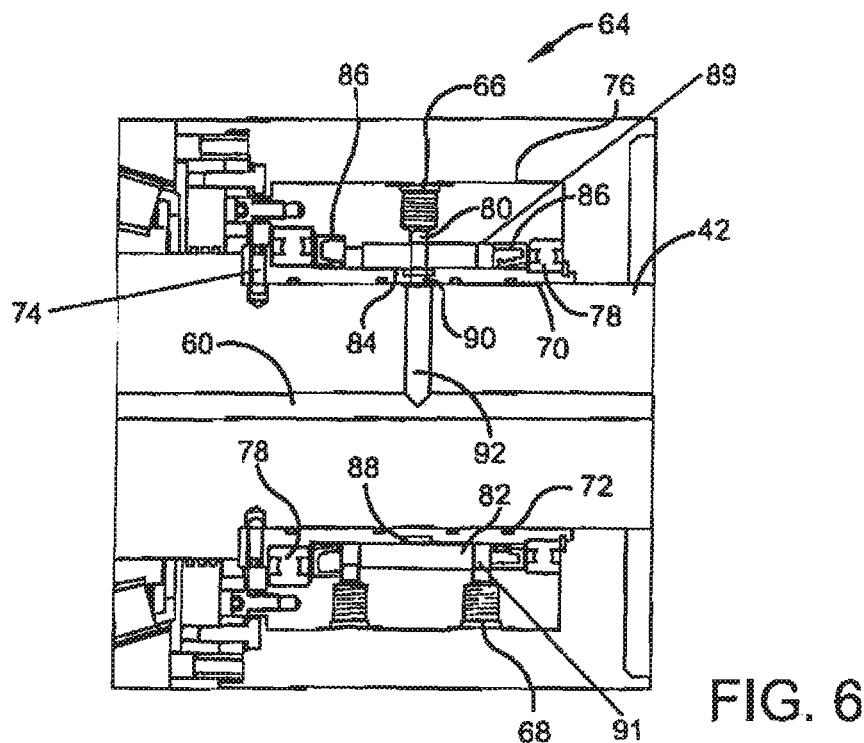
FIG. 6 is a partial cross-sectional view showing the rotational fluid coupling connection of the clutch shown in FIG. 5.
Figure 7:
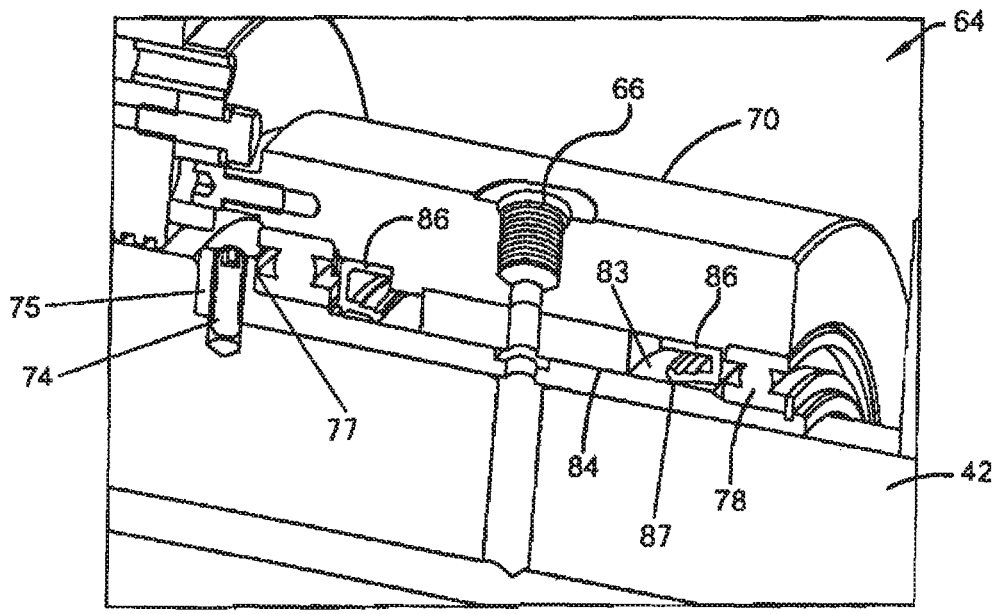
FIG. 7 is an enlarged cross-sectional view showing the actuation port of the fluid coupling shown in FIG. 6.
Figure 8:
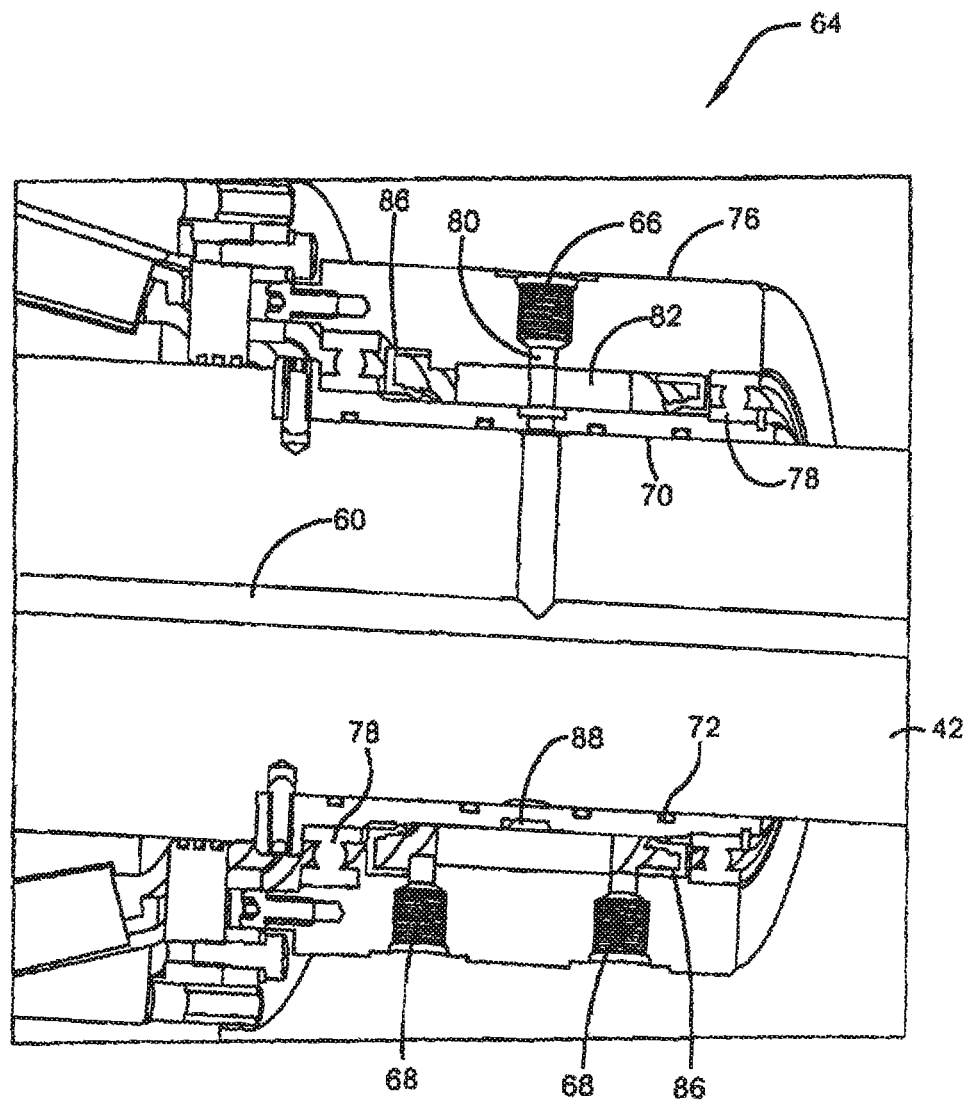
FIG. 8 is an enlarged cross-sectional view of the fluid coupling and flow passages of an exemplary arrangement.
Figure 9:
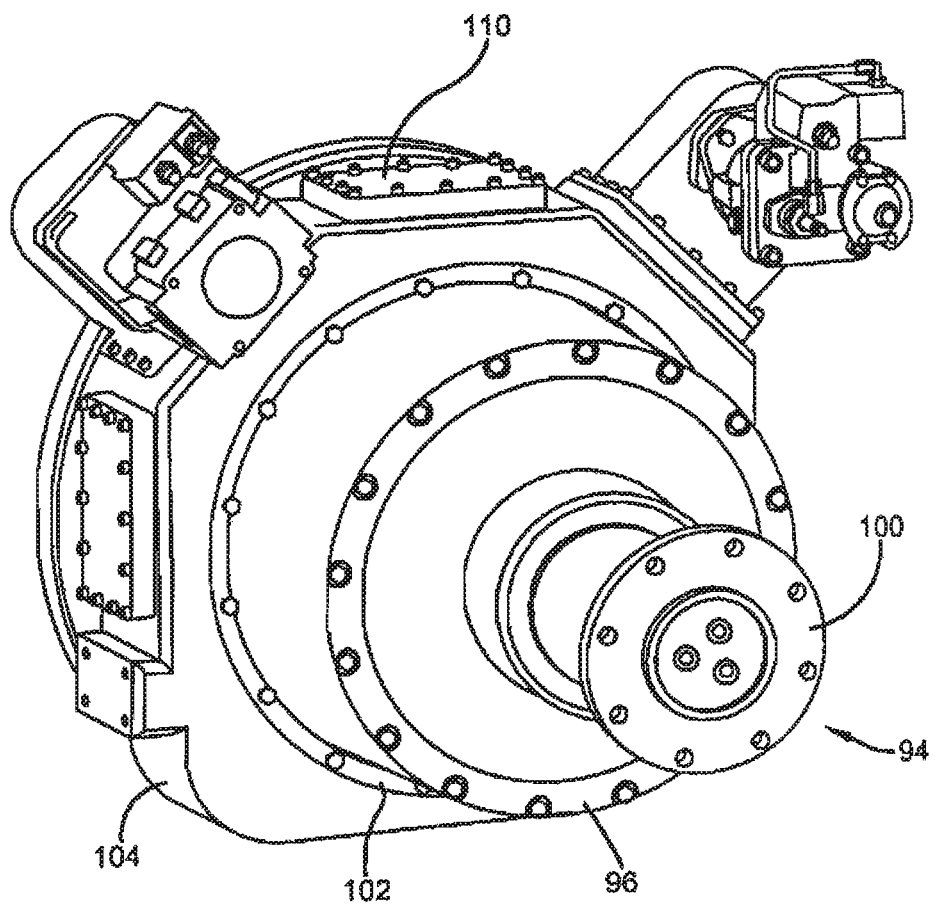
FIG. 9 is a rear isometric view of a further alternative embodiment of a clutch adapted to operate for extended periods in a slipping mode.
Figure 10:
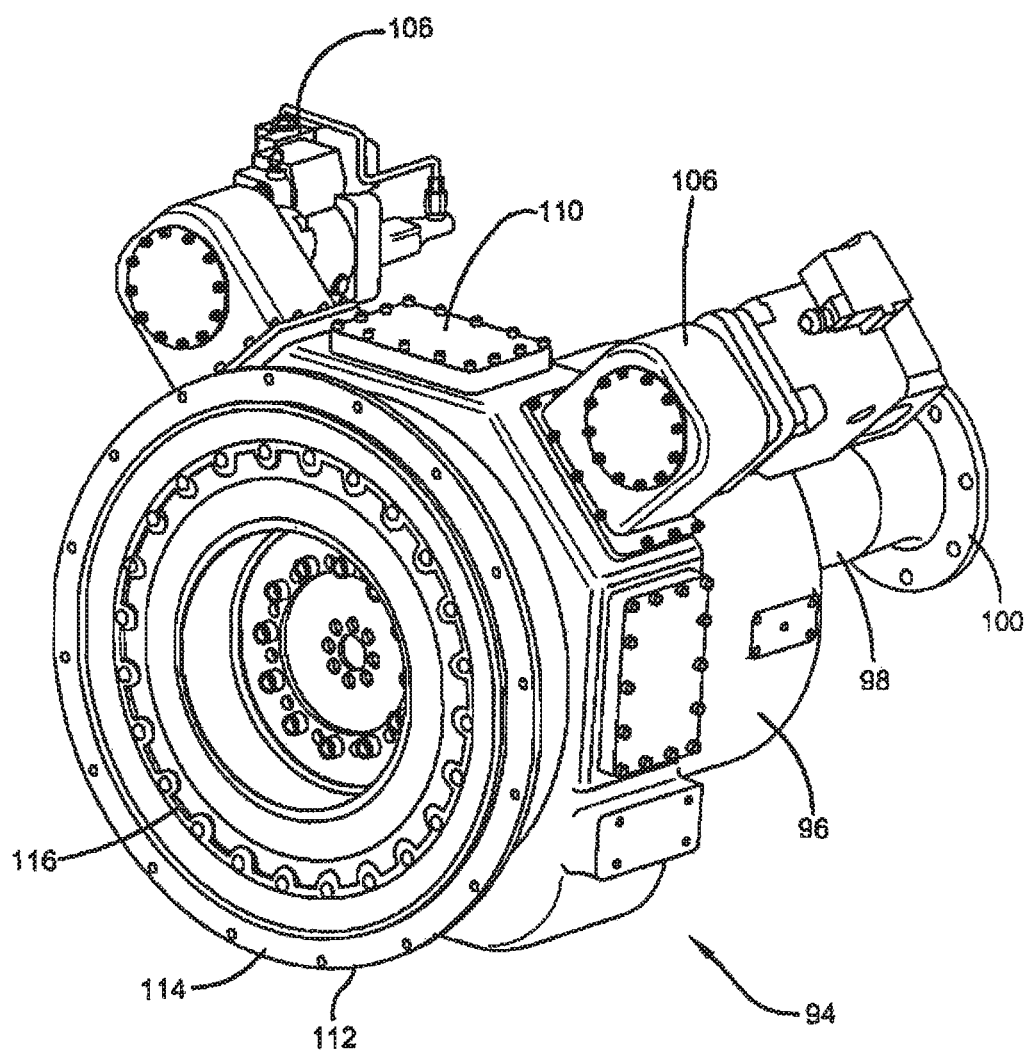
FIG. 10 is a front isometric view of the clutch shown in FIG. 9.
Figure 11:
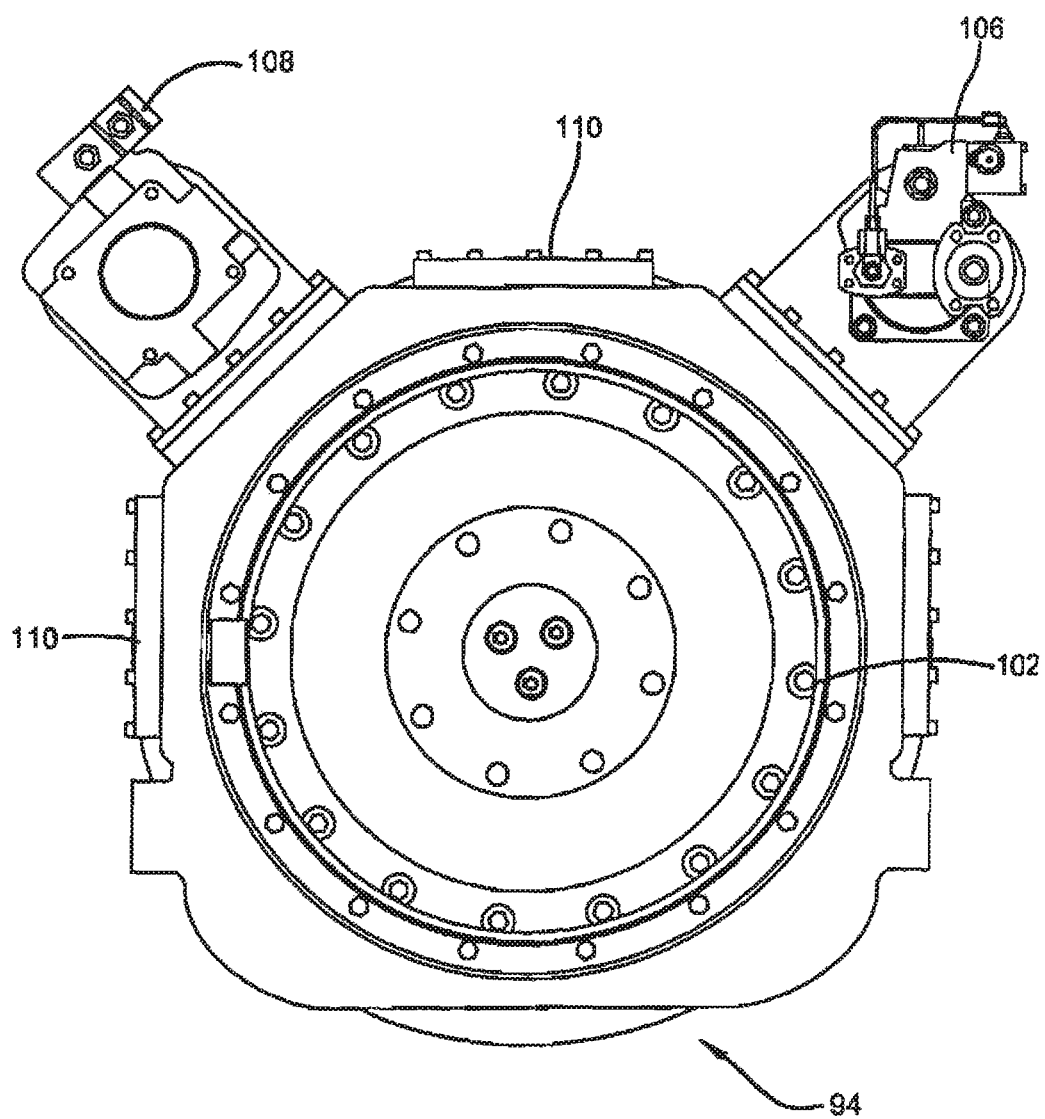
FIG. 11 is a front plan view of the clutch shown in FIG. 9.

The exemplary clutch actuation coupling is shown in more detail in FIGS. 6-8. The exemplary clutch actuation coupling includes an annular sleeve 70. Annular sleeve 70 overlies and extends in surrounding relation of the exterior surface of shaft 42 which is also referred to herein as a shaft outer face. Sleeve 70 is maintained in fluid tight engagement with the outer face of the shaft by annular resilient seals such as O rings 72 as shown. The sleeve 70 is held in relatively fixed rotational engagement with the shaft 42 through fasteners such as set screws 74. The set screws extend in an annular flange portion 75 of the sleeve.

The fluid openings 66 and 68 extend in an annular body 76. Annular body 76 extends in surrounding relation of the sleeve and is able to maintain its stationary rotational position because it is movably supported on the sleeve through a pair of disposed bearings 78. Flange portion 75 includes a radially extending step 77 and one of the bearings is positioned in adjacent relation with the step 77. Another bearing is positioned between a step on the sleeve and a locking ring as shown. A fluid passage 80 extends through the body 76. The fluid passage 80 extends generally radially between an outer face and an inner face of the body. A central block member 82 is in operative engagement with the body 76 at the annular inner face thereof. Block member 82 includes a fluid passage therethrough 84. The inner annular face of block member 82 of the exemplary embodiment is slightly radially disposed from the outer annular face 83 of annular sleeve member 70. This slight spacing is used to enable axial flow of hydraulic fluid for purposes of providing controlled lubrication flow as later discussed. However, it should be understood that in other embodiments the block member may have an inner annular face in abutting engagement with an outer annular face of the sleeve and the outer annular face of the block member may be radially disposed from the inner annular face of the body so as to enable axial liquid flow therebetween.

A pair of seals 86 are axially disposed on each side of block member 82. In the exemplary embodiment seals 86 are comprised of resilient material and provide a fluid tight seal at each end of the cavity of the body 76 in which the block member is positioned. Each of seals 76 in the exemplary embodiment is disposed in adjacent inboard relation to a bearing 78. Each of the exemplary seals is in operative attached engagement with the body. Each seal 86 includes a flexible inward extending annular lip 87. The annular lips are configured to be in contacting engagement with the relatively moving sleeve outer face 83. However, in other embodiments the seals may be configured to be in rotationally fixed operative engagement with the sleeve and the flexible lips or other sealing members configured to be in contact with an inner face of the body.

In the exemplary arrangement the passage 80 through the body 76 and passage 84 through the block member 82 are in fluid communication with an annular recess 88 that extends around the outer diameter of the sleeve member 70. The annular recess 88 is in fluid communication with a passage 90 through the sleeve member 70. Passage 90 is in fluid communication with a radially extending branch 92 of the fluid passage 60. Also as represented in FIGS. 7-8, resilient annular seals 72 extend annularly in sealing engagement between the inner face of the sleeve and the outer face of the shaft 72 on each axial side of the passage 90. As a result fluid leakage from the area of the passage 90 through the space between the sleeve and the shaft is prevented.

In operation, fluid used for actuating the clutch is provided through a fitting or similar connector through opening 66. The applied fluid pressure acts through the passage 80 in body 76 and through the passage 84 in block member 82 to reach the annular recess 88. The fluid pressure acting in the annular recess of the sleeve acts through the opening 90 in the sleeve such that fluid pressure is applied in branch 92 and fluid passage 60. Sufficient fluid pressure acting through the coupling engaged with opening 66 will move the piston to compress the clutch discs and separator discs so as to engage the clutch. Withdrawing the fluid pressure at opening 66 to a suitably low level causes the piston of the clutch and causes the clutch to retract and separator discs to disengage and become relatively rotationally movable.

A useful feature of the exemplary clutch actuation fluid coupling is that the inner annular face of the block member 82 is slightly disposed radially away from the outer annular surface of the sleeve member 70. This provides a small annular passage that provides controlled fluid flow in both axial directions from the passage 84 in the area between the block member and the sleeve. This fluid flow operates to cause the liquid hydraulic fluid to flow into contacting relation with the lips of the resilient seals 86 that are engaged with the outer face 83 of the sleeve. The fluid moves axially into cavities 89 that are bounded by the radially extending block side walls 91, the seals 86, the inner face of the body and sleeve outer face 83. The fluid reaching the resilient seal contact points serves to lubricate areas of engagement between the seal lips and the sleeve. Further the flow of fluid through the cavities 89 helps to provide a cooling effect as well as to remove any debris or other material that might otherwise be present within the cavities 89.

The fluid that passes between the block member 82 and the outer diameter of the sleeve 70 is drained from the cavity through outlet passages which are alternatively referred to as ports 68. Thus the exemplary arrangement can provide a generally continuous flow of lubricating and cooling fluid through the clutch actuation coupling so as to provide reliable operation and long life.

Further in the exemplary arrangement the coupling structures are fabricated to exact tolerances and have smooth polished finishes so as to provide precise locations and smooth engagement between the components of the clutch actuation coupling. The exemplary arrangement which provides for sealed engagement between the sleeve and the shaft avoids the need for the outer face of the shaft to be smooth and highly polished or perfectly symmetrical as any imperfections are accommodated by the plurality of annular seals 72 that extend between the inner face of the sleeve and the outer circumference of the shaft. Rather in the exemplary arrangement the flexible lips 87 contact the smoothed and polished outer face 83 of the sleeve which can provide reliable sealing and extended seal life. Further the exemplary arrangement includes seals that extend annularly on each axial side adjacent to passage 90 through the sleeve to the fluid passage 60 within the shaft. The positioning of these resilient annular seals prevents leakage of fluid between the sleeve and the shaft so as to provide reliable application of pressure to engage the clutch. Of course it should be understood that while the exemplary clutch actuation fluid coupling 64 has advantages, its features are exemplary and in other embodiments other or different structures or arrangements may be used.

FIGS. 9-13 show an alternative exemplary embodiment of a clutch 94. Clutch 94 of this exemplary embodiment is a slipping clutch meaning that it is designed to operate for extended periods with the driver and the driven device only partially engaged such that the driven device rotates at a speed that is different than the rotational speed of the driver. Clutch 94 may have particular applicability in marine applications such as in circumstances where it may be desirable to operate the propellers included in thrusters at a rotational speed that differs from the speed at which such propellers would rotate if the clutch were rigidly engaged with the driver. This approach might be useful, for example, when a marine engine is being operated to drive both a water pump for firefighting applications and the thrusters of the ship. In such circumstances it may be desirable to turn the water pump developing the water flow for use in fighting the fire at a very high rate of speed while the thrusters are only driven at a relatively low rate of speed as necessary for the ship to maintain the desired position relative to the object on which the water is being sprayed. Of course this is only one example of an application for the type of clutch 94.

The exemplary clutch 94 includes a housing 96. A shaft 98 extends from the housing and a coupling 100 is attached thereto. In the exemplary embodiment the clutch housing 96 is connected through a flange portion 102 to a gear housing which is alternatively referred to as a gear box 104. In the exemplary embodiment the gear box 104 houses suitable gears such as a ring gear, planetary gears or other suitable gear sets that include gears that can be engaged with gear driven devices through openings at multiple angularly spaced locations on the gear box. For example in the exemplary embodiment, the gear box 104 is shown operatively connected with a pair of gear driven pumps 106, 108. As can be seen from the figures, the exemplary embodiment of the gear box 104 includes five angularly spaced openings and mounting locations for accessory gear driven devices. For the device mounting locations where a device is not connected, the opening that can be used to access the gears located in the gear box can be covered by a removable cover plate 110. Exemplary embodiments may include features like those described in U.S. Provisional Application Ser. No. 62/248,347 filed Oct. 30, 2015 which is incorporated herein by reference in its entirety.

In the exemplary embodiment, the gear box is in operative connection with a bell housing 112. The bell housing 112 includes a flange 114 or other suitable connecting portion that can be used to engage the bell housing with an engine or other suitable driver device. The exemplary bell housing houses a rotatable dampening coupling 116. Coupling 116 includes vibration reducing resilient materials and other suitable structures that reduce the propagation of undesirable vibrations and other forces from the engine or other driving members into the gear box and clutch. The coupling 116 of the exemplary embodiment is adapted to be engaged with a flywheel or other suitable rotating member of the engine or other driving member. Of course in other embodiments other types of couplings which can engage the clutch with driver or driven devices can be used.

Figure 12:
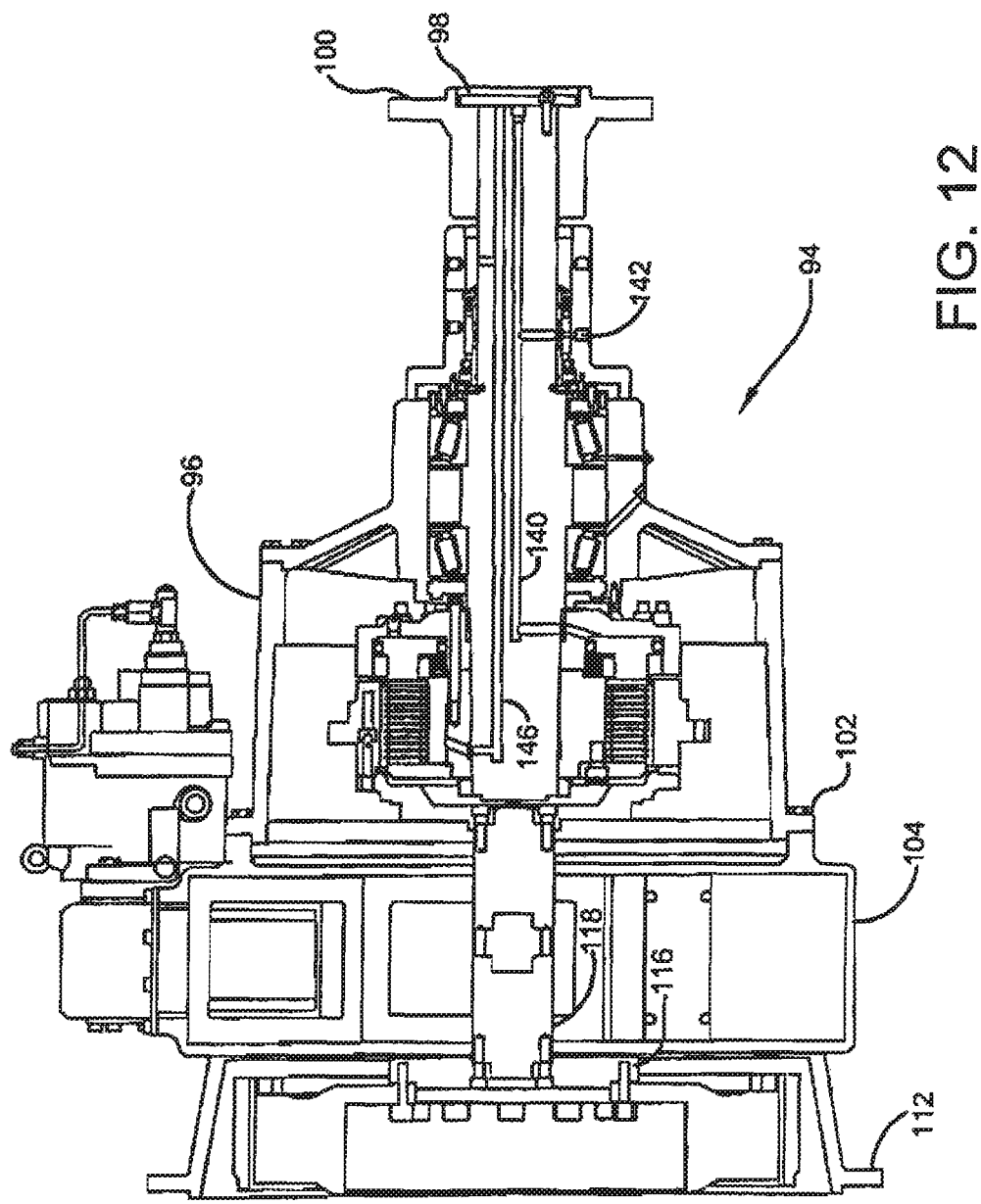
FIG. 12 is a cross-sectional view of the clutch shown in FIG. 9.
Figure 13:
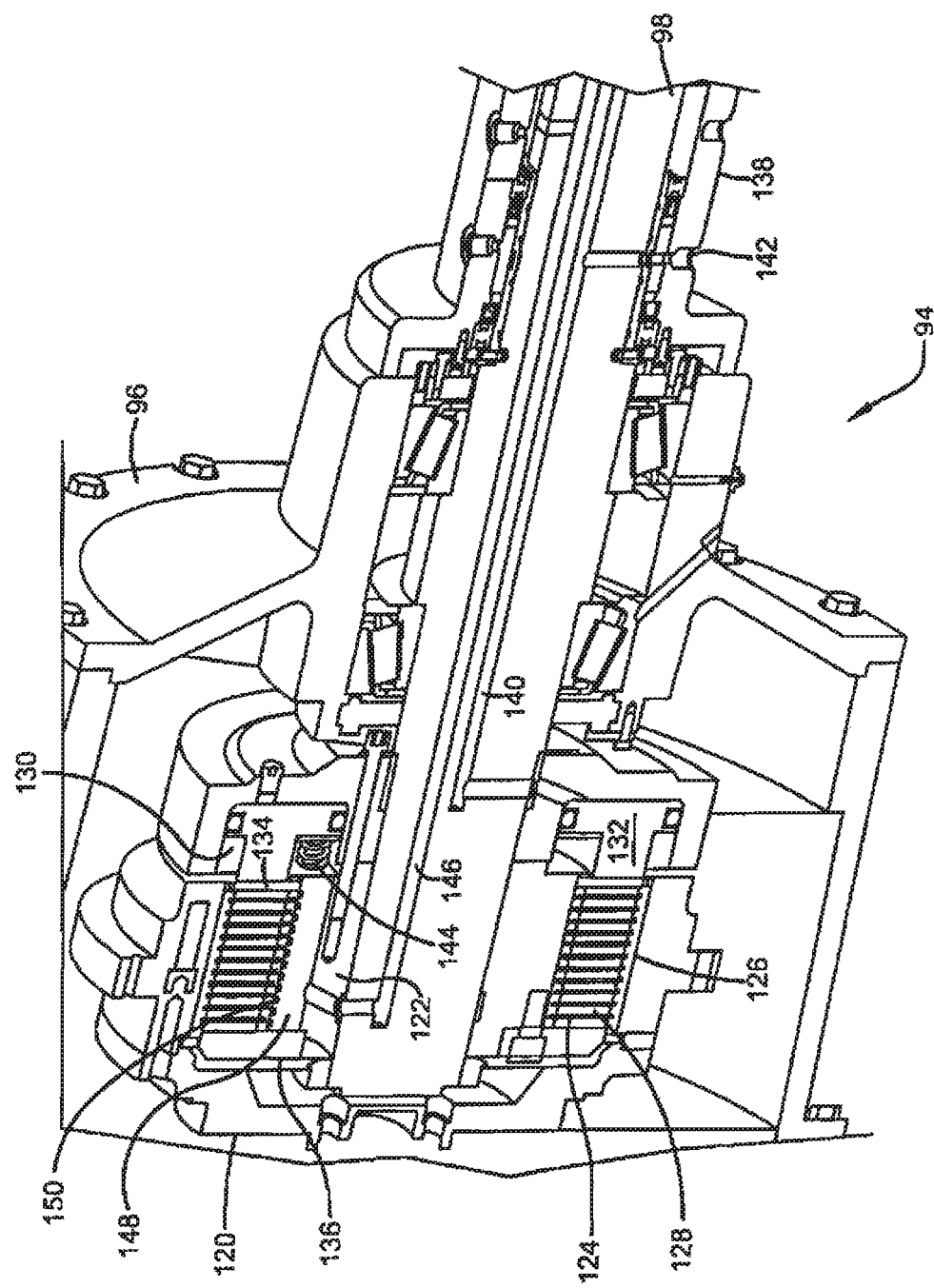
FIG. 13 is an enlarged cross-sectional view of the clutch shown in FIG. 10.

The exemplary slipping clutch 94 is shown in cross-section and in greater detail in FIGS. 12 and 13. In the exemplary arrangement the coupling 116 which is rotated by the engine and operatively connected to an input shaft 118 that extends in and operatively drives the devices of the gear box. The input shaft 118 is operatively connected to a generally cylindrical disc housing 120. Disc housing 120 is a generally cylindrical housing that houses clutch discs and separator discs of a disc pack which may be similar to those previously discussed. The shaft 98 extends in the disc housing 120 and is rotatable relative thereto when the clutch is disengaged.

As best shown in FIG. 13, a hub portion 122 is attached to shaft 98 and rotates therewith. Hub portion 122 includes an axially splined hub portion. The axially splined hub portion 122 is configured to rotationally engage and enable relative axial movement of a plurality of separator discs 124 thereon. The exemplary separator discs include an inner splined diameter that is configured to engage the splined portion of the hub. The disc housing includes an axially splined internal annular surface 126. Splined surface 126 is configured to rotationally engage the outer toothed contours of the outer splined diameter of a plurality of clutch discs 128. In the exemplary embodiment the clutch discs and separator discs are arranged in alternating relation with the clutch discs engaged through their outer splined diameter toothed contours with the annular inward splined surface of the disc housing, and the separator discs engaged through their inner splined diameter toothed contours with the splined hub portion.

In the exemplary arrangement the disc housing includes an annular cavity 130. Cavity 130 houses a movable annular piston 132 which is movable therein. An annular pressure plate 134 is positioned between the piston 132 and the disc pack comprising the clutch and separator discs. A backing plate 136 extends on the opposite side of the disc pack from the pressure plate 134.

As in the previously discussed embodiment, a clutch actuation fluid coupling 138 overlies the shaft 98 and is usable to supply fluid pressure to an actuator fluid passage 140. The clutch actuation fluid coupling 138 may include features similar to those discussed in connection with coupling 64.

Supplying pressure to the opening 142 is operative to cause fluid pressure to be applied behind the piston 132 in cavity 130. This causes the piston 132 to move axially to the left as shown in FIGS. 12 and 13. Movement of the piston correspondingly axially moves the pressure plate 134 and selectively moves and compresses the separator and clutch discs axially in the disc pack so as to engage the clutch. When fluid pressure is relieved from the fluid passage 140, springs 144 act to retract the piston 132 in the cavity. This enables the discs in the disc pack to axially move apart and to rotationally move relative to one another resulting in disengagement of the clutch.

The exemplary embodiment of slipping clutch 94 operates to maintain the clutch discs and separator discs in a fluid bathed environment. Liquid transmission fluid is passed radially outward between the discs of the disc pack in order to provide cooling and to carry away any debris that may be generated during clutch operation. Further in this exemplary embodiment because the clutch may be operated in a slipping mode for an extended period of time without damage, the liquid material extending on and between the discs operates to transmit rotational torque through fluid shear forces in circumstances where the clutch and separator discs are not contactingly engaged and/or are not fully compressively engaged.

In the exemplary arrangement the transmission fluid which passes through the disc pack is supplied by suitable fittings to a clutch fluid coupling. In some arrangements this may be a fluid coupling similar to the clutch actuation fluid coupling that was previously described in connection with supplying fluid for actuating the piston.

The transmission fluid that is alternatively referred to herein as cooling oil or cooling fluid, flows through a transmission passage 146 that extends in the shaft 98. The fluid passage is in connection with a manifold chamber 148 in the hub portion 122. The manifold chamber is connected to a plurality of fluid openings 150. The fluid openings 150 extend into the spaces between the grooves of the spline in the hub portion. This enables the transmission fluid to flow radially outward between the separator discs and clutch discs. In exemplary embodiments centrifugal force aids in moving the liquid in the outward direction.

In the exemplary arrangement the transmission fluid that flows between the discs moves radially outward away from the hub portion to the annular periphery of the disc housing 120 and splined annular surface 126. The transmission fluid that is moved radially outward passes through fluid outlet openings in the hub portion and drains into the generally fluid tight housing 96 of clutch 94. In the exemplary arrangement the oil is drained from the interior of the housing and is collected in a tank. From the tank the fluid can be returned by a pump to the transmission fluid passage of the clutch. As can be appreciated in some exemplary arrangements, the fluid circuit for the transmission fluid may include a heat exchanger or other suitable device to maintain the temperature of the fluid and the clutch within a desired operating range. In addition in some arrangements the fluid circuits may include suitable filters or other devices for removing debris or other impurities that may be entrained in the transmission fluid. Of course these approaches are exemplary and in other embodiments, other arrangements may be used.

Figure 32:
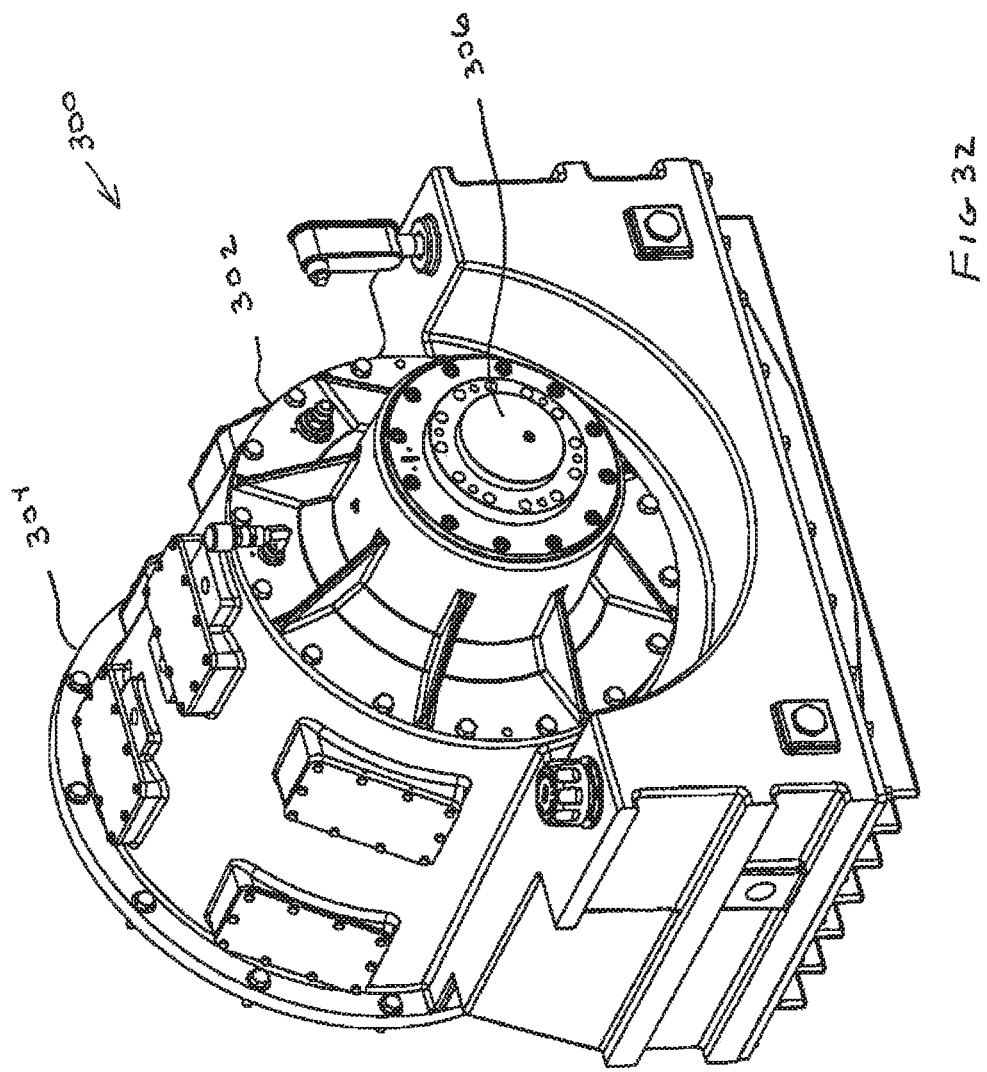
FIG. 32 is a rear top isometric view of an alternative embodiment of a clutch housing.

FIG. 32 shows an alternative clutch arrangement generally indicated 300. Clutch arrangement 300 includes a housing 302. Housing 302 includes many features like those previously described. Clutch 300 includes a flange portion 304 which is configured for connecting the clutch housing to a driving member such as a diesel engine or other device. Clutch 300 further includes an output shaft 306.

Figure 33:
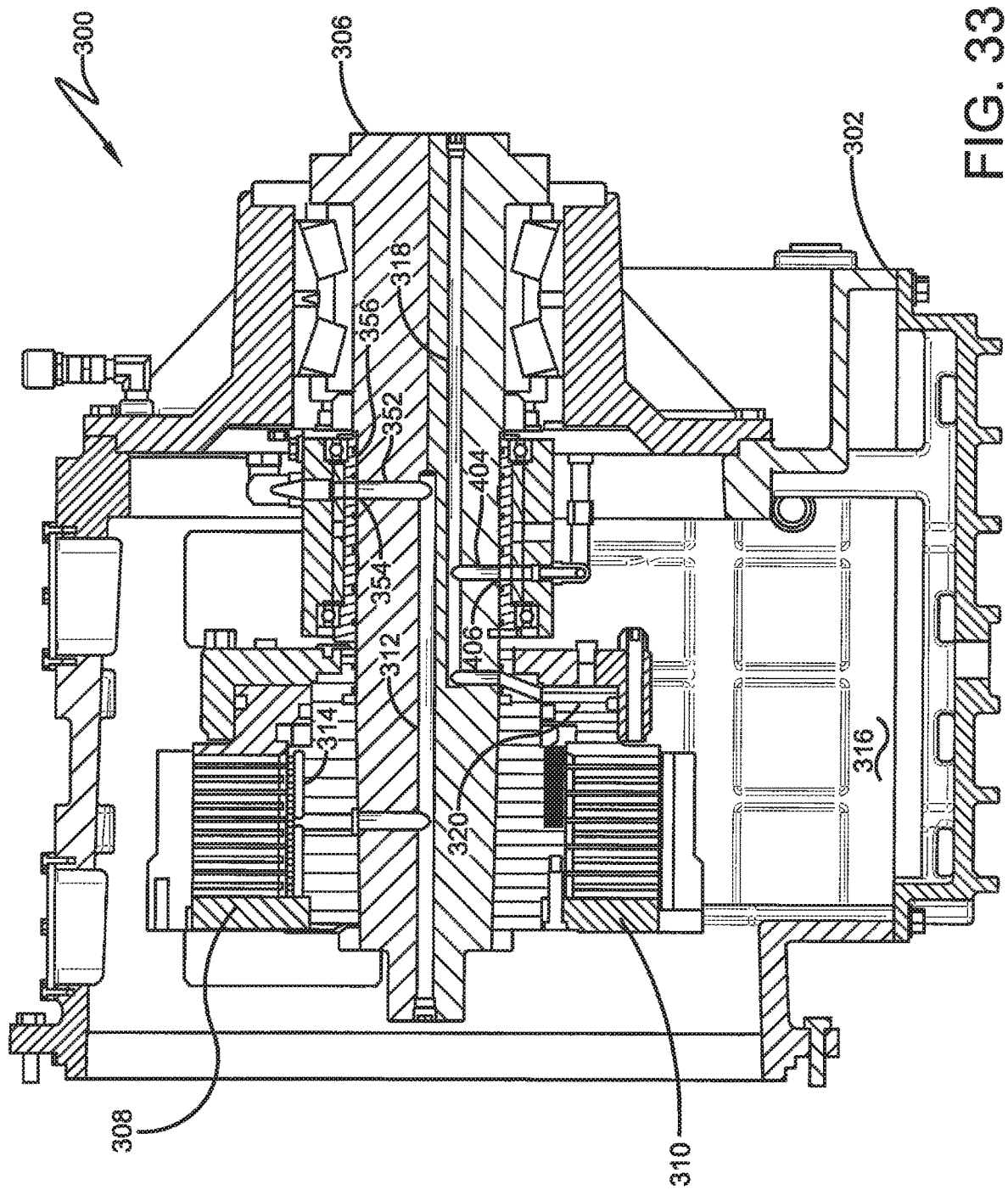
FIG. 33 is a cross-sectional view of the clutch housing shown in FIG. 32 and the clutch therein.

As shown in FIG. 33, housing 302 houses a clutch 308. The clutch may have features similar to clutches previously described. Clutch 308 includes a disc housing 310 which houses clutch discs and separator discs in a disc pack like that previously discussed. The disc housing 310 is in operative rotatable connection with a driving member such as the engine crankshaft through an anti-vibration flex plate or similar coupling structure.

Shaft 306 includes therein a shaft coolant fluid (CF) passage 312. Shaft CF passage 312 is configured to deliver coolant in the form of transmission fluid to a manifold 314 at the inside diameter of the clutch and separator discs. Shaft CF passage 312 delivers transmission fluid that is enabled to pass radially outward through the clutch and separator discs in a manner like that previously discussed to provide cooling for the clutch discs during operation. Housing 302 includes an interior sump area 316 which captures the transmission fluid which is passed through the clutch discs and separator discs so that it can be cooled in a fluid circuit and again passed through the separator discs.

Shaft 306 further includes a shaft actuation fluid (AF) fluid passage 318. Shaft AF passage 318 is in fluid communication with an annular piston chamber in the housing 310. AF fluid pressure applied to passage 318 is operative to move a clutch piston 320 to the left as shown in FIG. 33. Movement of the piston 320 in response to AF pressure causes the clutch and separator discs to be compressed and causes the shaft 306 to rotate with the driving member which is connected to the disc housing. Releasing the AF pressure from the passage 318 enables piston 320 to be retracted to the right and allows the clutch to be disengaged so that the disc housing may rotate without causing rotation of the shaft.

Figure 34:
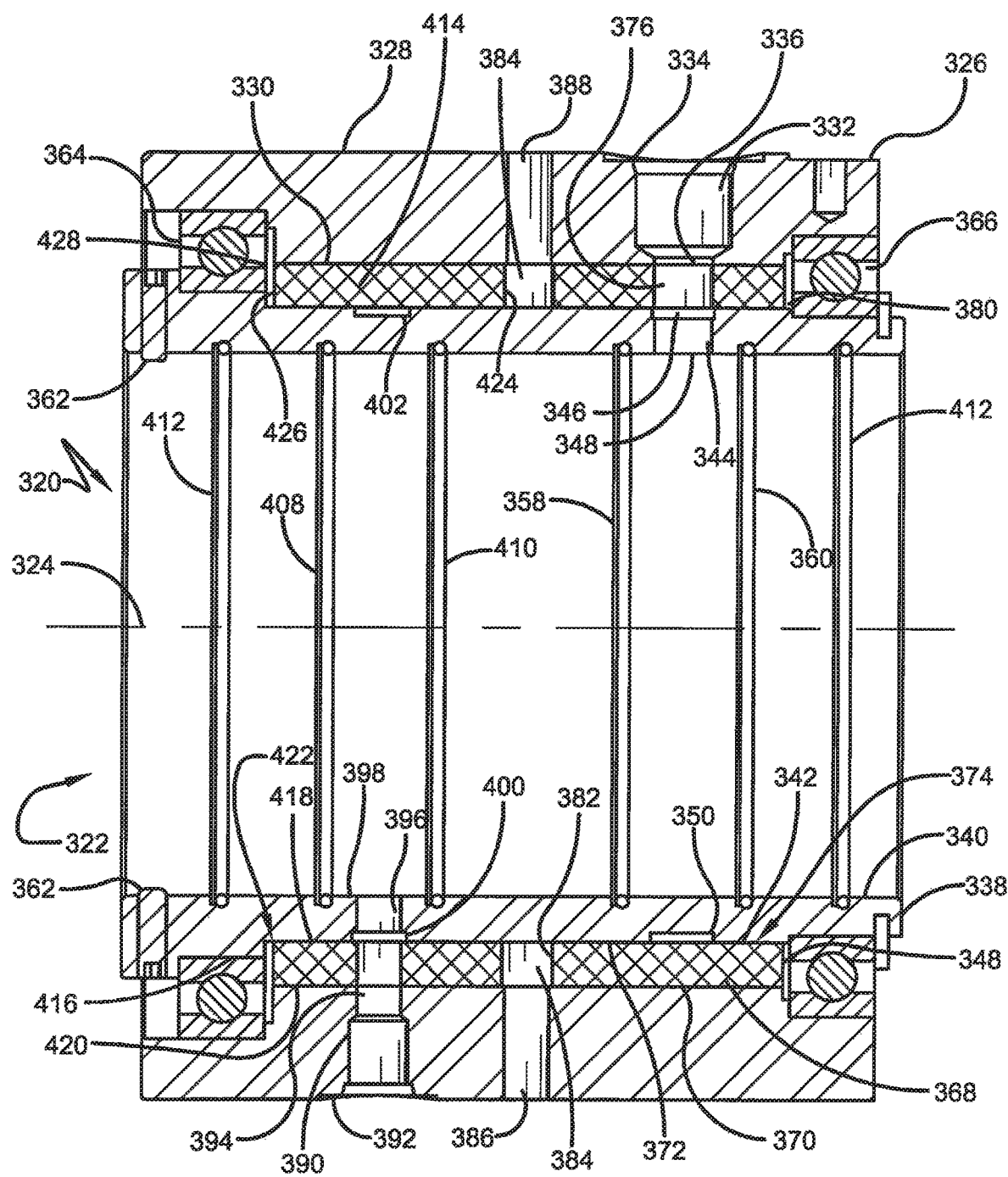
FIG. 34 is a cross-sectional view of an exemplary fluid coupling used for delivering actuation fluid and cooling fluid to the clutch shown in FIG. 33.

In the exemplary clutch 300, a fluid coupling 320 shown in cross section in FIG. 34 is utilized to deliver CF and AF to the clutch. The housing 320 includes a central bore 322 through which shaft 306 extends in the operative position of the coupling. The bore extends about a central axis 324 which is a common central axis with shaft 306.

The exemplary coupling 320 includes an annular body 326. Body 326 includes an annular body outer face 328 and an annular body inner face 330. A body CF passage 332 extends generally radially through the body 326. The body CF passage is in fluid connection with a body CF outer opening 334 which extends in the outer body face 328. The body CF passage 332 further connects with a body CF inner opening 336 which extends in the body inner face 330.

An annular sleeve 338 extends in surrounding relation of the shaft 306. The exemplary sleeve 338 includes an annular sleeve inner face 340 and an annular sleeve outer face 342.

A sleeve CF passage 344 extends between a sleeve CF outer opening 346 on the sleeve outer face and a sleeve CF inner opening 348 on the sleeve inner face 340. Sleeve 338 includes an annular recess 350 that extends about the sleeve in diametric alignment with the sleeve fluid passage. As can be appreciated, the annular recess enables CF to be in fluid communication with the sleeve CF inner opening regardless of the angular position of the sleeve relative to the body 326.

As shown in FIG. 33, the shaft CF passage 312 includes a radially extending portion 352 which terminates in a shaft CF inlet opening 354 in the annular shaft outer face 356. The shaft CF inlet opening 354 is aligned with the sleeve CF inner opening so that CF may flow through the sleeve and into the shaft CF passage 312.

A pair of resilient annular seals 358, 360 are positioned in recesses in the sleeve inner face on opposed axial sides of the sleeve CF inner opening 348 and the shaft CF inlet opening 354. Each of the resilient seals extends in abutting fluid tight relation between the shaft outer face 356 and sleeve inner face 340. The pair of resilient seals 358 and 360 operate to assure that fluid does not escape by moving in an axial direction between the sleeve inner face 340 and the shaft outer face 356, thus assuring that fluid is transmitted effectively from the sleeve CF passage 344 into the shaft CF passage 312.

The exemplary coupling 320 includes fasteners 362 which operate to engage the sleeve 338 and the shaft 306. The fasteners help to assure that the sleeve 338 rotates in relatively fixed engaged relation with the shaft 306.

A pair of axially disposed bearings 364 and 366 are operatively positioned between the sleeve 338 and the body 326. The bearings 364 and 366 enable the relative rotational movement of the sleeve 338 and the body 326. As can be appreciated in the exemplary coupling arrangement, the body 326 remains stationary as the sleeve 338 and the shaft 306 rotate therein.

A CF block 368 is positioned intermediate of the body inner face 330 and the sleeve outer face 342. In the exemplary embodiment, block 368 has an annular block outer face 370 that is in abutting engaged relation with the body inner face 330. Block 368 also has a block inner face 372 that is adjacent and slightly radially disposed from the sleeve outer face 342. The block inner face 372 and the sleeve outer face 342 bound a CF gap 374. Gap 374 has a radial distance that is sized to provide clearance to enable controlled axial CF flow therethrough in a manner that is later discussed.

Block 368 further includes a block passage 376 that extends therethrough. Block passage 376 extends between the block outer face 370 and the block inner face 372. Block passage 376 is aligned and in fluid communication with the body CF inner opening 336. Passage 376 is also in fluid communication with the gap 374 and the annular recess 350 which is in turn in fluid communication with the sleeve CF passage 344 and the shaft CF passage 312.

Block 368 further includes a radially extending annular block outer side wall 378. Block outer side wall 378 is axially disposed inwardly from bearing 366. Side wall 378 and bearing 366 define a CF fluid manifold space 380. CF passes from the CF gap 374, into space 380. To lubricate and cool the bearing 366, CF passes from space 380 and through the bearing.

Block 368 is bounded axially inward by an annular radially extending CF block inner side wall 382. Block inner side wall 382 bounds one axial side of an equalization chamber 384. The equalization chamber 384 is connected to equalization ports 386 and 388, the purpose of which is later explained.

The exemplary coupling 320 further includes a body AF passage 390. Body AF passage 390 extends generally radially through the body 326 and is axially disposed from the body CF passage 332. The body AF passage extends from a body AF outer opening 392 on the annular body outer surface 328 to a body AF inner opening 394 which extends in the body inner face 330.

The sleeve includes a sleeve AF passage 396. The sleeve AF passage extends between a sleeve AF inner opening 398 in the sleeve inner face 340 and a sleeve AF outer opening 400. The sleeve outer face 342 includes an annular recess 402 that is fluidly connected with the sleeve AF outer opening 400. The recess 402 enables the body AF passage 390 to be in fluid communication with the sleeve AF passage 396 regardless of the relative angular position of the sleeve with respect to the body.

The sleeve AF inner opening is generally aligned with a radially extending portion 404 of the shaft AF passage 318 as shown in FIG. 33. The shaft AF passage 318 includes a shaft AF inlet opening 406 that is in radially aligned relation with sleeve AF passage 396.

A pair of annular resilient seals 408 and 410 extend in annular recesses in the sleeve inner surface 340. Similar to seals 358 and 360, seals 408 and 410 extend in fluid tight abutting relation between the annular shaft outer face 356 and the sleeve inner face 340. Seals 408 and 410 are disposed on opposed axial sides of the sleeve AF inner opening 398 and the shaft AF inlet opening 406. The pair of seals 408 and 410 generally prevent the flow in an axial direction of AF in the space which extends between the shaft outer face 356 and the sleeve inner face 340. This enables the fluid to effectively flow from the sleeve into the shaft AF passage so as to move the piston 320 without loss of fluid. Further in the exemplary embodiment additional annular resilient seals indicated 412 extend between the sleeve inner face 340 and the shaft outer face 356. The seals 412 are positioned axially away from the areas bounded by seal pairs 408, 410 and 358, 360. Although two additional seals 312 are shown, other embodiments may include no additional seals or other numbers of such additional seals.

The exemplary coupling 320 further includes an AF block 414. Block 414 extends intermediate of the body inner face 330 and the sleeve outer face 342. Block 414 includes a block passage 416. Block passage 416 extends between a block annular inner face 418 and a block outer face 420.

The exemplary block outer face 420 is in abutting relation and in engagement with the body inner face 330. As a result, block 416 is engaged with body 326 and remains stationary while the shaft 306 and the sleeve 338 rotate relative thereto. The block inner face 418 is disposed a first radial distance from the sleeve outer face 342 so as to provide an annular clearance AF gap 422 therebetween. Similar to the CF gap 374, the AF gap 422 enables axial flow of the AF in the gap between the block inner face 418 and the sleeve outer face 342.

Block 414 includes a generally radially extending AF block inner side wall 424. Side wall 424 is axially disposed from side wall 382 of CF block 368. Side wall 424 and side wall 382 axially bound the equalization chamber 384.

CF block 414 further includes an outer side wall 426. Outer side wall 426 is disposed axially inward of bearing 364. Side wall 426 and the bearing define an AF fluid manifold space 428. AF fluid manifold space 428 is an annular space through which AF that has passed axially outward through the gap 422 may flow and then subsequently pass through the bearing 364 for coolant and lubrication purposes.

Figure 35:
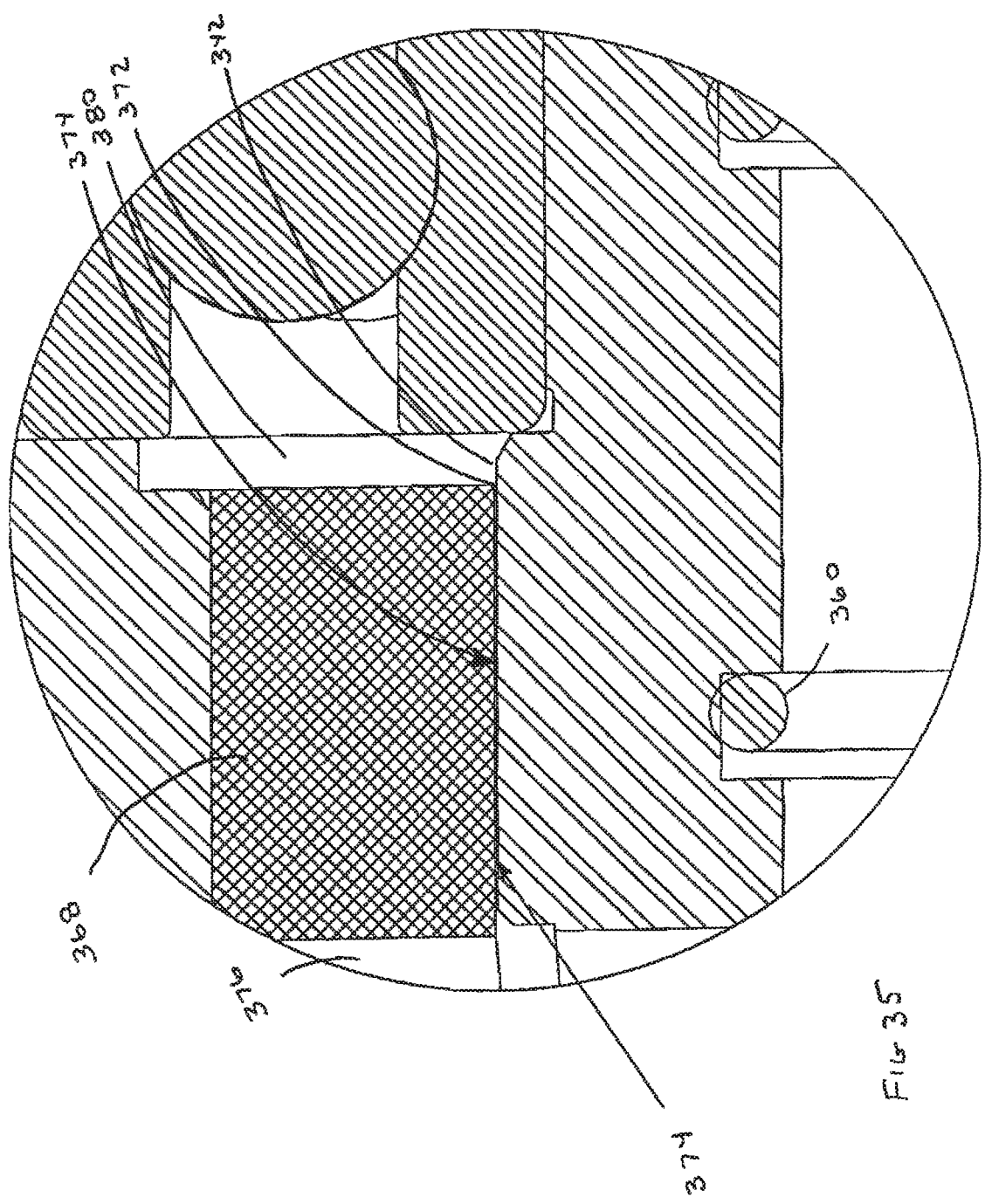
FIG. 35 is an enlarged cross-sectional view of the right side detail of the fluid coupling of FIG. 34.
Figure 36:
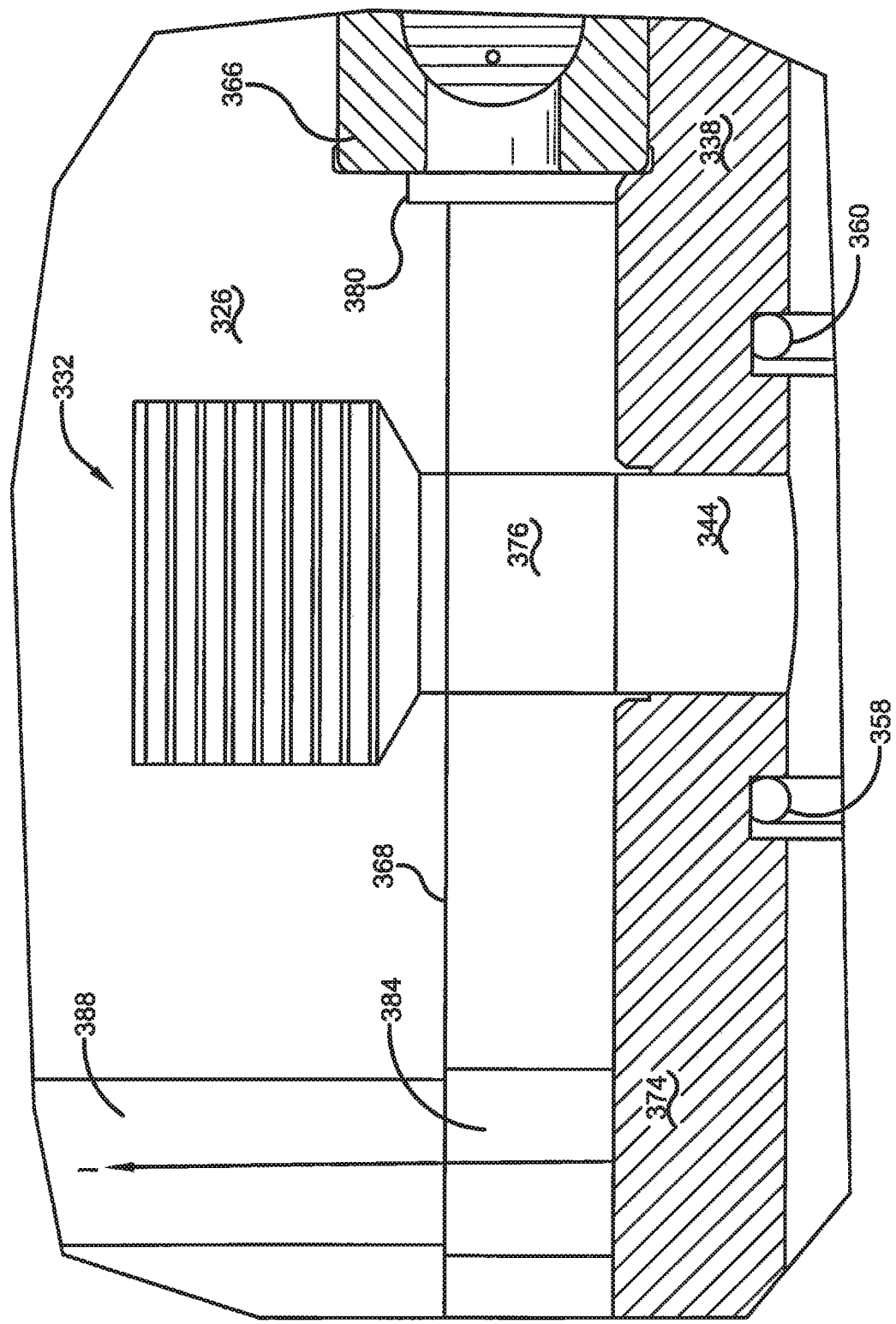
FIG. 36 is an enlarged cross-sectional view of the fluid coupling representing controlled fluid flow axially through a radial gap.

As shown in greater detail in FIGS. 35 and 36, the controlled radial clearance spaces provided by CF gap 374 and AF gap 422, enable fluid which can be either CF or AF from the adjacent port to move axially in the gaps between the adjacent block inner surface and the sleeve outer surface. As represented in FIG. 36, the body CF passage 332 enables the CF to flow radially inward therethrough and inwardly through the CF block passage 376 in the CF block 368. The fluid in block fluid passage 376 largely flows into the sleeve CF passage 344. However, the controlled clearance of the annular radial gap 374 enables some of the CF to flow axially outward from CF block passage 376 through the annular CF manifold space 380. From the CF manifold space 380, the fluid flows axially outward through bearing 366 as represented by arrows O.

The fluid also flows axially inward from the block passage 376 through the CF gap 374 and the annular equalization chamber 384. The fluid reaching the equalization chamber 384 passes outward through one of the equalization ports 388. This is represented by the arrow I.

As can be appreciated, the exemplary coupling structures associated with the actuation fluid operate in a manner similar to that described in connection with FIG. 36 for the coolant fluid. AF fluid pressure applied through the body AF passage 390 and the AF block passage 416 generally pass through the shaft AF passage to move the piston 320. However, some of the AF moves axially outward through the AF gap 422, through the AF fluid manifold space 420 and through the bearing 364. AF fluid also moves through the AF gap 422 axially inward to the equalization chamber 384. The AF fluid then passes outwardly through one of the equalization ports 388.

Of course it should be appreciated that in this exemplary arrangement the actuation fluid AF and the coolant fluid CF each comprise the same transmission fluid which is used in separate fluid streams for actuation and cooling purposes. In the exemplary arrangement, the fluid is collected in the sump area 316 of the housing 302. A stream of the fluid is then elevated in pressure by one or more pumps and controlled through valves for purposes of piston actuation in a manner like that previously described. Another fluid stream is pumped and directed for cooling or otherwise directed for use as the CF for purposes of cooling the clutch and lubricating the bearings of the coupling and/or other components of the clutch 300.

Of course it should be understood that this arrangement is exemplary and in other embodiments, other arrangements may be used.

For example in some arrangements, different actuation fluids and coolant fluids may be utilized and the streams thereof kept separate. This may be accomplished by using additional seals or other structures within the coupling arrangement and the clutch housing. Further, other arrangements may include additional structures to provide controlled flow patterns so as to direct the actuation fluid and the coolant fluid along particular paths within the fluid coupling. For example in some arrangements the block inner face, sleeve outer face or both may include helical projections and/or recesses which may operate to direct fluid in the annular gap in a desired axial direction. This may be done, for example, if it is desired to increase the rate of fluid flow in the gap for coolant or lubrication purposes. This approach may also be taken in cases where fluids are axially directed in the gap so as to help maintain separation between different types of coolant fluids and actuation fluids. Further in some exemplary embodiments the annular gap may be pressurized via fluid from a port such as for example port 488 to achieve fluid movement in the gap in a desired axial direction. For example, pressure may be applied at an axial inward port so as to force axial movement of fluid axially outward through the bearing.

It should further be understood that the size of the radial clearance gap may be different for actuation fluid and coolant fluid. For example in some arrangements the coolant fluid may flow at a higher rate but at a lower pressure than the actuation fluid, which may experience relatively little flow compared to the coolant fluid. In such arrangements, the size of the radial gap may differ so as to enable sufficient flow of coolant fluid to reach the bearing 366. The radial gap for the actuation fluid may be smaller because of the elevated pressure used for purposes of piston actuation, which enables adequate lubrication and cooling fluid flow through bearing 364 of the exemplary embodiment even though the AF gap may be smaller than the CF gap. Of course these configurations are exemplary and in other embodiments, other approaches may be used.

Further, in the exemplary coupling 320 two fluid passages are provided. However, it should be understood that the principles described herein may be applied to couplings having only one fluid passage. Likewise the principles may be applied to coupling structures that handle more than two fluid flow streams for purposes of delivering fluids from a stationary outer body to a relatively rotating internal sleeve and shaft structure.

Of course it should be appreciated that in the exemplary arrangement, the sleeve outer surface is generally a much more uniform and smooth surface than the outer surface of the shaft. This enables providing for a uniform and precisely sized radial clearance gap between the inner face of the block and the outer face of the sleeve. Providing this precise clearance enables achieving a more uniform and predictable flow for cooling and lubrication through the coupling. Also it should be appreciated that different embodiments may be configured to have different configuration blocks so as to control the annular gap to more precisely meet the requirements of a given application and the particular fluid type and pressures to be handled by the coupling. The principles described herein can be used for such purposes to achieve satisfactory operation in numerous different operating environments.

FIGS. 14-19 show various forms of clutch discs which include arrangements of liquid holding grooves therein. In these exemplary embodiments the clutch discs are comprised of a metal disc with high friction material on each opposed axial side. As previously discussed, because in operation each clutch disc has an adjacent separator disc on each side, each surface including the high friction material is adjacent to and when the clutch is fully engaged, in compressed engagement against separator disc within the clutch disc pack.

FIGS. 14-19 show exemplary arrangements of grooves that may be included in friction material of exemplary clutch discs. As can be appreciated, the grooves in such discs provides fluid holding flow passages for the transmission fluid that passes radially outward through the disc pack. Further the grooves also provide passageways for the transmission fluid and enables flow even when the clutch discs and separator discs are being held in abutting engagement. In the exemplary embodiment, this facilitates the cooling flow of the transmission fluid through the disc pack. Further as can be appreciated in some exemplary arrangements, the orientation of the grooves in the friction material may facilitate the flow of transmission fluid radially outward through the grooves in response to centrifugal force created by the rotation of the disc pack. Exemplary grooves include radially extending grooves, circumferentially extending grooves and combinations thereof.

In the exemplary arrangement, the clutch may operate as a slipping clutch such that the speed of the engine or other driver device can be maintained at a much higher rate of rotational speed than the output shaft of the clutch and the driven device in operatively fixed rotational engagement therewith. In such arrangements, the fluid held entrained within the grooves may operate to transmit torque between the clutch discs and the separator discs based on the rotational movement of the fluid within the passages. This transmission of torque can be achieved based on the amount, flow and viscosity of the transmission fluid as well as the finish of the adjacent separator discs. Thus as can be appreciated, the rotational movement and torque of the engine may be at least partially transmitted through the disc pack via the fluid shear force of the rotating liquid. Further in some exemplary arrangements, the amount of the force transmitted may be selectively varied by movement of the piston to selectively vary the proximity of the clutch discs and separator discs in slip positions when the discs are not in direct contact. Thus for example having the fluid of the passages of the clutch discs in proximity to the separator discs will effectively transfer more rotational movement torque via fluid coupling effects in slip positions when the discs are in very close, non-contacting axial proximity than when the discs are disposed further axially apart.

As can be appreciated, these properties of enabling movement and force transmission when the clutch and separator discs are not in contacting engagement, can be useful in a number of different operating conditions. For example, in the exemplary arrangement shown in FIG. 2 where the engine drives not only the thrusters but also a firefighting pump, there will be circumstances where the full water flow through the firefighting pump is desirable. This may mean that the engine is operated at a relatively high rotational speed. However, the thrusters may only need to move at a relatively much slower rotational speed than would be achieved if the clutch were fully engaged. In these circumstances, selectively varying the axial distance between the discs included in the disc pack in a non-contact slip condition enables the exemplary clutch 94 to operate the thrusters at a selected much slower rotational speed than the rotational speed of the engine.

In addition, exemplary arrangements of the clutch may also provide the capability to avoid the shock and vibration that would otherwise arise upon full rigid contacting engagement of the clutch discs of a conventional clutch. For example in this exemplary arrangement rotational movement and force is being transmitted between the clutch discs and the separator discs as the discs move in closer proximity in response to axial movement of the piston and eventually engage in compressed contacting engagement. This enables the output shaft of the clutch to begin rotating at a relatively slow speed in slip positions of the piston and to then have the speed increase as desired to the level of the driver member as the discs increasingly contactingly and compressively engage. This "soft engagement" capability avoids unnecessary wear on clutch components as well as the devices that are driven through the clutch. Of course it should be understood that these approaches are exemplary and in other embodiments, other approaches may be used.

Figure 20:
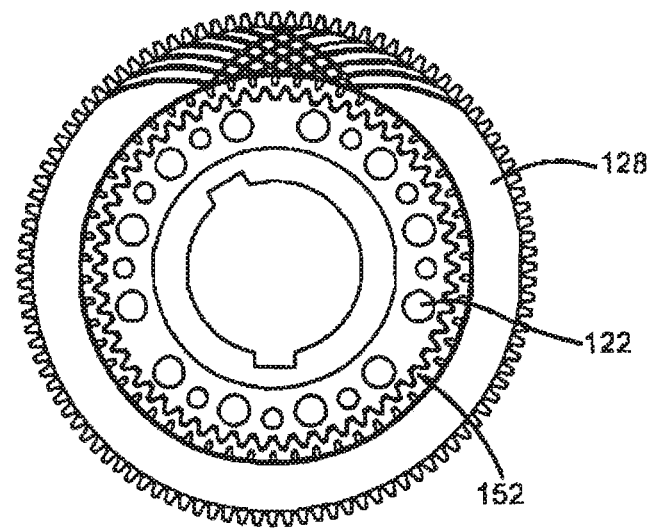
FIG. 20 is a plan view of a shaft, clutch disc and serrated Belleville spring for use in an exemplary clutch such as that shown in FIG. 9.
Figure 21:
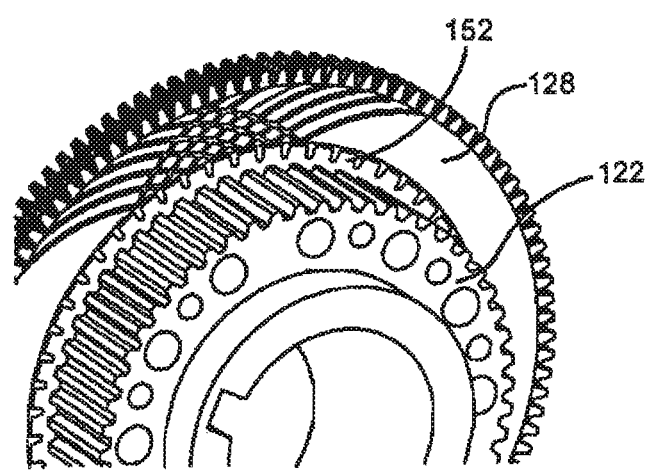
FIG. 21 is an isometric view of a hub, Belleville spring and clutch discs similar to that shown in FIG. 20.
Figure 22:
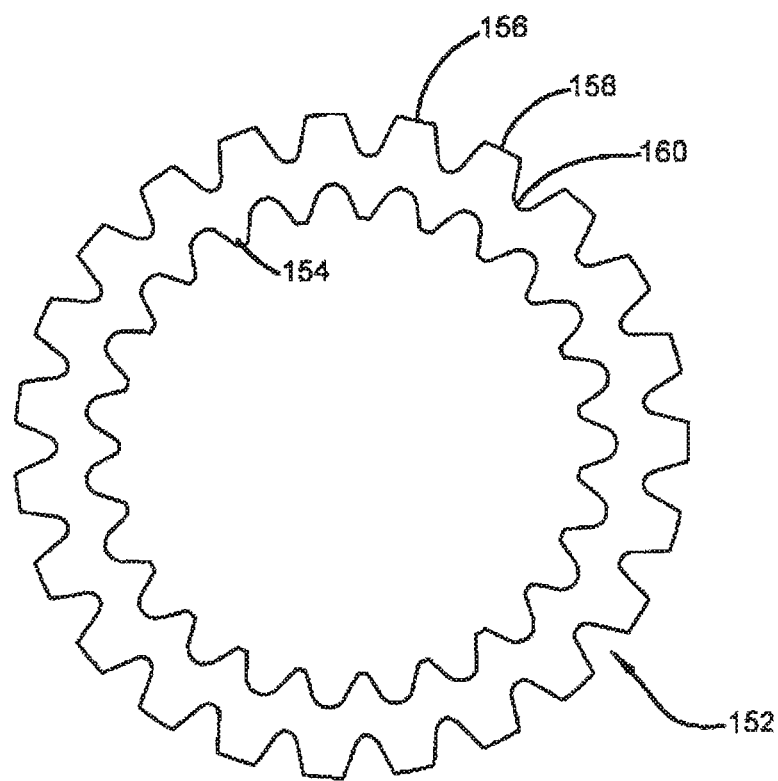
FIG. 22 is a plan view of an exemplary serrated Belleville spring.

In the exemplary embodiment of slipping clutch 94, the adjacent separator discs 124 and clutch discs 128 are biased away from one another by springs. In the exemplary arrangement the springs comprise serrated Belleville springs such as spring 152 shown in FIG. 22. The exemplary Belleville spring 152 includes a toothed serrated contour on its inner diameter 154 that conforms to the splined contour of hub portion 122. This contour enables the spring to move in the axial direction relative to the hub portion during actuation of the clutch and compression of the spring, while preventing rotational movement relative to the hub portion. This is shown in greater detail in FIGS. 20 and 21.

The exemplary serrated Belleville spring configuration 152 further includes an outer diameter having a serrated contour 156. The serrated contour includes projections 158 and recesses 160. The projections 158 provide the effect of fins for purposes of facilitating heat transfer. The recesses 160 provide for allowing fluid flow radially outward across the springs. The exemplary springs further include in cross section a consistent outwardly angled or canted contour in one direction.

Figure 23:
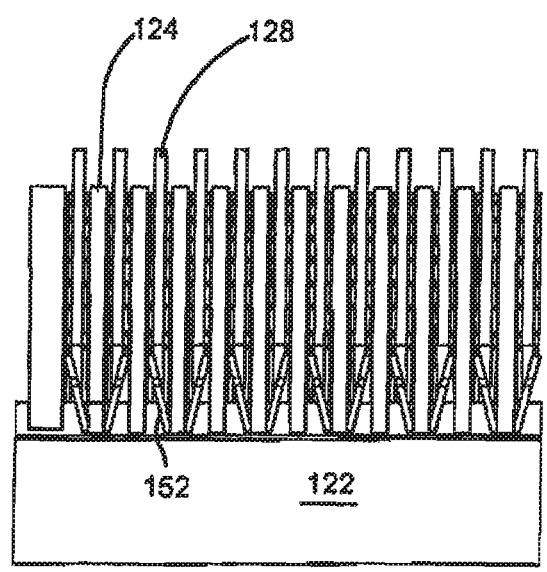
FIG. 23 is a side cross-sectional view of a plurality of clutch discs and separator discs where serrated Belleville springs extend intermediate of the separator discs.

FIG. 23 shows a cross-sectional view of the arrangement of springs 152, separator discs 124 and clutch discs 128 of an exemplary embodiment. As shown in the exemplary arrangement, the springs 152 are arranged in sequentially opposite canted directions in the disc pack. This approach is used to provide more balanced separating forces applied by the springs to the adjacent separator discs. Thus as can be appreciated from FIG. 23, the exemplary arrangement operates to maintain clutch discs and separator discs spaced apart in the disengaged condition of the clutch. However, with movement of the piston 132 to engage the clutch, the force of the piston overcomes the force of the springs 152 to cause the clutch discs and separator discs to move closer together. As this happens, the transmitted rotational torque initially due to shear forces of the liquid causes increased fluid coupling effects and rotational and torque transmission while the discs "slip" relative to one another. Bringing the discs into closer proximity through selective movement of the piston in slip positions increases the amount of torque that is transmitted solely by fluid effects. The transmission of rotational movement is increased as the clutch discs and separator discs begin to contact and press against one another. The torque of the engine is fully transmitted when the piston has compressed the discs in engaged relation to the maximum extent and the clutch and separator discs are rotating in unison. Of course it should be understood that these approaches are exemplary and in other embodiments other arrangements may be used. Further it should be understood that while in the exemplary embodiment the driver device is in fixed operative rotational connection with the disc housing and the driven device is in fixed operative rotational connection with the shaft, in other clutch arrangements the relationships may be reversed.

Figure 24:
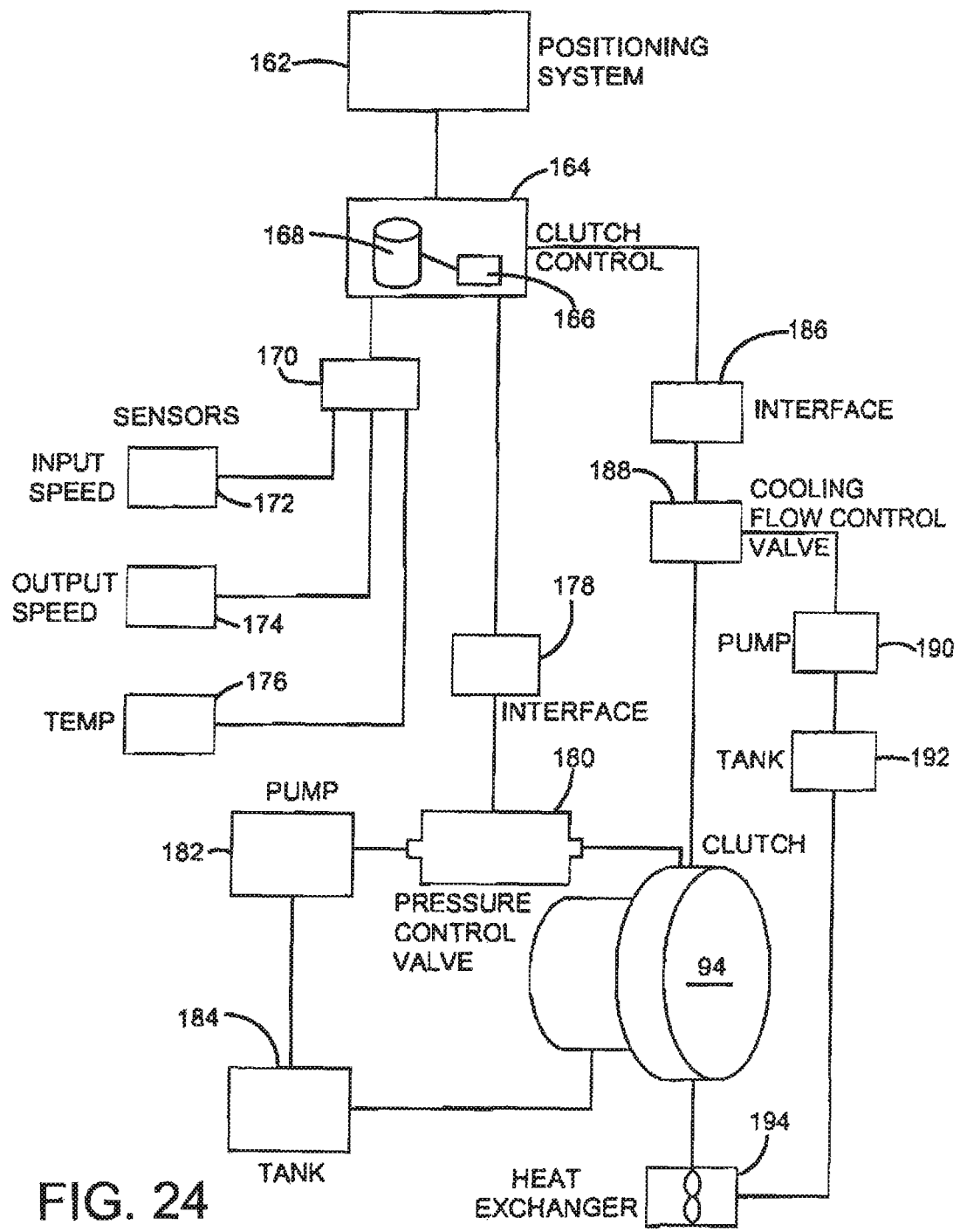
FIG. 24 is a schematic view of an exemplary control system for a slipping clutch.

FIG. 24 shows schematically an exemplary control system that is used to control the operation of a slipping clutch such as clutch 94. As previously discussed, the slipping clutch may be particularly useful in applications where the driver device advantageously operates at a higher speed and at least one driven device operates at a substantially lower speed. One exemplary application of this type is in the ship example previously discussed where the engine advantageously operates a water pump for pumping firefighting water at a high speed while the thrusters are operated by the engine at a much lower speed as a result of slipping of the clutch. Of course this is only one of many such applications where approaches of this type are advantageously used.

In the ship used for firefighting example, the ship will commonly be equipped with a GPS positioning system such as the one schematically indicated 162 in FIG. 24. Such a positioning system may communicate with GPS satellites to determine the position of the ship. Further in the exemplary arrangement the positioning system may operate to resolve the commands necessary to control the ship's thrusters in order for the ship to hold a particular position despite the effects of wind, waves, fire nozzle thrust and other things that may be acting to try to move the ship. As can be appreciated, the exemplary positioning system includes control circuitry including processors, data stores with computer executable instructions and other appropriate electronic components. The system determines the desired position to be held and resolves the necessary messages to be issued to the different electronically controlled components of the ship so as to accomplish holding the ship in the desired position. Of course it should be understood that this may be but one function of such a positioning system, and many other functions may be capable of being carried out depending on the nature of the positioning system and its programming.

As represented in FIG. 24, the positioning system is operatively connected to clutch control circuitry 164. The exemplary control circuitry which is alternatively referred to herein as a circuit, may include one or more of a microprocessor, CPU, FPGA, ASIC or other type of circuit that is capable of executing instructions. The data store may include one or more of a volatile or nonvolatile memory device or medium including RAM, CD, DVD, flash memory, hard drive, solid state drive, magnetic memory, optical storage memory or other medium which data and/or machine executable instructions can be stored. The clutch control circuitry of the exemplary embodiment includes one or more microprocessors 166. The clutch control circuitry also includes one or more data stores 168. Data stores 168 may be any one of the different types of media suitable for storing thereon computer executable instructions and computer readable data. Such data stores in exemplary embodiments may include, for example, hard drives, solid state memories, programmable read-only memories, random access memory or other similar computer readable media.

In the exemplary embodiment the clutch control circuitry is connected through one or more interfaces 170 with sensing devices schematically represented 172, 174 and 176. In the exemplary arrangement sensor 172 is operative to sense the input speed of the slipping clutch. This may be done by determining the rotational speed of the engine. Alternatively this may be accomplished by sensing the rotational speed of one or more components in the gear box or other mechanism that rotates at a speed that corresponds to the speed of the engine.

Sensing device 174 senses the output speed of a component that corresponds to output speed of the shaft of the clutch. The output speed sensor may include a sensor that senses one or more elements on the output shaft. Alternatively it can sense elements moving on or with couplings, drive shafts or other suitable components whose speed corresponds to the speed of the clutch shaft.

Sensor 176 comprises one or more temperature sensors. This temperature sensor may be operative to sense the temperature of one or more different components or items associated with the clutch. For example, the temperature sensor may sense the external or internal housing temperature. Alternatively or in addition, sensors may sense the temperature of the transmission fluid/cooling oil in or after leaving the housing. Other sensors may sense the temperature of transmission fluid/cooling oil that is entering the clutch housing. Other sensors may sense the temperature of the fluid used to activate the clutch. Alternatively other sensors may sense the temperature at the surface of clutch discs or other components. Numerous different types of sensors may be used for such purposes.

It should be understood that the sensing devices discussed are exemplary and in other arrangements different, additional or other types of sensors may be included to sense parameters that are desirably sensed for purposes of controlling the slipping clutch.

The exemplary clutch control circuitry is further in operative connection with an interface 178. Interface 178 is in operative connection with a pressure control valve 180. The pressure control valve 180 is a hydraulic control valve. In the exemplary embodiment valve 180 operates to control the fluid pressure that is applied in the actuator fluid passage to move the piston 132 so as to relatively axially position the clutch and separator discs. Valve 180 is operative to control hydraulic fluid pressure supplied by a pump 182 that is applied to the actuator fluid passage 140 which controls movement of the piston within the clutch 94. Pump 182 is supplied with hydraulic fluid from a tank 184. Tank 184 receives hydraulic fluid from the drain ports of the fluid coupling which is in connection with the shaft of the clutch. Of course it should be understood that this fluid circuit is exemplary and in other embodiments other approaches may be used.

The clutch control circuitry 164 is also in operative connection with an interface 186. Interface 186 is in operative connection with a cooling flow control valve 188. Valve 188 controls the flow rate of transmission fluid through the transmission fluid passage and the disc pack of the clutch. Flow control valve 188 is supplied with transmission fluid by a pump 190. Pump 190 is supplied with fluid from a holding tank 192. Holding tank 192 is supplied with liquid that is drained from the clutch housing. Further as shown in this exemplary fluid circuit, a heat exchanger 194 may be included in the fluid circuit to cool and maintain the temperature of the transmission fluid/cooling oil in a temperature range that provides for efficient operation of the clutch and which minimizes wear on the clutch components.

In the exemplary arrangement the positioning system is operated to hold the position of the ship and communicates with the clutch control circuitry to operate the thrusters at the speed necessary to hold the ship at the desired position. Of course it should be understood that while the system shown in FIG. 24 operates to control the speed of the output shaft of the clutch and thus the speed of the associated thrusters, the positioning system of an exemplary embodiment would also be in communication with appropriate circuitry and control systems that control the direction in which the thrusters are pointed.

The control circuitry 164 responds to the electrical commands of positioning system 162 to speed up or slow down the output shaft of the clutch so as to cause the thrusters to operate at the speed necessary to hold the desired position. In doing this, the clutch control circuitry uses the information from the sensors to monitor input speed, the output speed and the temperature and other parameters associated with the clutch. The control circuitry then operates to send signals which control the pressure control valve as desired to change the output speed of the clutch. In addition in the exemplary arrangement the clutch control also operates to control the rate of transmission fluid/cooling oil through the clutch so as to maintain the temperature of the clutch at the desired level for purposes of allowing the clutch to slip while still providing the desired degree of torque transmission.

Further in some exemplary arrangements the control circuitry may operate to cease cooling the transmission fluid and/or control or stop the flow of transmission fluid under appropriate conditions by controlling one or more transmission fluid handling components. For example, in circumstances in which slipping or partial engagement of the clutch causes high heat generation, the control circuitry may operate in accordance with its programming to send control signals through appropriate interfaces to cause the heat exchanger fan or other cooling device to operate at maximum cooling capability. In addition the control circuitry may cause the pump and cooling flow control valve to operate at high flow. If the clutch condition is changed so it is fully engaged (or alternatively fully disengaged) the amount of heat generated by the clutch is reduced. In response to sensing the lower temperature the exemplary control circuitry may operate in accordance with its programming to reduce the speed or stop the fan or other cooling device associated with the heat exchanger. Alternatively or in addition, the control circuitry may cause the pump to operate at a slower speed and/or change the condition of the flow control valve to provide less flow of transmission fluid through the clutch. Upon further cooling of the clutch the exemplary control circuitry may operate to shut off the heat exchanger cooling device, the pump and/or the valve. Taking such actions when cooling is not needed can be done to save energy and to reduce operating time and wear of the fluid handling components. Of course these approaches are exemplary and other control systems may control clutch temperature via different methods of operation.

Of course as can be appreciated, if the positioning system senses that the ship is moving away from the desired position despite the current speed of rotation of the associated thruster, the positioning system will cause the clutch control circuitry to increase the speed of the output shaft of the clutch. Likewise if the positioning system determines that the thrusters are providing more thrust than is necessary to hold the ship in the desired position, the positioning system will send signals which cause the control circuitry to provide greater slipping of the clutch and thus lower the speed of rotation to the associated azimuth thruster. Of course it should be understood that the control system is exemplary and the description is simplified, and in other arrangements, other approaches may be used.

An advantage of the exemplary slipping clutch and ship drive control system of the exemplary embodiment is that it can avoid the need for additional equipment that would otherwise be needed to accomplish the same function. The exemplary system can also accomplish the slipping and control functions more effectively than other approaches. Specifically some arrangements may include an intermediate transmission device between the engine and the thruster. Such an intermediate device often adds considerably more weight to the drive system for the ship, which can be undesirable. In addition, such intermediate transmission devices consume energy which can lower efficiencies. A further issue that is sometimes encountered is that the use of such an intermediate device can result in additional drive shafts and driven shafts as well as universal joints to connect the intermediate device to the driving and driven members. Such additional shafts and universal joints also can lower efficiencies. These disadvantages can be reduced through the use of the exemplary clutches and systems that have been described.

Figure 25:
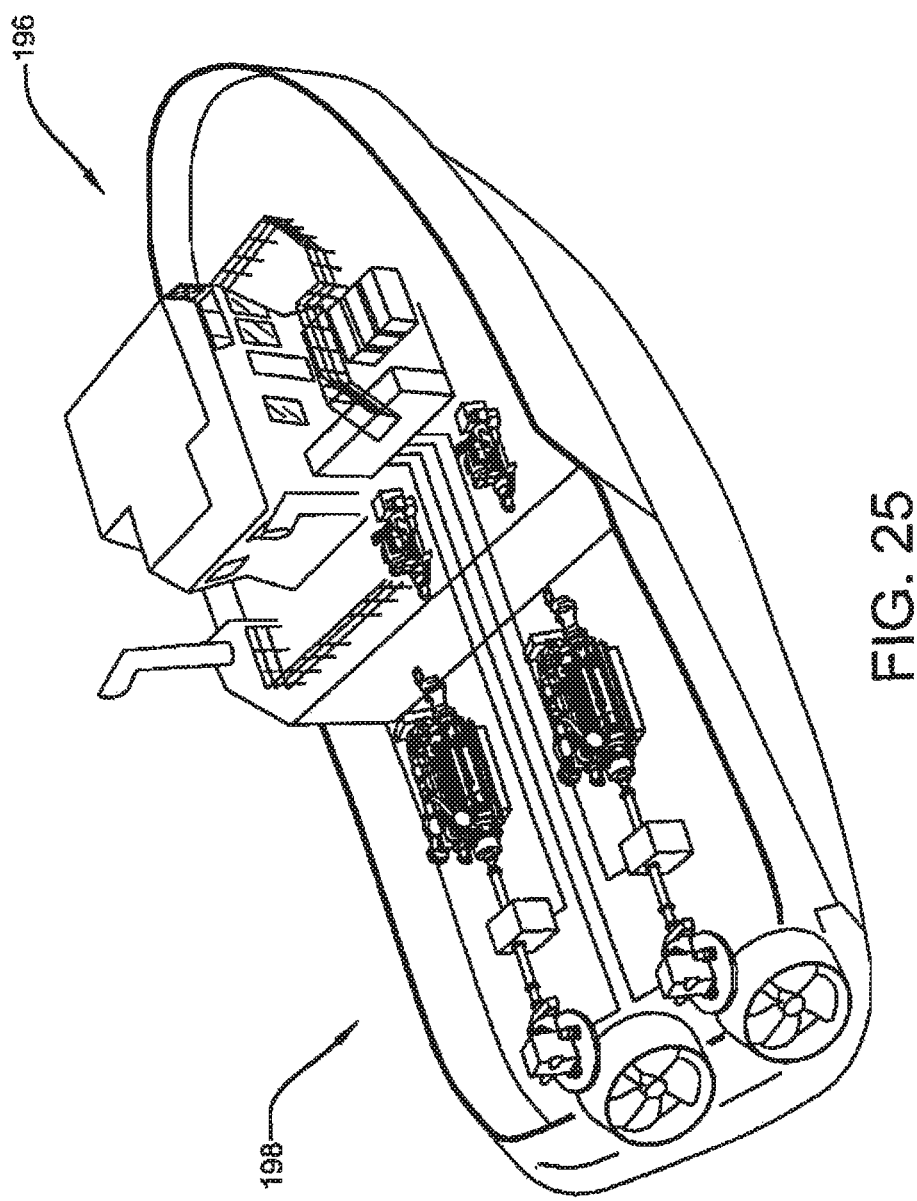
FIG. 25 is a schematic view of a ship including an exemplary hybrid drive system.

FIG. 25 shows a schematic transparent view of a ship 196. Ship 196 includes a diesel electric hybrid drive system generally indicated 198. The exemplary hybrid drive system is shown in greater detail in FIG. 26. The hybrid drive system includes azimuth thrusters 200 which may be similar to those previously described. Like the previously described thrusters, the angle of the thrusters is selectively controllable. Each of the thrusters are driven through a respective gear box 202. The gear box 202 is driven through a clutch 204.

Each thruster gear box is operatively connected to a motor generator 206. Each motor generator is connected through a shaft to an engine 208 such as a diesel engine. The engine 208 is operatively connected to the motor generator through a clutch 210. In this exemplary arrangement, clutch 210 may be similar to clutch 34 previously described. Clutch 210 in the exemplary embodiment generally is not a slipping clutch. However, it should be understood that in other arrangements slipping clutches or other types of clutches may be used.

Figure 26:
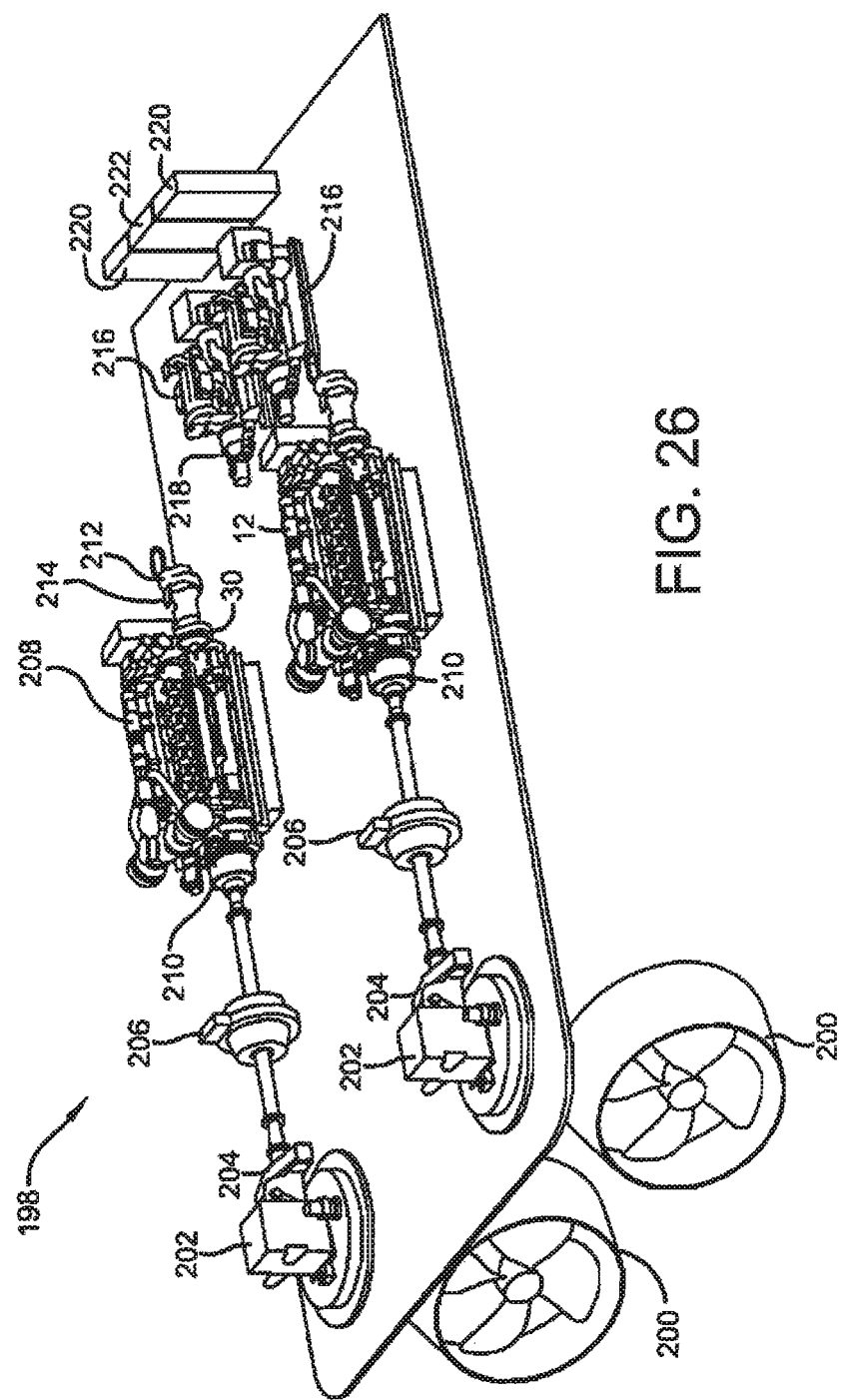
FIG. 26 is an exemplary schematic view of an engine room including a hybrid drive system.

As further represented in FIG. 26, each of the diesel engines 208 is operative to drive a firefighting pump 212. Each of the firefighting pumps are operatively connected to the engine through a respective clutch 214.

The exemplary arrangement further includes generator sets 216. Each generator set 216 includes a diesel engine and an electric generator. Each electric generator is in operative connection with the engine through a clutch 218. The exemplary system further includes battery packs 220 as well as control circuitry 222. Of course it should be understood that these components of the hybrid drive system 198 are exemplary and in other arrangements, different, other or additional components may also be included. Some exemplary arrangements may utilize features like those described in U.S. patent application Ser. No. 15/333,992 filed Oct. 25, 2016 the disclosure of which is incorporated herein by reference in its entirety.

In operation, the hybrid drive system may operate in a number of different modes. For example in one mode of operation, a diesel engine 208 may drive an azimuth thruster by engaging clutches 210 and 204. In such circumstances the intermediate motor generator 208 may be freewheeling. Alternatively in other circumstances the motor generator may be loaded so as to generate electricity from the rotation provided by the diesel engine 208.

In an alternative mode of operation, a thruster may be driven through operation of a motor generator 206. In these circumstances clutch 210 may be disengaged while clutch 204 on the azimuth thruster may be engaged. In this condition the motor generator which is supplied with power either from the generator sets 216 or from the batteries 220 may operate to power the thruster.

In still another arrangement which is similar, the clutch 214 which drives the firefighting pump 212 could be engaged while clutch 210 is disengaged and the thruster is driven by the motor generator 206. In this condition, the firefighting pump capacity is controlled by the speed of the engine 208 while the speed of the azimuth thruster is controlled by the speed of the motor generator. This can provide for totally independent and different speeds for the firefighting pump and the azimuth thruster without the need for a slipping clutch.

In still another alternative arrangement of the system shown, the clutch 204 on the azimuth thruster may be disengaged while clutch 210 which connects the engine 208 and the motor generator 206 is engaged. In this condition the engine 208 can be used to drive the motor generator so as to produce electricity.

As can be appreciated, this exemplary hybrid drive system arrangement provides many different optional operating configurations which can be used to best serve the particular functions that are needed for a given ship condition or other operating environment. Of course as can be appreciated the approaches described are exemplary and in other embodiments, other approaches may be used.

Figure 27:
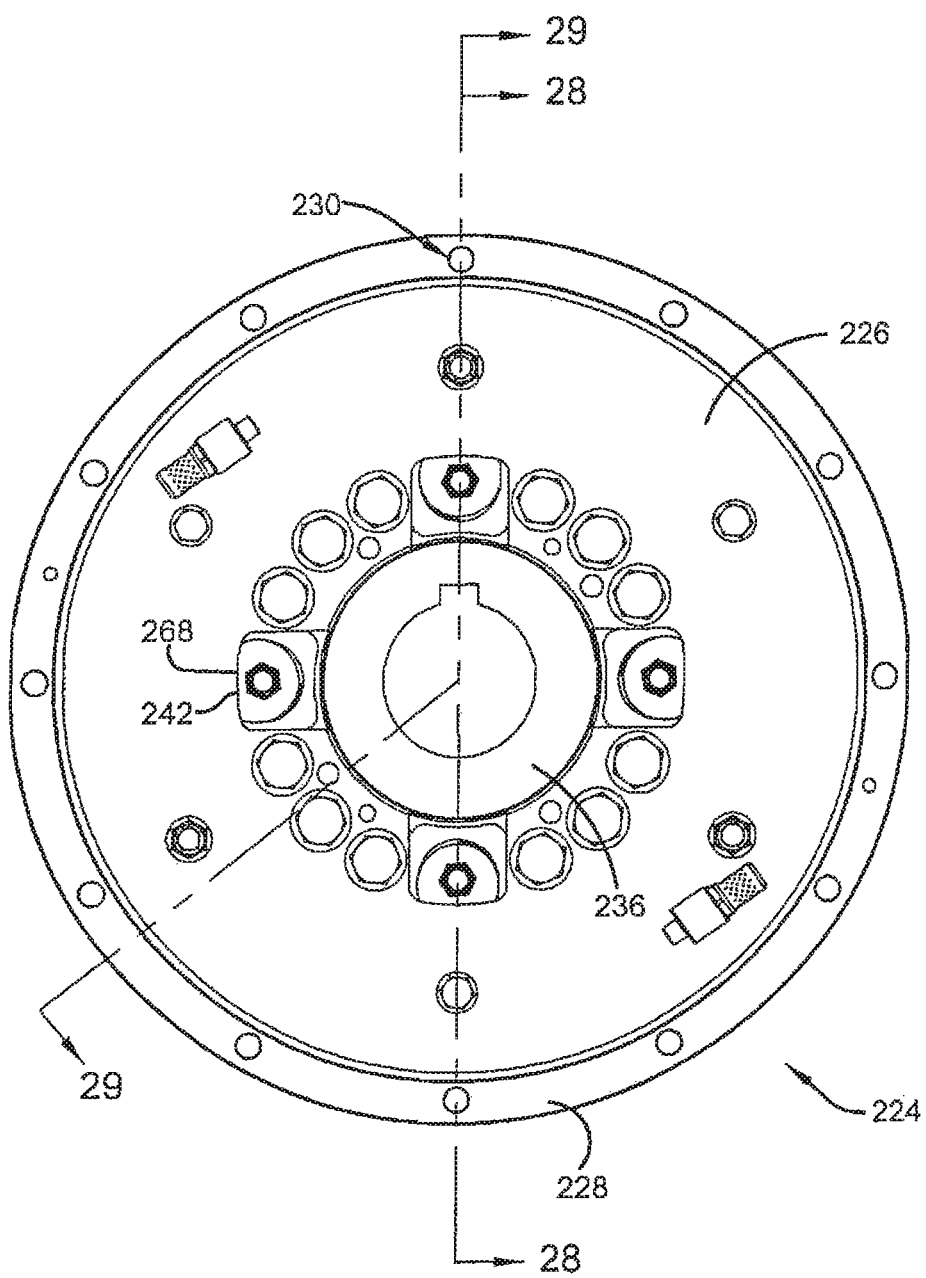
FIG. 27 is a rear plan view of an air-cooled clutch of an alternative exemplary embodiment.
Figure 28:
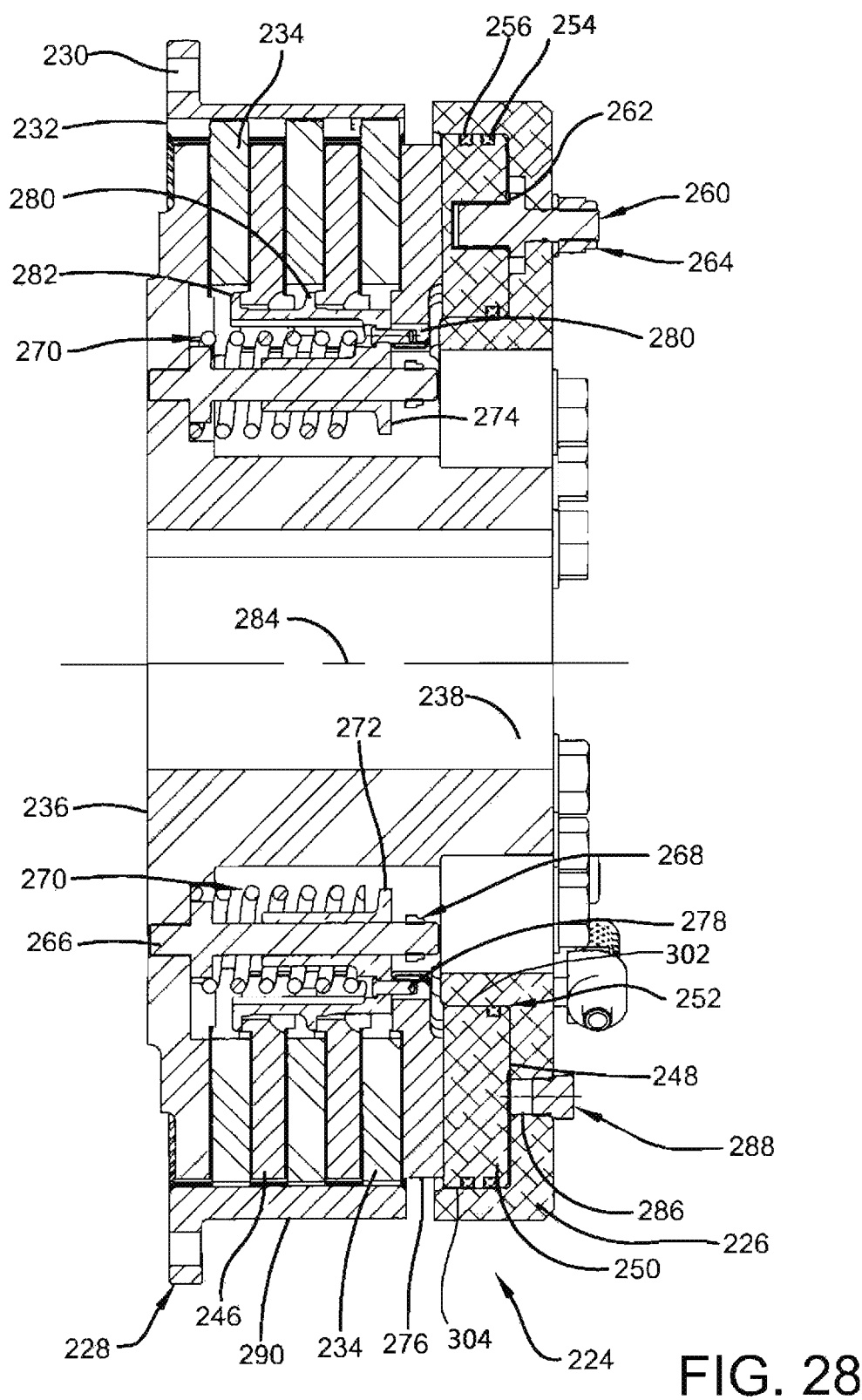
FIG. 28 is a cross-sectional view of the air-cooled clutch taken along line 28-28 in FIG. 27.
Figure 29:
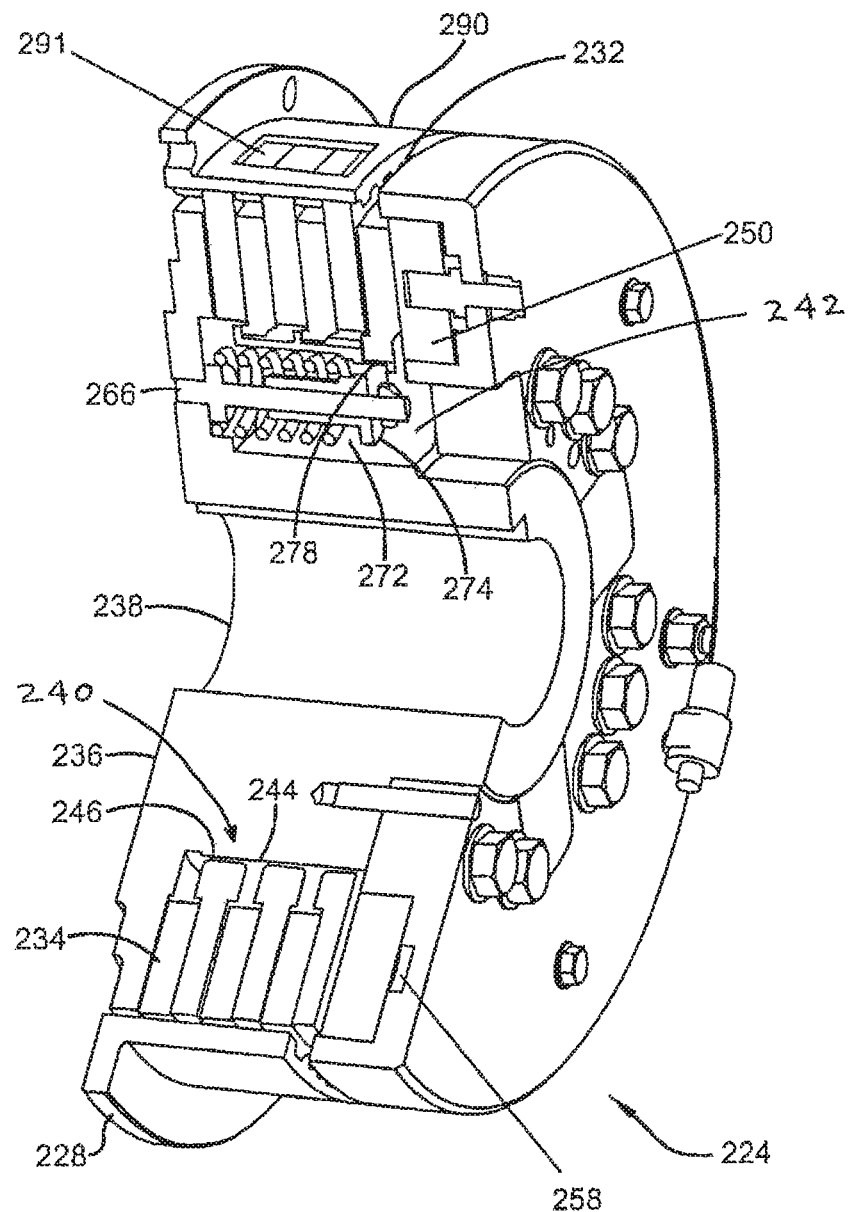
FIG. 29 is a sectional view taken along line 29-29 in FIG. 27.

FIGS. 27-29 show yet another exemplary embodiment of a clutch 224. Clutch 224 is configured to be actuated through the application of compressed air rather than liquid hydraulic fluid, however the principles may be applied to clutches actuated in either manner. Further the exemplary clutch 224 is configured to provide enhanced air cooling as well as other features that enable the clutch to be advantageously used in many different types of power transmission applications.

Clutch 224 includes a housing 226. Housing 226 is a generally cylindrical housing. The clutch includes a drive ring 228. Drive ring 228 includes a plurality of openings 230 configured for extending fasteners therethrough. The drive ring may be connected in fixed operative engagement with a driver member such as a rotating member connected to an engine or to a driven member such as a pump, generator or other structure so as to selectively transmit rotational energy thereto.

The drive ring of the clutch housing further includes a splined annular surface 232. Splined surface 232 has a toothed configuration so as to matingly engage with the toothed annular outer circumference configuration of friction clutch discs 234. The splined annular surface 232 includes a plurality of radially inward facing outer splines that are elongated and enable the clutch discs to axially move in engagement therewith. Clutch 224 further includes a hub portion 236. Hub portion 236 includes a bore 238 that in an exemplary embodiment is configured to receive a shaft therethrough. The shaft, hub and housing are rotatable about an axis 284.

Hub 236 includes four discrete splined angularly spaced arcuate segments 240. The arcuate segments extend between air containing openings 242. The arcuate segments each have axially splined toothed surfaces 244. The toothed surfaces have radially outwardly directed inner splines that are configured to engage the inside annular toothed surface of separator discs 246. Each of the clutch discs 234 have an inner surface that is disposed radially outward from the inner splines, and each of the separator discs 246 have an outer surface that is disposed radially inward from the outer splines. As can be appreciated, the friction clutch discs 234 and the separator discs 246 comprise a disc pack and are enabled to relatively move axially within the housing. The clutch discs move with their toothed circumferential outside surfaces in conforming engagement with outer splines on splined surface 232 while the separator discs 246 move with their circumferential toothed surfaces at the inner surfaces in engagement with the inner splines 244 included in arcuate segments 240.

The housing 226 includes an annular piston cavity 248. An annular piston 250 is configured to be movable axially in the piston cavity 248. Resilient seals 252, 254 provide fluid tight movable engagement between the opposed surfaces of the piston and the wall bounding the piston cavity 248 including inner and outer cavity walls 302, 304. In the exemplary arrangement the seals 252 and 254 are X-shape seals which provide a multi-point sealing engagement arrangement to minimize air loss around the seals and to help assure that the piston supplies the desired level of force when axially compressing the clutch discs and separator discs which make up the disc pack. Further in the exemplary arrangement a wiper seal 256 operatively extends between the outer annular cavity wall of the piston cavity and the piston at the radially outward side of the piston. Wiper seal 256 of the exemplary arrangement serves to reduce the infiltration of debris and other material into the area between the piston cavity and the piston. The wiper seal 256 also helps to avoid debris reaching the inboard seal 254, which debris or other material may wear or otherwise render seal 254 less effective.

The exemplary piston cavity at its enclosed end is in operative connection with a fluid passage 258. Fluid passage 258 may be selectively operatively connected with a source of compressed air, which when pressure is applied, operates to urge the piston 250 to move to the left as shown in FIGS. 28 and 29.

In the exemplary arrangement, the plurality of angularly spaced anti-rotation guide pins 260 extend into the piston cavity and into recesses 262 in piston 250. Pins 260 are held in place by lock nuts 264 or similar structures. The interior cylindrical portions of pins 260 are sized so as to be movable within recesses which are also referred to as guide slots 262 that extend in the piston. As a result, the piston 250 is movable in an axial direction relative to guide pins 260 but is prevented from rotationally relatively moving with respect to the hub portion by the pins 260. This helps to assure transmission of rotational movement. Of course it should be understood that this approach is exemplary and in other arrangements, other approaches may be used.

Guide pins 266 extend axially in engagement with the hub portion in the area of each of the air containing openings 242. Each of the guide pins includes an engageable top portion 268. Top portion 268 includes a hex head or similar suitably configured portion so as to enable the guide pins to be rotated via a tool into threaded or similar fixed engagement with the hub portion. Compression springs 270 extend in surrounding relation of each guide pin 266. Springs 270 operate to bias spacers 272 to the right as shown in FIGS. 28 and 29. Each of spacers 272 include a forward face 274. The forward face biasingly engages the pressure plate 276 and biases the pressure plate and the piston in an axial direction toward the piston cavity. Pressure plate 276 is an annular pressure plate that extends axially intermediate of the piston 250 and a first of the clutch discs 234 in closest proximity to the piston as shown. Projections 278 extend axially outward from each of the spacers and are axially movably engaged in a respective one of recesses 279 which extend in the pressure plate, so as to maintain the rotational positioned alignment of the pressure plate therewith.

In the exemplary embodiment each of the spacers 272 further includes in cross section radially extending fingers 280,282. Fingers 280 and 282 are configured to engage respective separator discs 246 in the areas of the openings. Fingers 280 and 282 bias the separator discs axially in a direction toward the piston and piston cavity. Because the separator discs are biased by the spacers 272 in the four locations of the openings, the separator discs and the pressure plate 276 are generally uniformly axially biased by the springs toward the piston 250.

In operation of an exemplary embodiment, a rotational driver or driven device is operatively engaged with the drive ring 228. For purposes of this example, the operation of the clutch will be described with a driver such as a rotating member attached to an engine in operative connection with the drive ring. The drive ring is rotated by the engine which causes the area of the clutch 224 in operative connection with the drive ring and the spline surface 232 to rotate in fixed direct operative connection therewith.

Rotation of the spline surface 232 causes the friction clutch discs 234 to rotate therewith. The shaft or other driven member that extends in the bore 238 of the hub portion in this example is a driven member in fixed direct operative connection with the driven device. The drive shaft extends along an axis 284 through the hub portion. When air pressure is not applied to the piston cavity, the piston 250 is retracted in the axial direction within the cavity due to the biasing force applied by springs 270 which act on the piston through the spacers 272 which bias the pressure plate 276. Spacers 272 through the fingers 280 and 282 also bias the separator discs 246 toward the pressure plate and the piston. The biasing of the separator discs in the axial direction also causes the clutch discs 234 to be moved in the axial direction.

With compressed air pressure not acting on the piston, forces acting between the clutch discs 234 and the separator discs 236 enable the discs to rotationally move relative to one another. As a result the rotation of the drive ring 228 does not cause the hub portion 236 to rotate. As a result, the shaft or other driven member that extends through the bore 238 of the hub portion is not caused to rotate.

Applying air pressure to the fluid passage 258 causes the piston 250 to move axially to the left as shown in FIGS. 28 and 29. Movement of the piston overcomes the relatively smaller biasing force of the springs 270 and causes the pressure plate 276 to move in the axial direction to the left as shown. Movement of the pressure plate causes the clutch discs and separator discs to be in axially compressed engagement. The compression of the discs in the disc pack causes the discs to be firmly engaged. As a result the driving force applied to the drive ring 228 is effectively transferred through the disc pack to the hub portion 236 which rotates in engagement therewith. This causes the shaft or other member which extends in the bore to also rotate in coordinated relation with the drive ring.

Removing the fluid pressure from the passage 238 leading to the piston cavity releases the force previously applied by the piston 250 to compress the discs. The pressure plate 276 and the friction discs and separator discs 234 and 246 are again moved by the force of the springs so that the discs are no longer in compressed engagement. The force of springs 270 acts through the spacers 272. As a result the clutch discs and separator discs again become relatively rotationally movable and the clutch is disengaged.

The exemplary configuration of the clutch 224 includes a plurality of angularly spaced threaded bores 286. Bores 286 which serve as actuator openings extend from outside of the housing and into the piston cavity 248. Threaded bores 286 are generally fluidly closed by plugs 288 that are at least partially threaded therein. In the exemplary embodiment if conditions arise where it is not possible to supply air pressure to actuate the clutch, the plugs 288 may be removed from the bores 286. Threaded bolts or other pins or similar members may be threaded into the bores 286 so as to engage the back of the annular piston 250. The annular piston 250 may be moved by such members being threaded in the bores so as to axially move the piston in a manner similar to that caused by air pressure so as to engage the clutch. This enables the driving and driven members to be solidly engaged even in situations where the clutch could not be engaged in the normal manner. This approach is highly useful in emergency situations where the clutch can be engaged on a manual basis. Further the solid piston construction of the exemplary arrangement enables the use of this emergency technique for purposes of actuating the clutch.

In some exemplary arrangements to provide additional cooling of the clutch discs, the annular area 290 of the drive ring and the spline surface 232 may include one or more slotted openings 291. The slotted air containing openings may extend in the circumferential direction circumferentially across the splines of surface 232. Alternatively or in addition the air containing openings may extend in a direction parallel to the axis. In some arrangements such opening may span more than one clutch disc. The openings may provide passages for air flow through the clutch to facilitate the cooling of the discs. In addition such openings may also provide a means for debris and other material that is generated by the action of the clutch to escape from the interior of the housing. This may facilitate the reliable operation of the clutch under high temperature and other extreme operating conditions. Further in some exemplary arrangements provisions may be made for air containing passages or other suitable grooving arrangements through the discs or other surfaces to help facilitate cooling in the areas of the friction and separator discs. In other exemplary arrangements fins may be utilized to establish greater air movement through the air containing spaces. Of course the approaches used can be varied depending on the operating environment in which the clutch is utilized.

Figure 30:
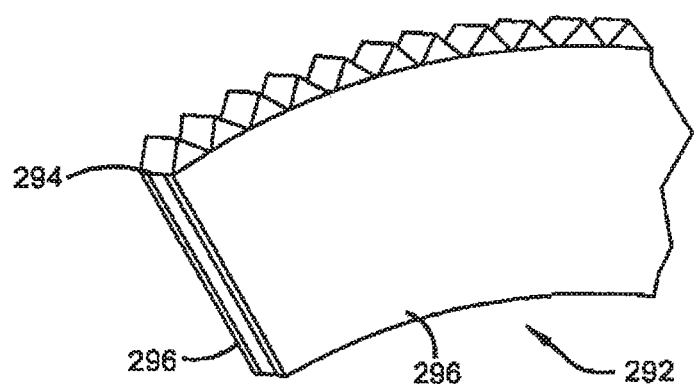
FIG. 30 is an isometric view of a segment of an exemplary molded composite clutch disc of an exemplary embodiment suitable for use in connection with the clutch shown in FIG. 27.
Figure 31:
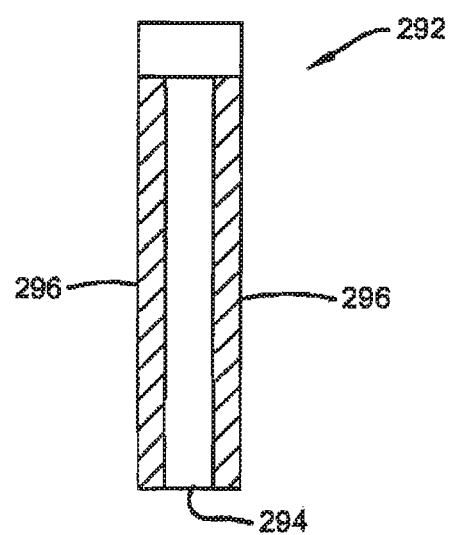
FIG. 31 is a cross-sectional view of the composite clutch disc shown in FIG. 30.

In some exemplary embodiments of the clutch 224, clutch discs of the type shown in FIGS. 30 and 31 may be used. Clutch discs 292 are of a unitary molded composite construction which is comprised of two different materials. A core portion 294 is comprised of a fiber reinforced polymer material. Core 294 includes the central disc portion as well as the teeth of the toothed outer annular portion engage an annular splined surface such as spline surface 232 of clutch 224. In exemplary embodiments the core 294 may be comprised of carbon or glass fiber reinforced polymers which provide for a rigid, strong and lightweight torque transmitting structure for the disc.

The exemplary clutch disc 292 further includes a pair of annular opposed molded friction surfaces 296. Friction surfaces 296 are comprised of molded high friction material which includes suitable carbon fibers or other types of materials that provide high friction engagement between the friction surfaces and the adjacent separator discs. In the exemplary embodiment the clutch discs 292 may be manufactured via pressurized molding operations that cause the constituents which make up the core and friction surfaces be bound together in a strong unitary disc structure that is able to withstand high temperatures, pressures and the rotational forces which are encountered in a clutch disc environment.

Further a useful aspect of the exemplary clutch disc structure is that it may be dimensioned so as to be a direct replacement for other types of clutch discs that are made of separately assembled support and friction elements. Of course it should be understood that these features are exemplary and in other embodiments other approaches may be used.

Figure 37:
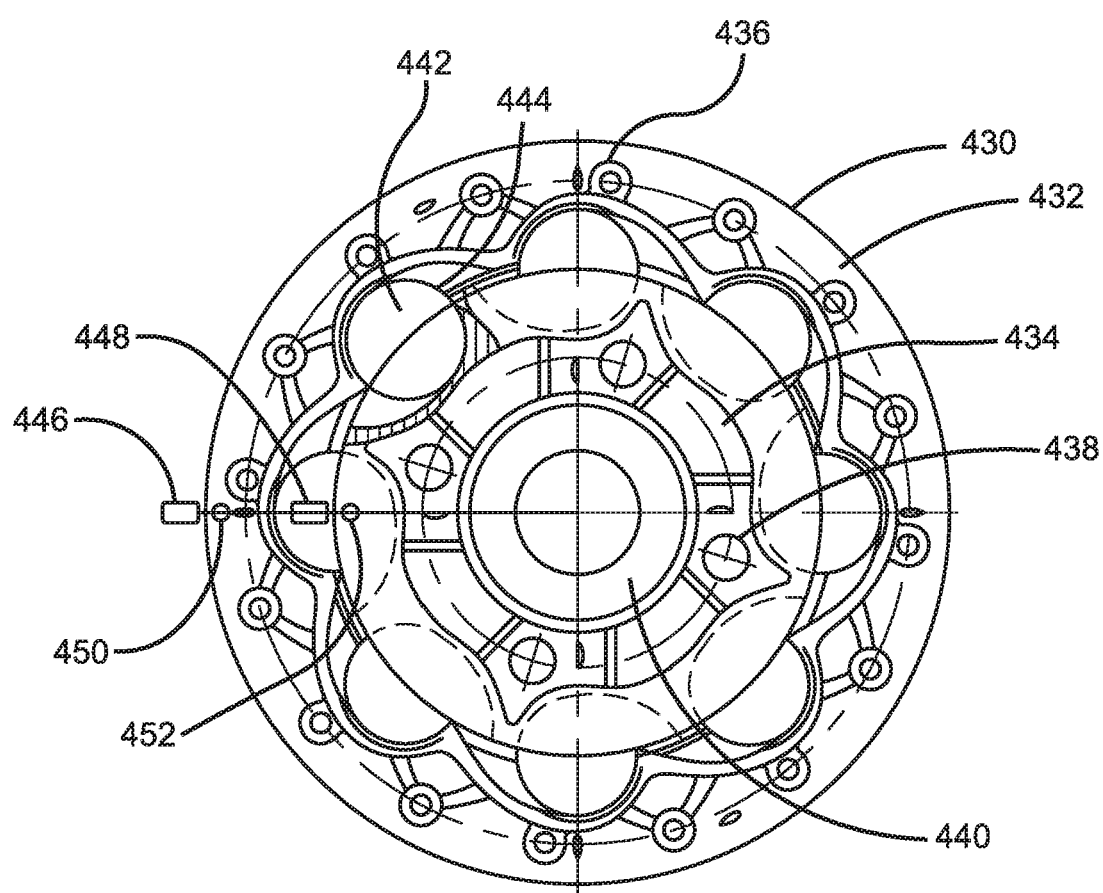
FIG. 37 is a front view of an exemplary vibration damping coupling that may be used with clutches of some exemplary embodiments.
Figure 38:
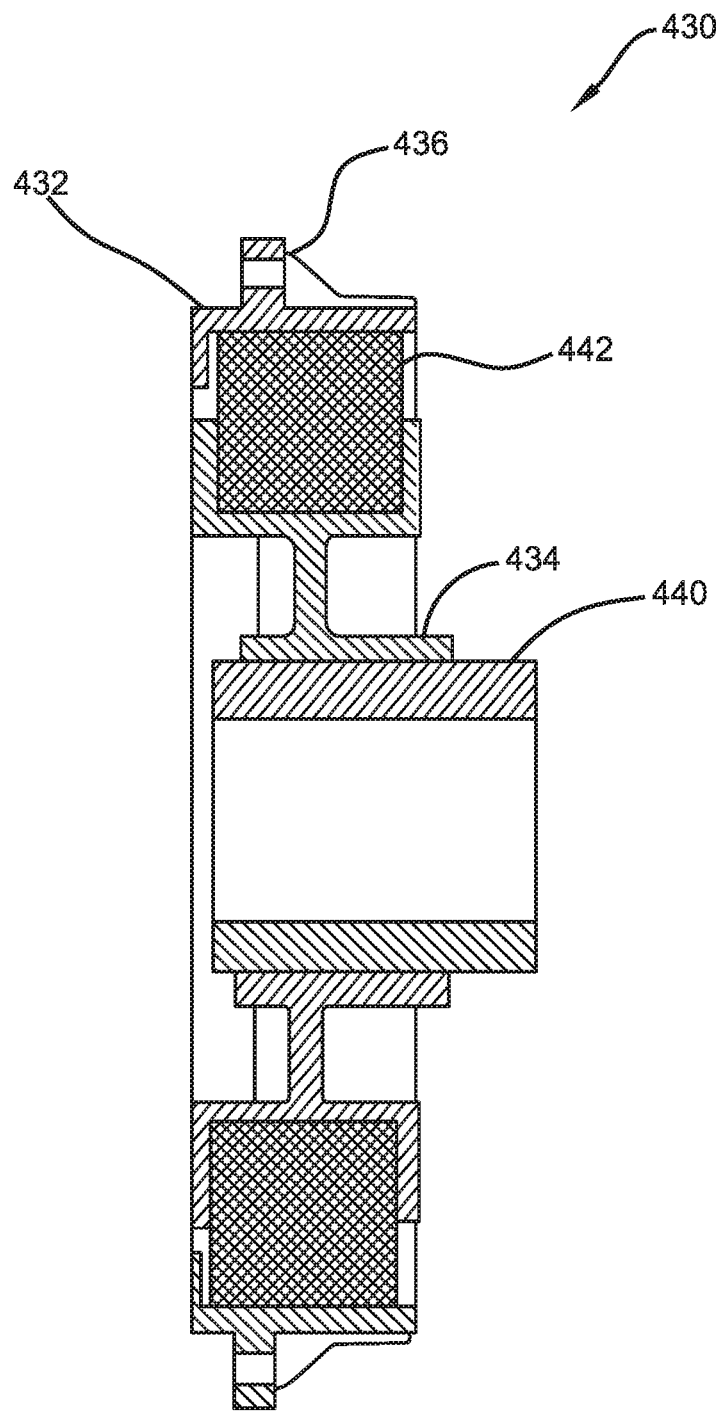
FIG. 38 is a diametrical cross-sectional view of the coupling shown in FIG. 37

FIG. 37 shows an exemplary vibration damping coupling 430. Coupling 430 may be used in systems in a manner similar to coupling 116 previously discussed. Vibration damping coupling 430 includes a first portion 432. First portion 432 is an outer annular portion of the coupling and is configured to be attached in direct operative connection with a driver member such as the flywheel of an engine. Coupling 116 further includes a second portion 434. Portion 434 comprises an inner portion and is configured for direct operative connection with the driven device such as a propeller, a grinder, a wood chipper, mixer, pump, winch or other load, through the clutch. In the exemplary arrangement portion 432 is rotationally movable relative to portion 434. Outer portion 432 includes openings 436 that are used with fasteners to connect the outer portion to the flywheel or other driver member. Inner portion 434 includes openings 438 that are used with fasteners for connecting the inner portion to the clutch and driven member. The inner portion 434 also includes a hub 440. The hub 440 is suitable for engaging components of the clutch or other driven member.

The exemplary coupling 430 further includes a plurality of resilient bodies 442. In the exemplary arrangement the resilient bodies are comprised of a plurality of cylindrical rollers. The rollers extend in cylindrical openings between the outer portion 432 and the inner portion 434, and operatively engage such portions so that they rotate together. In the exemplary arrangement the resilient bodies 442 provide for deflection and vibration absorption so as to reduce the transmission of knock and vibration forces from the driver member such as an engine, to the driven member through the clutch. Of course it should be understood that this coupling configuration is but one of many different types of vibration damping coupling constructions that may be used.

In the exemplary arrangement coupling status sensors 446, 448 are positioned adjacent to coupling 430. The coupling status sensors are operative to detect at least one condition corresponding to the deformation of the resilient bodies 442. In the exemplary arrangement the coupling status sensors are operative to detect the relative rotational positions of the inner portion 434 and the outer portion 432. In the exemplary arrangement the sensors may include Hall Effect sensors that are operative to detect bodies with magnetic properties that move in adjacent relation to the sensor. In the exemplary arrangement an indicator 450 is in attached connection with outer portion 432. An indicator 452 is in attached connection with inner portion 434. Each of the respective sensors 446, 448 are operative to detect when the respective indicator is positioned adjacent thereto and to produce signals responsive thereto. This enables the coupling status sensors to detect the extent to which the resilient bodies 442 are currently compressed. This is accomplished in the exemplary arrangement by determining the amount that the signal from the sensor 448 is lagging behind the signal from the sensor 446.

As can be appreciated, because the outer portion 432 is attached to the driver device, and the inner portion 434 is attached through the clutch to the load, the applied loading on the inner portion 434 will cause compression of the bodies 442 that operatively connect the inner and outer portions of the coupling. The greater the force of the load the more the bodies 442 are compressed. The more the bodies are compressed the greater the lag between when the indicator 450 on the outer portion of the coupling is sensed by the sensor 446 and when the indicator 452 on the inner portion 434 is sensed by the sensor 448. In exemplary embodiments this ability to analyze the signals from the coupling status sensors enables determining the deformation of the resilient bodies as well as the magnitude of the load that is currently being applied by the driven device.

It should further be understood that in an exemplary arrangement the coupling status sensors may also be used for purposes of determining the level of wear of the coupling as well as coupling malfunctions. For example if a condition is detected where the outer portion 432 is rotating but the inner portion 434 is not, then this is an indication that the coupling has broken. Further, excessive relative movement of the inner and outer portions may be indicative of a wear condition and an impending failure of the coupling. Numerous different conditions may be detected through analysis of the signals which are received from the coupling status sensors. Of course this approach to sensing the deformation of the resilient bodies in the coupling is exemplary and in other embodiments other approaches may be used.

Figure 39:
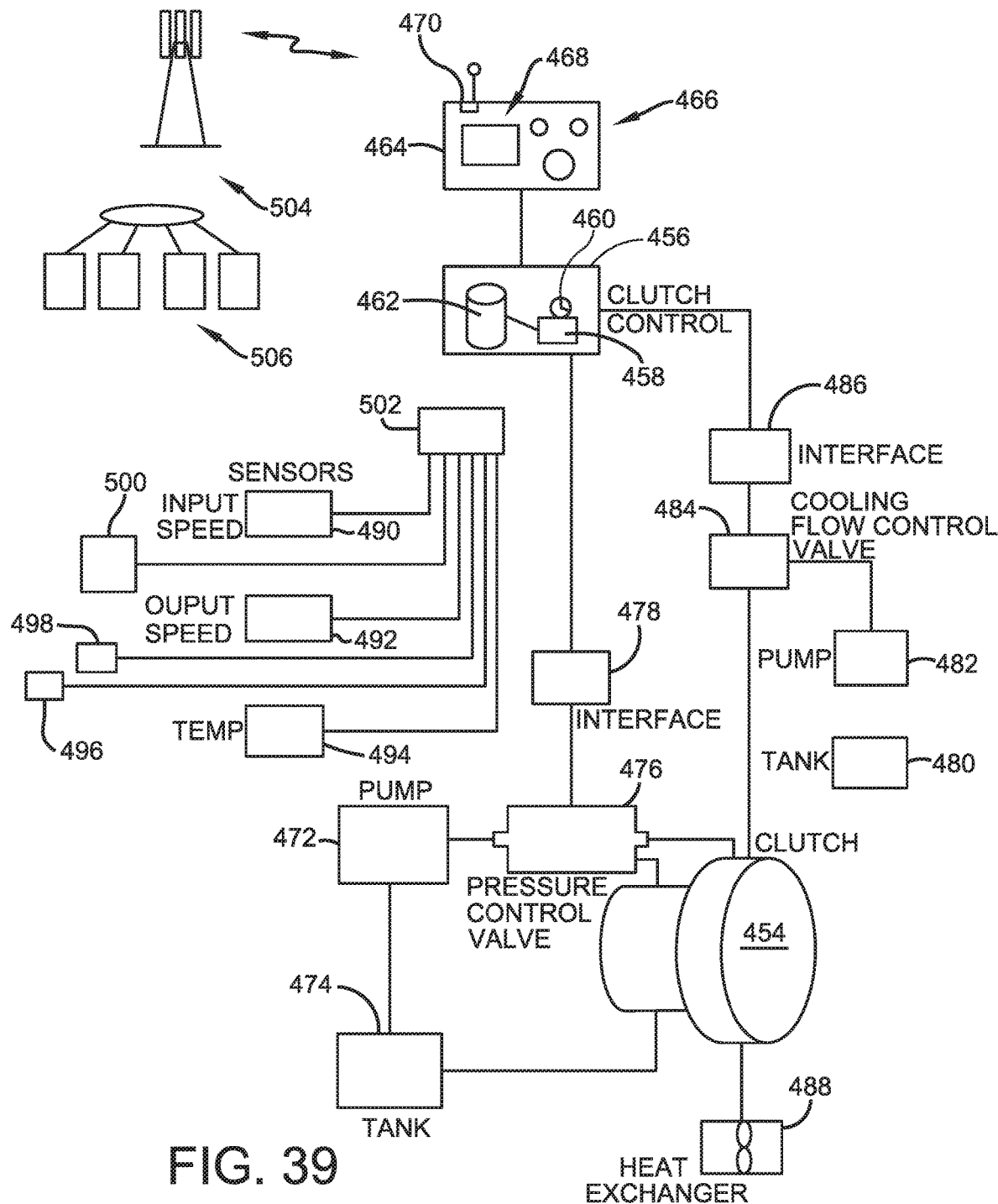
FIG. 39 is a schematic view of an exemplary control system for operation of a clutch.
Figure 40:
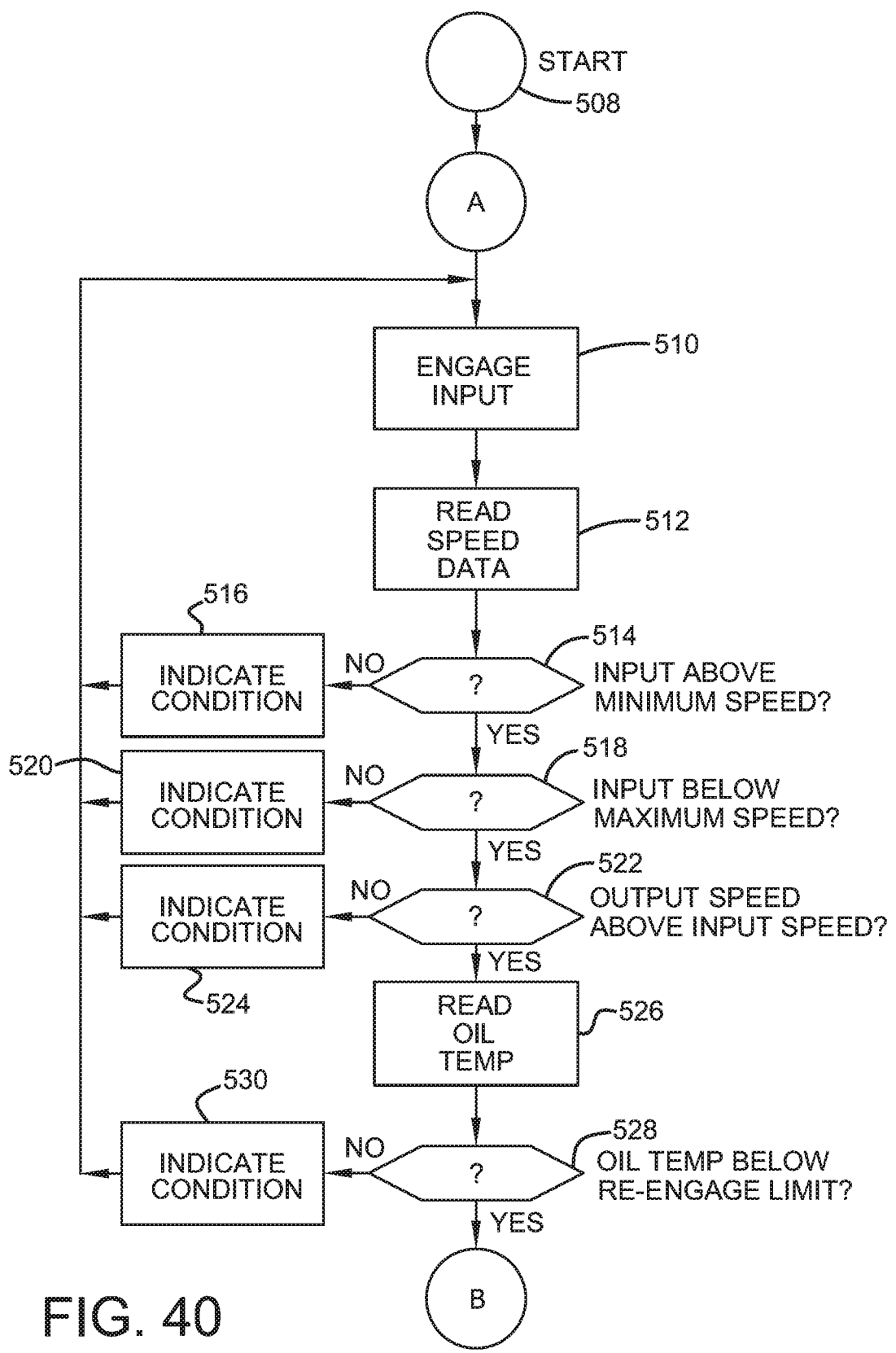
FIGS. 40-46 are a schematic representation of exemplary control logic carried out by an exemplary clutch control system.
Figure 41:
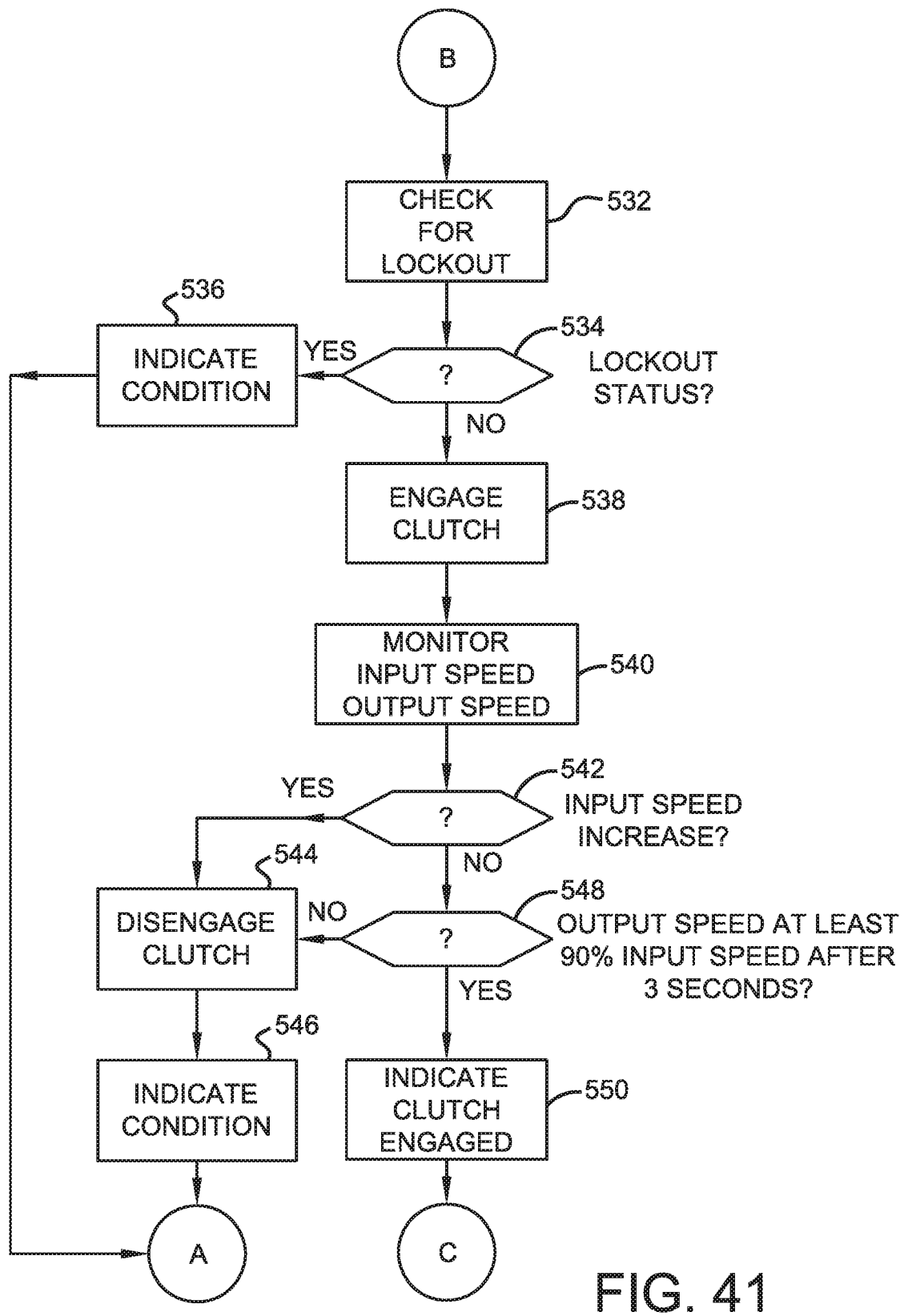
Figure 42:
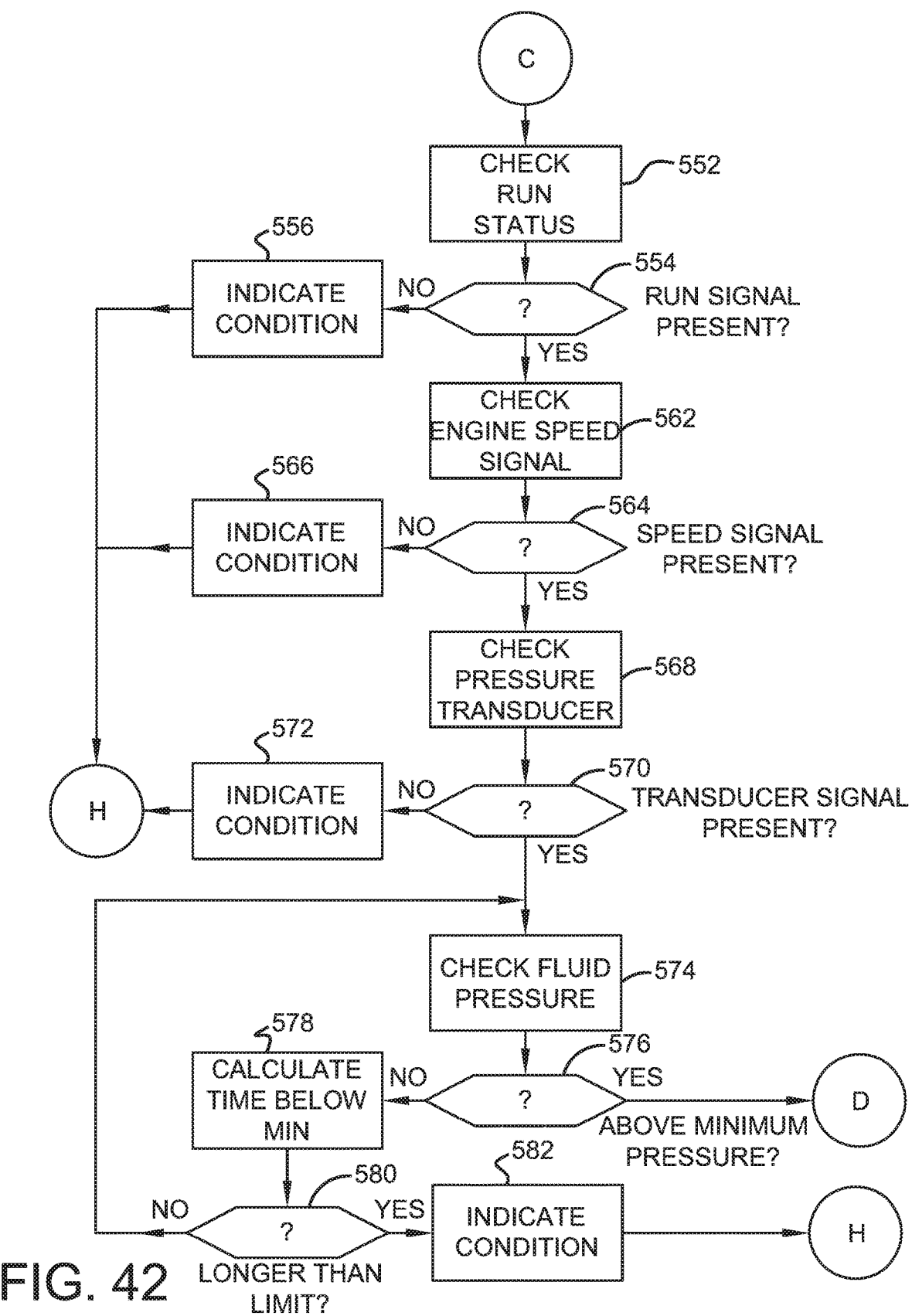
Figure 43:
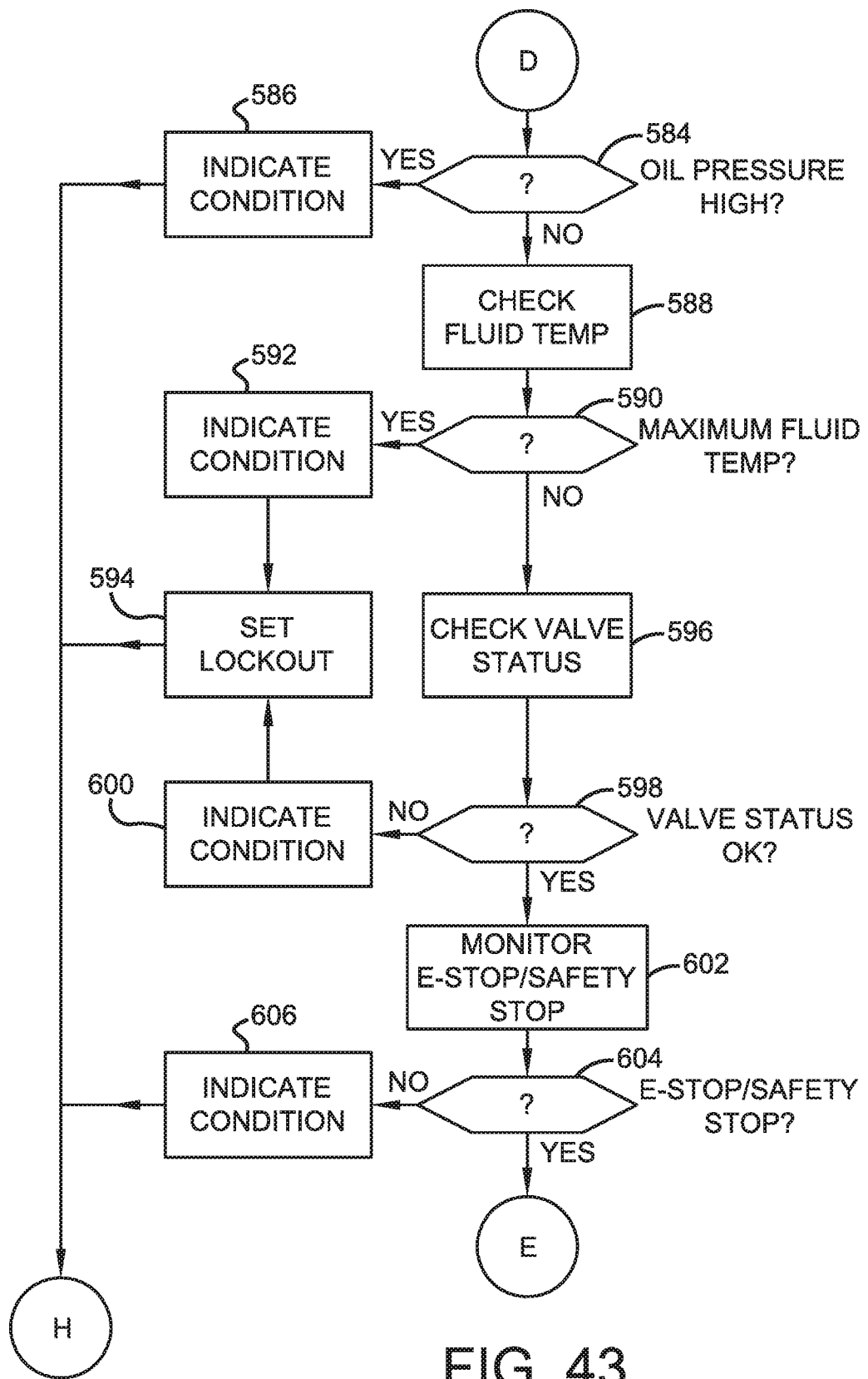
Figure 44:
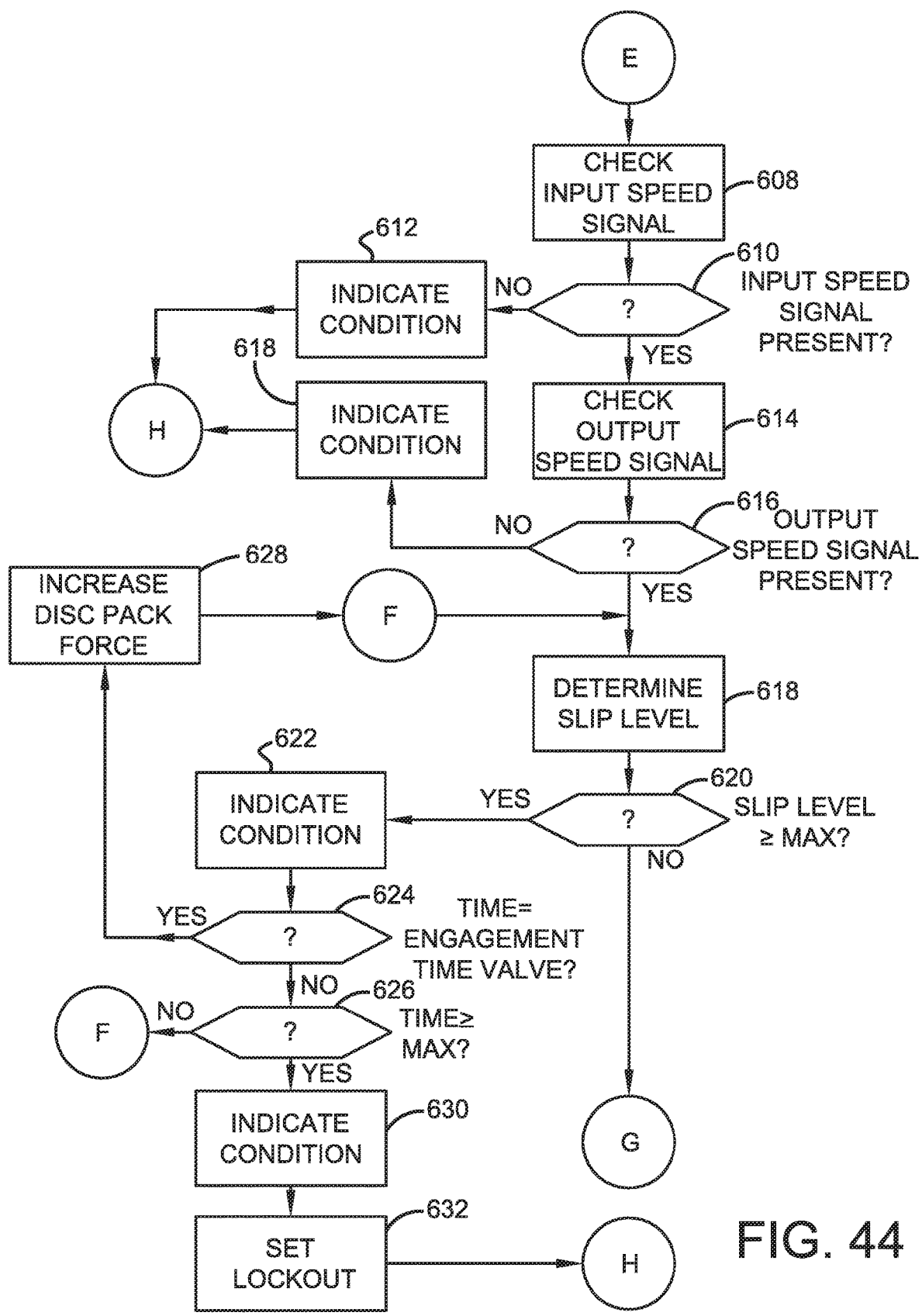
Figure 45:
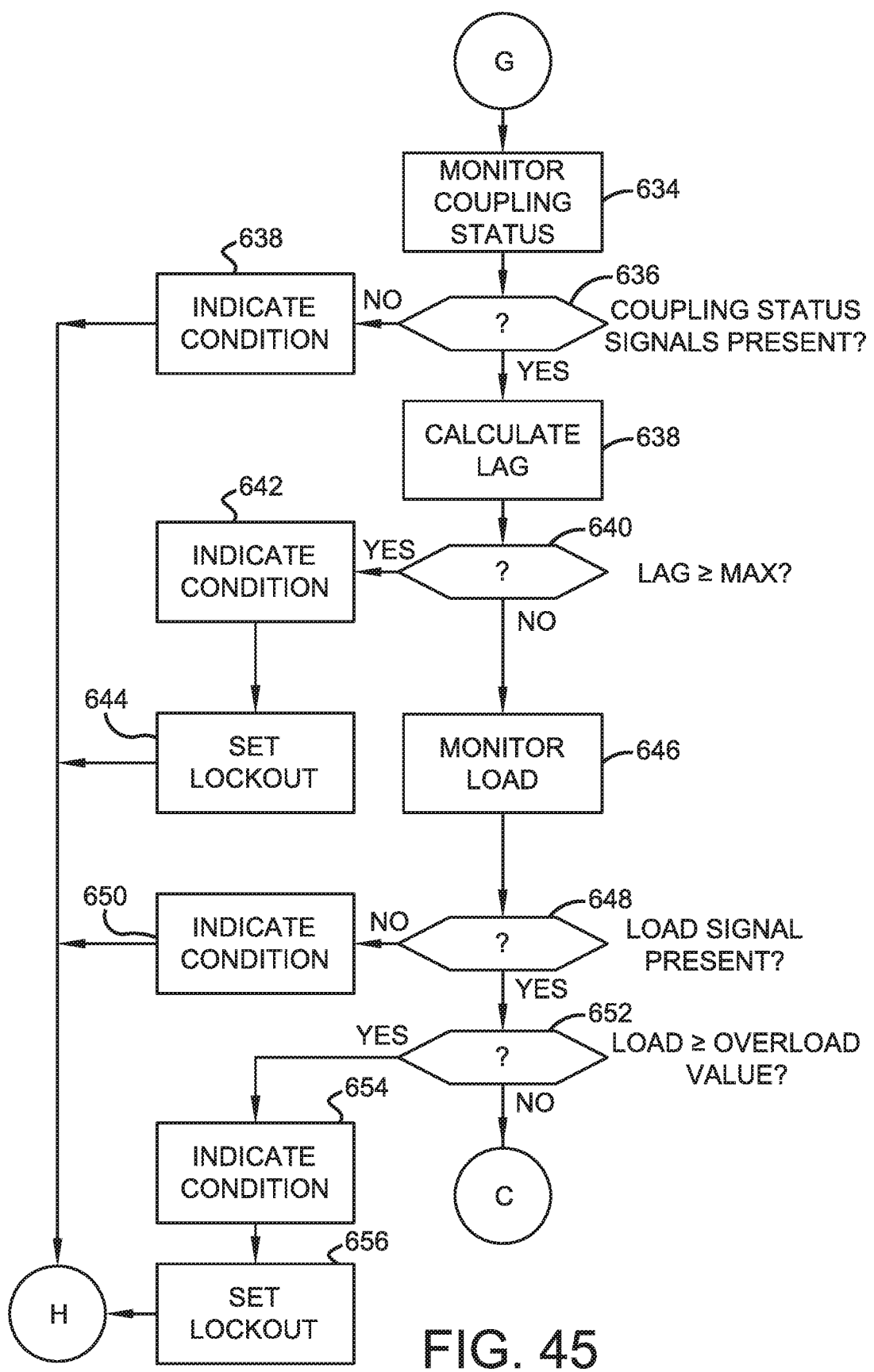

FIG. 39 is a schematic representation of a control system used for controlling operation of the clutch 454. This clutch control system is somewhat similar to the system described in connection with the slipping clutch 94 previously described in connection with FIG. 24. In this exemplary arrangement clutch 454 is not operated as a slipping type clutch. However, features of the exemplary arrangement described in connection with FIG. 39 may be used with slipping clutches and in other systems. Further while the exemplary system associated with clutch 454 is for a liquid actuated and liquid cooled clutch, features that the exemplary system may also be utilized in connection with air cooled clutches and pneumatically actuated clutches.

In the exemplary system a clutch control circuit 456 controls the operation of the clutch 454. The exemplary clutch control circuit includes structures like those described in circuit 164, including at least one processor schematically indicated 458. The processor includes a timer 460 such as a clock function of the processor. The processor is in operative connection with at least one data store 462. The data store 462 includes circuit executable instructions, operating data and other data used in connection with the operation of the system. As used herein references to a circuit or circuitry will encompass a single circuit as well as multiple circuits that are in operative connection.

A user interface 464 is in operative connection with the control circuit 456. User interface 464 of the exemplary embodiment includes input devices and output devices. In the exemplary embodiment the input devices may include pushbuttons schematically indicated 466. The pushbuttons may include a start button, a jog button, a speed control button, a stop button or other suitable button, dial, lever, switch or other types of devices from which inputs may be received from an operator. The exemplary user interface further includes output devices such as a display 468 and a wireless transmitter 470. In an exemplary arrangement the display 468 may be operative to provide the user with instructions, operating conditions, status indications, fault indications or other information regarding operation of the system. In other exemplary arrangements other types of output devices such as audible annunciators, light indicators or other types of output devices may be provided. In some exemplary arrangements certain devices may provide both input and output device functions such as a touchscreen. Of course it should be understood that the user interface 464 is exemplary and in other embodiments other types of user interface devices may be used.

In the exemplary system the clutch 454 is controlled responsive to hydraulic pressure. The hydraulic pressure is supplied by a pump 472. The pump 472 provides hydraulic fluid at an elevated pressure that is supplied from a tank 474. The high-pressure hydraulic fluid supplied by the pump is selectively delivered at a controlled pressure through a pressure control valve 476. The valve 476 may selectively apply hydraulic pressure to and release pressure from a piston cavity of the clutch 454 to respectively engage and disengage the clutch. This may be done in a manner like that previously discussed in connection with the other hydraulic actuated clutches that have been described herein. In an exemplary arrangement valve 476 may comprise a pulse width modulated valve which can selectively supply and release pressure to the piston cavity at different pressure levels in response to signals sent from the control circuit 456 through a suitable interface 478.

In the exemplary arrangement the control circuit 456 may operate the valve 476 to supply pressure to the piston cavity at a selected pressure level to cause the discs in the disc pack to be axially compressed sufficient to engage the clutch. When the clutch is to be disengaged the control circuitry 456 operates the valve to disengage the clutch by releasing pressure from the piston cavity, which causes the hydraulic fluid to be returned from the valve to the tank 474. The release of the pressure by the valve to a suitable level enables the separator desks and clutch discs in the disc pack to be relatively rotationally movable so that the clutch is disengaged. In exemplary embodiments the control circuitry 456 is enabled to vary the pressure applied through the valve 476 so as to change the clutch engagement force under certain circumstances as later discussed. Of course it should be appreciated that this approach is exemplary and other embodiments other approaches may be used.

Similar to the system described in connection with FIG. 24, the clutch 454 is a liquid cooled clutch which is cooled by transmission fluid that is supplied from a tank 480. Although as schematically shown the tank 480 for the cooling transmission fluid is a different tank from tank 474 that is used for the actuation fluid, in other arrangements the cooling and actuation fluid may both be supplied from a common tank.

In the exemplary system shown a pump 482 is used to supply the cooling fluid to the clutch 454. The flow of cooling fluid is controlled by the control circuit 456 through a flow control valve 484. The flow control valve 484 is controlled by the control circuit 456 through a suitable electronic interface 486. In the exemplary arrangement the cooling fluid may be passed through the clutch in a manner like that previously discussed in which the cooling fluid carries heat and debris away from the discs in the disc pack and other components within the clutch. In the exemplary arrangement the cooling fluid which is passed through the clutch is cooled through operation of a heat exchanger 488 before being returned to the tank 480. In the exemplary arrangement the control circuit 456 may control the operation of the valve 484 as well as the heat exchanger 488 so as to maintain the clutch 454 within a suitable operating temperature range. Of course it should be understood that this approach is exemplary and in other embodiments other approaches may be used.

The exemplary control circuit 456 receives data and other inputs for purposes of controlling the clutch from a plurality of sensors and other devices. For example in the exemplary embodiment shown, the control circuit receives an input speed signal from at least one sensor 490. Sensor 490 provides an input speed signal which is indicative of the speed of the driver device such as the engine to which the clutch is connected. In some embodiments the input speed sensor 490 may be integrated in the control circuitry associated with the engine and output from an electronic control module associated therewith. In other arrangements the input speed may be obtained from other sensors such as a sensor in operative connection with the flywheel of the engine. In other arrangements the input speed may be obtained from a sensor such as the coupling status sensor 446 previously discussed. Of course these approaches are exemplary and other embodiments other sensing arrangements may be used.

Another sensor 492 used in exemplary embodiment serves as an output speed sensor. The output speed sensor provides an output speed signal which is indicative of the speed of the driven device. The output speed sensor may be in operative connection with the output shaft from the clutch or components of the device which applies the load which is rotationally driven by the driver device. For example in situations where the driven device comprises a rotating device such as a pump, a winch, a mixer, a drilling rig, a feed screw, a propeller, a vehicle transmission or other rotational machinery, the output speed sensor 492 may be associated with an input shaft to such a device or other rotational component in connection therewith so that the rotational speed thereof is detected. Of course it should be understood that this arrangement is exemplary and other embodiments other approaches for providing an output speed signal to the clutch control circuit may be used.

In the exemplary arrangement at least one sensor 494 is used for detecting a temperature associated with the clutch. In some exemplary arrangements at least one sensor 494 may be utilized to detect at least one external or internal temperature of one or more clutch components. This may include for example an external temperature of a portion of the drive ring, the clutch hub, an input or output shaft, or other clutch or clutch connected component. In other exemplary embodiments sensor 494 may be operative to detect a fluid temperature associated with a clutch fluid. This may include in some exemplary arrangements the temperature of the fluid that is used for purposes of actuating the clutch. In other exemplary arrangements this may include a temperature associated with the cooling fluid that is used for purposes of cooling the clutch (in situations where separate fluids are used for the actuation and cooling functions).

In an exemplary arrangement the one or more sensors 494 associated with detecting temperature conditions provide signals to the control circuit 456 that are utilized in determining the operational condition and status of the clutch. This may include detecting conditions that correspond to potentially damaging conditions or other circumstances that may require the control circuit to take actions in accordance with its circuit executable instructions in ways like those later discussed herein.

In the exemplary embodiment at least one sensor 496 is an operative connection with the pump 472 for purposes of determining the level of available fluid pressure that can be supplied to the clutch through the valve 476. In exemplary embodiments sensor 496 may comprise a pressure transducer that is in operative connection with the pump and/or valve and is operable to determine the fluid pressure available at the valve. In other exemplary arrangements pressure transducers may be positioned to detect fluid pressure that is currently supplied by the valve to the clutch. Further in other exemplary arrangements sensors such as pressure transducers are positioned in connection with oil filters or other fluid circuit components for purposes of detecting conditions that may correspond to the operating conditions thereof.

In exemplary embodiments at least one coupling status sensor 498 may be operatively connected to control circuit 456. The at least one coupling status sensor may include sensors such as the sensors 446, 448 previously discussed in connection with the vibration damping coupling 430. Alternatively or in addition other types of sensors may be utilized in connection with exemplary couplings for purposes of determining the status thereof.

In an exemplary arrangement the control circuit 456 is an operative connection with at least one load sensor 500. Load sensor 500 of the exemplary embodiment is operative to provide at least one load signal that is usable to determine the magnitude of the load that is being applied by the driven device on the engine and consequently on the clutch 454. In some exemplary arrangements the load signal may be provided from an electronic control module associated with the driver device such as the engine that is in operative connection with the clutch. Some electronic control systems associated with diesel or other engine types are operative to monitor the applied loading level of the driving device to manage the components associated with the operation of the engine. However in other exemplary arrangements load signals may be determined by other sensors that are in operative connection with the driven device or other devices that are in operative connection with the driven device. This may include for example in some exemplary arrangements the coupling status sensors which may be used to determine the applied load based on the deformation of the resilient bodies in the coupling that varies with the magnitude of the applied load. Numerous different approaches to obtaining one or load signals that are used by the control circuitry may be utilized in various embodiments.

In the exemplary arrangement the sensors and other devices communicate with the control circuit 456 through electronic interfaces schematically indicated 502. Some types of sensors may be capable of communicating through a common interface, while other types of sensors and devices may communicate through dedicated interfaces. The type of interface utilized will depend on the particular sensor or other device that communicates with the control circuitry in the particular system. Further, it should be understood that while a few examples of sensors and devices have been described in connection with the clutch control system represented in FIG. 39, in other exemplary embodiments numerous different and additional types of sensors and devices may be utilized depending on the particular nature of the system in which the clutch is operated.

In some exemplary embodiments the clutch control circuit 456 is operative to communicate information remotely to other systems. In an exemplary arrangement as represented in FIG. 39, the transmitter 470 is operative to communicate in a wireless network such as a cellular or Wi-Fi network schematically indicated 504. Network 504 may include or be in operative connection with additional networks in which remote computers 506 are connected. Such other networks may include local area networks or wide area networks such as the Internet. In some exemplary arrangements the control circuit 456 may be operative to cause the operating conditions and other information concerning the operation of the clutch to be communicated to one or more remote computers 506. Such conditions may include information about the operating temperatures, applied loads, system status information, malfunctions and other information that is useful for purposes of determining if the clutch and associated system components are operating properly or may be in need of repair or replacement.

Such information may be useful in determining the maintenance and repair cycles for the clutch and associated equipment. Further in exemplary arrangements such captured and stored data may be useful for purposes of determining if the clutch and associated components have been subject to abuse or extreme operating conditions. The detection of such abuse or extreme conditions may be a basis for assessing additional charges or imposing other requirements in certain circumstances, such as where the equipment that is being utilized is not owned by the operator or is used on a rental or loaned basis. In other exemplary arrangements the operating information communicated from the control circuit 456 to the computers 506 may be useful for purposes of determining that components are operating in ways that suggest they are reaching the end of their useful life. This may include for example the coupling status sensors indicating that the coupling is starting to break down, that the pump is no longer supplying adequate pressure for purposes of actuating the valve, that the clutch is experiencing excessive slip levels and other conditions that may be recognized through programmed instructions as indicative of current or developing problems. In some exemplary arrangements this operating data may be stored in the data store associated with the control circuit, rather than sent to a remote computer, or in other arrangements the data may be stored in both places. The course these approaches are exemplary and other embodiments other approaches may be used.

FIGS. 40-46 schematically represent an exemplary logic flow carried out in connection with the operation of clutch 454 through operation of the control circuit 456. It should be understood that this logic flow has been simplified for purposes of explaining the operation of certain functions of an exemplary embodiment in a clear and concise manner. The control logic associated with systems may often include other or additional features and operations that are not discussed herein.

In an exemplary embodiment the operation of the system will be described in connection with a driver device such as an engine which is operative to drive a driven device such as a mixer through the clutch 454. Should be understood that this is merely an example of one of numerous different situations in which the control logic described herein may be utilized.

The control logic will be described beginning at initiation step 508 in which the clutch is currently not engaged. In this condition in the exemplary arrangement the driver device which is an engine may be running, but because the clutch is not engaged it is not expected that the driven device would be rotating. From this initiation step the control circuit 456 is operative to receive an engage clutch signal in a step 510. The engage clutch signal in an exemplary arrangement is received from the user interface 464 responsive to a manual input from a user corresponding to a pushbutton instruction to engage the clutch. Of course it should be understood that this is exemplary and other arrangements the engage clutch signal may be received from other types of manual or electronic devices.

In the exemplary arrangement the control circuit next operates in a step 512 to determine the input speed of the driver device. This is done by receipt of the input speed signal from the sensor 490. In the exemplary arrangement the at least one data store includes data corresponding to a lower input speed limit engagement value. This corresponds to a speed at which the engine is required to be operating for satisfactory clutch engagement. In a step 514 the control circuit is operative to determine if the input speed of the driver device is currently above the lower input speed limit engagement value. If the input speed is not at this level the control circuitry operates to give an indication of the condition in a step 516. This may be done through an output from the display of user interface 464. In response to this condition the control circuitry is operative to cause the logic flow to return to the point where the control circuitry waits for another input, such as another instruction to engage the clutch after the speed of the engine has been increased.

If in step 514 the input speed signal of the driver device is determined to be above the stored lower input speed limit engagement value, the control circuitry causes the logic flow to proceed to a step 518. In the exemplary arrangement the at least one data store includes data corresponding to an upper input speed limit engagement value. This value corresponds to an input speed that is above that which should be present during clutch engagement. In step 518 the control logic determines if the current input speed signal corresponds to a speed that is above the upper input speed limit engagement value. If the speed is too high the logic indicates the condition in a step 520 and the logic does not proceed toward engaging the clutch.

If the input speed of the driver device is determined by the control circuit to be below the upper input speed limit engagement value in step 518, the logic flow proceeds to a step 522. In step 522 the control circuit is operative to determine if the output speed signal which corresponds to the rotational speed of the driven device is above the input speed. This condition may happen in connection with some devices that may be freewheeling or otherwise driven by other forces external to the device. Adverse consequences may result to the system if the output speed is higher than the input speed when the clutch is engaged. If the output speed is determined to be above the input speed at step 522 the condition is reported at a step 524 and the logic does not proceed toward clutch engagement.

In an exemplary embodiment the data store associated with control circuit includes at least one clutch temperature limit value. This clutch temperature limit value corresponds to a temperature at which the clutch should not be engaged so as to avoid damage thereto. In an exemplary arrangement the at least one clutch temperature limit value in the data store corresponds to temperatures associated with the oil or other fluid that is associated with the actuation of the clutch. In the exemplary arrangement the clutch temperature limit values include a disengagement limit value which when reached during clutch operation, causes the control circuit to operate to cause the clutch to be in a disengaged condition. The exemplary data store further includes a re-engagement temperature limit value, which corresponds to a temperature below which the clutch actuation fluid must be before the control circuit will cause the clutch to change from the disengaged condition to the engaged condition. It should be understood that although in the exemplary embodiment these temperatures are associated with the actuation fluid (hydraulic oil) associated with actuating the clutch, in other embodiments the temperature values may be associated with temperatures or other items, fluids or structures such as those previously discussed.

In step 526 of the exemplary logic flow the control circuit is operative to determine the temperature of the clutch actuation fluid based on the signal from sensor 494. In step 528 the control circuit is operative to determine if the detected temperature is below the re-engagement limit value data that is stored in the data store 462. If the actuating fluid temperature is not below the re-engagement limit valve, the control circuit indicates the condition at a step 530 and does not proceed further towards clutch engagement. However if the temperature is determined to be below the re-engagement limit value, then the logic proceeds.

In step 532 the control circuit operates to check whether a lockout status has been set due to any conditions that have previously occurred in connection with the system. As later discussed in detail, a number of different conditions may result in the control circuit setting a lockout status that prevents system operation for a set period of time or until some remedial action is taken. In step 534 the control circuit determines if a lockout status has been set. If so the condition is indicated in a step 536 and the logic does not proceed toward clutch engagement. However if no lockup status is found, then the logic proceeds to step 538. In step 538 the control circuit causes operation of the valve 476 to apply pressure to the piston cavity so as to engage the clutch. The control circuit is operative to apply pressure to compress the disc pack of the clutch at a set level based on the programming associated with the control circuit that is usually sufficient to provide proper engagement of the clutch.

In the exemplary arrangement the data store 462 associated with the control circuit includes data corresponding to a synchronization level value and engagement time value. These values are associated with the programming of the control circuit for purposes of assuring that clutch engagement is not attempted under conditions that may damage the clutch or the driving or driven devices. The control circuit also includes executable instructions associated with the clutch engagement function to reduce the risk of such damage or other problems.

As represented in the exemplary control logic by step 540, after the control circuit has operated to apply pressure to the clutch the control circuitry is operative to monitor the input speed signal and the output speed signals from sensors 490 and 492. At a step 542 the control circuit is operative to determine if the input speed signal increases with the clutch engagement. If the input speed increases with clutch engagement that may be indicative of a problem. In response to detecting this condition in step 542 the control circuit is operative to operate the valve to release the pressure from the piston cavity and disengage the clutch as indicated in a step 544. The control circuit provides an indication of the condition at a step 546 and returns to the pre-clutch actuation condition.

If a speed increase is not detected in the step 542 the control logic proceeds to a step 548. In step 548 the control circuit operates to compare the input speed signal and the output speed signal during a fixed time window after the valve applies pressure to begin to engage the clutch. The control circuit is operative to determine if the input speed and the output speed have synchronized to at least a level that corresponds to the stored synchronization level value within a time window as determined by timer 460 that corresponds to the engagement time. In the exemplary arrangement the synchronization level value is 90% within a time window of three seconds after the control circuitry operates to apply pressure to engage the clutch. Of course, these values are exemplary and in other embodiments different synchronization level values and time values may be used.

If the speed as indicated by the output speed signal has not reached at least 90% of the speed reflected by the input speed signal within the engagement time value of three seconds after start of clutch engagement, this represents a problem in that the driven device is not being effectively placed in operation through engagement of the clutch. Such a condition may represent an overload or stall condition with the driven device which may cause damage to the clutch. If the synchronization level value is not achieved within a time corresponding to the engagement time value in step 548, the control circuit operates to disengage the clutch and indicate the condition as represented in steps 544 and 546 respectively. Alternatively, if the output speed has reached at least the synchronization level value within the time corresponding to the stored engagement time value, the control circuit operates to provide an indication that the clutch has properly engaged in a step 550. The control circuit maintains this condition until an event occurs which requires changing the status of the system.

Examples of conditions which are monitored during clutch engagement will now be discussed in connection with the exemplary control logic. Of course it should be understood that these are merely examples and in other embodiments different, additional or lesser numbers of conditions may be monitored by one or more control circuits for purposes of determining a need to change the current system status.

Figure 46:
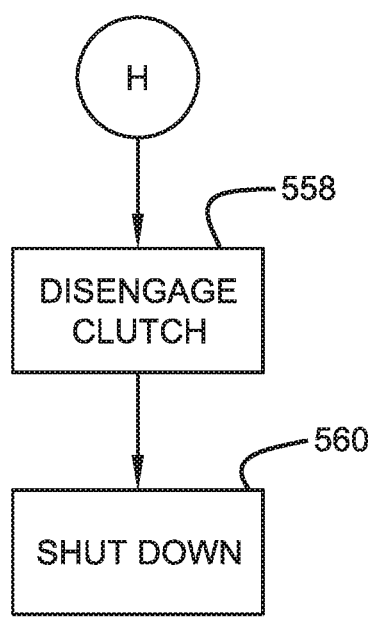

In an exemplary arrangement the control circuit is operative to monitor for the presence of a status signal from the driver device that it is in a run status. In some exemplary embodiments this may be a signal that is generated through the electronic control system of the engine that is driving the clutch. The monitoring of the signal is represented by a step 552. The control circuit monitors for the presence of this signal as represented in a step 554. If the signal is not present it is indicative of a system problem and the control circuit operates to indicate the condition at a step 556. The exemplary system than further operates as represented in FIG. 46 operate the valve to release the pressure from the piston cavity on the disc pack and disengage the clutch as represented in a step 558. The control circuit then operates to shut down the system as represented by step 560. The shutdown of the system may take different forms and include different steps depending on the nature of the condition and the system. For example in some arrangements the shutdown may represent an entire shutdown of the driving device as well as disengagement of the clutch. In other exemplary embodiments different steps may be taken such as to apply a braking system to the driven device or take other measures as appropriate when a system malfunction occurs. The steps that are taken may vary depending on the nature of the particular system in which the clutch is used.

If the run signal is determined to be present in step 554, the control circuit then operates to monitor the engine speed signal. This is indicated at a step 562. In some exemplary embodiments the electronic control system of the engine or other output device such as a tachometer, provides an output to indicate that the engine is rotating at a particular speed. In some exemplary arrangements this may correspond to the input speed signal provided by the sensor 490. As represented in the step 564 the control circuit determines if the speed signal is present. If the speed signal has been lost, the control logic operates to indicate the condition at a step 566 and proceeds to disengage the clutch and conduct an appropriate shutdown as previously explained. Also in some exemplary arrangements the circuit may compare the input speed to an overspeed limit value that is stored in the data store. If the input speed is determined to be above the overspeed limit, the clutch is disengaged and an appropriate shutdown is conducted.

If the engine speed signal is determined to be present in the step 564, the logic proceeds in a step 568 to determine if a signal is present from the pressure transducer which monitors the pressure available from the pump 472 that can be applied through the valve 476 to engage the clutch. In an exemplary arrangement this corresponds to a signal from sensor 496. In a step 570 the circuit operates to determine if the pressure transducer signal is present. If the signal is not present this indicates a malfunction and an indication thereof is given at a step 572 and the clutch is disengaged as previously discussed.

The exemplary control circuit further operates to determine if the pressure output by the pump 472 is maintained at an adequate pressure. In the exemplary arrangement the data store 462 associated with the control circuit 456 includes data corresponding to a lower pressure limit value and a pressure time value. These values correspond to a period of time during which the pressure may be below the lower pressure limit value without adverse impact to the system. The exemplary system operates to require that the pressure be below the minimum value for a period of time at least as long as the stored time value, before the system indicates a malfunction so as to avoid unnecessary shutdown due to transitory pressure fluctuations.

In the exemplary logic flow the control circuit monitors the fluid pressure signal from the sensor 496 as represented in a step 574. In step 576 a determination is made whether the pressure signal corresponds to a pressure above the minimum pressure. If the pressure is at or below the lower pressure limit value a timing function responsive to timer 460 is carried out in a step 578. The control circuit continues to operate and determine in a step 580 if the pressure signal corresponds to a pressure at or below the lower limit for longer than the pressure time value. If the low-pressure condition has persisted for at least the pressure time value, an indication of the condition is given at a step 582 and the clutch is disengaged in a manner like that previously discussed.

In some exemplary systems a high-pressure condition from the pump 472 may sometimes occur. This may happen for example in the event that there is a blocked line, a clogged filter or other malfunction. In the exemplary embodiment the data store 462 includes data corresponding to an upper pressure limit value. This upper pressure limit value is indicative of such a malfunction.

As represented in step 584 control circuit operates to monitor the pressure signal to determine if the pressure signal corresponds to a pressure at or above the upper pressure limit value. If so the control circuit operates to indicate the condition as represented in the step 586 and disengages the clutch in a manner previously discussed. If the pressure is within limits, the logic then proceeds to a step 588 in which the temperature signal from sensor 494 is monitored.

As previously discussed, data stored in data store 462 includes clutch temperature limit values. One of these values is a disengagement limit value. This value corresponds to a temperature that if reached is deemed unreasonably high and represents a condition in which the clutch should no longer be operated. In the exemplary arrangement the disengagement value is higher than the re-engagement limit temperature value previously discussed, which the temperature must be below before the clutch will change from a disengaged condition to an engaged condition.

As represented in step 590 the temperature monitored in step 588 is evaluated to determine if it is at or above the level of the disengagement limit value stored in the data store. If the temperature is above the disengagement value the control circuit operates to indicate the condition in a step 592. In the exemplary arrangement because this condition represents a serious malfunction, the control circuit is operative to set a lockout status in step 594. In the exemplary embodiment the lockout status is set for a lockout time value which is a value stored in the data store in association with the particular condition. Thus for example in some exemplary arrangements the detection of a high temperature condition may be associated with a lockout value that prevents the clutch from being reengaged for a time period of 15 minutes, which corresponds to the stored value based on programming that considers this time sufficient for reasonable cooldown. Of course these values are merely exemplary in other embodiments other approaches and values may be used.

If the fluid temperature is found to be within normal operating limits in step 590 the control logic proceeds to a step 596. In the exemplary step 596 the control circuit operates to determine if the valve 476 is operating properly. For example in some exemplary embodiments the valve may operate in response to pulse width modulated signals. In this exemplary step the control circuit operates to determine if the pressure output supplied by the valve or the position of components within the valve, properly correspond to the signals that the valve is receiving. Of course this is merely exemplary of ways in which signals from the valve may be utilized for purposes of determining if the valve is operating properly.

If in step 598 it is determined that the valve is not operating properly the control circuit operates to give an indication thereof in a step 600. Because a valve malfunction is considered to be a serious condition which may present the possibility for damage to the driving or driven devices, the condition causes the control circuit to set a lockout such as through step 594 previously discussed. This lockout condition may be of a duration different than the lockout previously discussed or may be of the same duration. Alternatively or in addition a lockout may additionally require a reset or replacement of certain system components before operation will again occur. The programming of the particular system will depend on the requirements associated with the particular functions and operations that are being carried out.

The exemplary control logic further carries out a step 602 in which the control circuit monitors for signals that correspond to an instruction to stop or otherwise discontinue operation of the driven device. This may include for example an operator pushing an emergency stop button. Alternatively or in addition this may correspond to triggering of a safety switch that indicates a potential problem. The exemplary circuitry monitors for the occurrence of such condition or receipt of such a signal in a step 604. If such a signal is received an indication of the condition is provided in a step 606 and the clutch is disengaged. Otherwise the logic proceeds.

In the exemplary arrangement the control circuit is operative to monitor for conditions which may correspond to operational problems. For these reasons the input speed signal and output speed signal are monitored in the exemplary embodiment to detect malfunctions or other conditions that may arise. In order to assure that the control circuit can detect these conditions, the control circuit operates to monitor for the presence of the input speed signal indicative of the speed of the driver device at a step 608. If the input speed signal has been determined to have been lost at a step 610 an indication thereof is given in a step 612 and the clutch is disengaged and shut down. The output speed signal indicative of the speed of the driven device is also monitored in a step 614. If it is determined in the step 616 that the output speed signal has been lost, an indication is given in a step 618 and the clutch disengaged and shut down.

In the exemplary logic flow, the control circuit is operative to monitor the amount of slip that is occurring in the clutch. The clutch slip level may be indicative of problems such as an overload condition or a clutch wear condition that adversely impacts system operation and which may cause problems. In the exemplary arrangement the data store 462 includes data corresponding to a maximum slip level value, an engagement time value, and a maximum slip duration value. In the exemplary embodiment the stored values are used to identify conditions which represent an unacceptable amount of clutch slippage. In the exemplary arrangement if the clutch slippage level exceeds the stored maximum slip level value for period of time that is equal to the stored engagement time value, then the control circuit operates to increase the level of pressure applied to the piston cavity by the valve to increase the axial force on the disc pack. Often increasing of the axial force on the disc pack will reduce the level of slippage. However in the exemplary arrangement if increasing the axial force does not reduce the slippage level and the slippage level continues to be over the maximum slip level value for at least a period of time corresponding to the maximum slip duration value, then the clutch is disengaged and a lockout is set.

This exemplary logic is represented beginning with a step 618. In step 618 the control circuit is operative to determine the slip level of the clutch based on the difference between the speeds represented by the input speed signal and the output speed signal. In a step 620 a determination is made whether the determined slip level is greater than or equal to the stored maximum slip level value. If the slip level exceeds the stored value a timing function responsive to timer 460 is initiated at a step 622. In a step 624 the control circuit uses the timer to determine if the elapsed time has reached the level of the engagement time value stored in the data store. If the time does not correspond to the engagement time value, it is determined if the time corresponds to a time greater than the stored maximum slip duration value. This is represented in a step 626.

Until the time of the engagement time value is reached, the control logic continues to monitor the slip level without changing the system. If before a time duration corresponding to the engagement time value, the determined slip level falls below the stored maximum slip level value, the logic proceeds and no additional action is taken. This might occur for example if the driven device temporarily has a brief spike loading condition. However if the determined slip level is greater than or equal to the stored maximum slip level value for a time that is equal to the stored engagement time value, the control circuit carries out step 628 in which the valve 476 is operated to increase the amount of pressure that is applied to the piston cavity to compress the disc pack.

If the step of increasing the pressure on the disc pack in step 628 reduces the slippage to a level below the maximum slip level value, the pressure is maintained for a programmed time period and then returned back to the initial pressure value. However if the calculated slip level as determined in step 620 continues to be above the stored maximum slip level value continuously for a time that corresponds to the maximum slip duration value, the control circuit then operates in a step 630 to indicate the condition, set a lockout status in a step 632, and disengage and shut down the clutch. Of course it should be understood that this approach is exemplary and other embodiments other approaches may be used. Further such features may be used to monitor and adjust clutch slippage in systems where slippage is varied to control output speed such as certain systems previously discussed herein.

If in the step 620 the slip level is determined to be within limits, the logic flow proceeds to a step 634. In step 634 control circuit is operative to read the at least one coupling status signal from the coupling status sensors such as sensors 446 and 448. As represented in a step 636 a determination is made that the coupling status signals are present. In the event of that the coupling status signals are not detected as present the control circuit indicates the condition in a step 638 and disengages the clutch in a manner previously discussed.

In the exemplary embodiment the at least one data store 462 associated with the control circuit 456 includes data corresponding to at least one coupling status value. In the exemplary arrangement the at least one coupling status value corresponds to a lag value which represents the amount by which the inner portion 434 of the coupling lags behind the movement of the outer portion of the coupling 432. In the exemplary arrangement the control circuit operates to receive the coupling status signals which correspond to the current deformation of the resilient bodies 442 of the coupling. Based on the stored coupling status value and the coupling status signals the control circuit makes a coupling status determination. In the exemplary arrangement this determination is based on the determined lag in rotational movement of the inner portion of the coupling relative to the outer portion of the coupling. In the exemplary arrangement the stored coupling status value corresponds to a maximum amount of acceptable lag between the outer and inner coupling portions beyond which is indicative of a malfunction.

As represented in step 638 the control circuit is operative to calculate the lag between the inner and outer coupling portions. In a step 640 the control circuit is operative to determine if the calculated lag is greater than or equal to the coupling status value stored in the data store 462. If the calculated lag value exceeds the stored maximum threshold this is indicative of a problem which warrants a system shutdown. In response to detecting this condition the control circuit is operative to indicate the condition at a step 642 and to set a lockout status as represented in step 644. The control circuit then carries out clutch disengagement and shut down in the manner previously discussed. Of course this approach is exemplary and other embodiments other approaches may be used.

In exemplary embodiments the control circuit further monitors for an overload condition. Such an overload condition may correspond to the driven device applying an excessive load that may be damaging to the clutch, the driver device or other system components. In exemplary embodiments the load that is applied by the driven device is indicated by the load signals that are received from the at least one sensor 500. As previously discussed these loads signals may come from the electronic control module associated with the engine or other sensors associated with the system. The exemplary data store 462 includes stored data corresponding to at least one overload value. This overload value represents a loading which is potentially damaging to the system components and therefore if encountered represents a system malfunction which warrants a system shutdown.

In the exemplary embodiment the control circuit is operative to monitor the at least one load signal as represented in a step 646. In a step 648 a determination is made whether the load signal is present. If the load signal has been lost an indication thereof is provided in a step 650. In response to loss of the load signal, the clutch is disengaged and a shutdown is carried out as previously discussed. If the load signal is present then a determination is made in a step 652 concerning whether the load signal is equal to or greater than the stored overload value. If the load signal indicates that the load is greater than the overload value, the control circuit is operative to indicate the condition in a step 654. A lockout status is then set at a step 656. As previously discussed the lockout status may be associated with a stored time value that corresponds to the particular condition or may be determined in another manner through operation of the control circuit. The lockout status may further require that certain actions be taken to restore the system to operation. Thereafter the clutch is disengaged and shut down as previously discussed.

As represented in the schematic logic flow, the logic returns to continuously monitor for conditions that may require a change in the system operation. The logic flow is carried out until a change in one of the conditions occurs which then results in disengagement of the clutch by the control circuit operating the valve. Of course it should be understood that this simplified control logic is merely exemplary and in other embodiments other approaches, functions and capabilities may be provided.

Although arrangements have been described based upon certain exemplary embodiments, a wide array of modifications, variations and alternative constructions are also within the spirit and scope of the principles described herein. Example arrangements for mechanical clutches and other related power transmission systems have been described herein with reference to particular components, features, properties, attributes, relationships and methods. However, it should be understood that in other embodiments other arrangements may include other components, features, properties, attributes, relationships and/or methods which provide similar capabilities and functionalities.

It will be readily understood that the features of exemplary embodiments as generally described and illustrated in the Figures can be arranged and designed in a wide array of different configurations. That is, features, structures and/or characteristics of embodiments or arrangements described herein may be combined in any suitable manner in one or other embodiments or arrangements. Thus the detailed description of the exemplary embodiments of apparatus, methods and articles as represented in the Figures is not intended to limit the scope of the embodiments as claimed, but is merely representative of selected exemplary embodiments that implement the principles described herein.

In the foregoing description certain terms have been used to describe example arrangements for purposes of brevity, clarity and understanding. For example certain terms such as "upward", "downward", "higher", "lower", "left", "right", "outer", "inner", "front", "rear", "top", and "bottom" may have been used. However, no unnecessary limitations are to be implied therefrom because such terms have been used for descriptive purposes and are intended to be broadly construed. The terms shall not be construed as limitations on the scope of the claims hereof. Moreover, the descriptions and illustrations herein are by way of examples and the inventive teachings are not limited to the specific details that have been shown and described.

The exemplary structures and arrangements along with the methods of preparing and using such structures and arrangements achieves at least one of the above stated objectives, eliminates difficulties encountered in the use of prior devices and systems, solves problems and attains the desirable results described herein.

In the following claims, any feature described as a means for performing a function shall be construed as encompassing any means known to those skilled in the art to be capable of performing the recited function and shall not be deemed to be limited to the particular means used for performing the function in the foregoing description or mere equivalents thereof.

Having described the features, discoveries and principles of the exemplary embodiments, the manner in which they are constructed and operated and the advantages and useful results attained, the new and useful structures, devices, elements, arrangements, parts, combinations, systems, equipment, operations, methods, processes and relationships are set forth in the appended claims.

We claim:

1. Apparatus comprising:
 a clutch, wherein the clutch is operative to selectively engage a driver device and a driven device,
 wherein the clutch includes
  a disc housing, wherein the disc housing is in rotational connection with one of the driver device and the driven device,
  a hub, wherein the hub is in rotational connection with the other of the driver device and the driven device,
   wherein the hub extends in concentric relation and radially inward of the disc housing, wherein the hub and the disc housing are relatively rotationally movable,
  a disc pack, wherein the disc pack includes
   at least two axially spaced clutch discs, wherein each clutch disc is in operatively engaged rotational connection with one of the disc housing or the hub, and wherein each clutch disc is relatively axially movable with respect to each of the disc housing and the hub,
   at least one separator disc, wherein each separator disc is axially intermediate of an adjacent pair of clutch discs, wherein each separator disc is in operatively engaged rotational connection with the other of the disc housing or the hub, and wherein each separator disc is axially movable with respect to each of the disc housing and the hub,
  an annular piston, wherein the annular piston is axially movable in a piston cavity responsive to fluid pressure in the piston cavity, wherein the annular piston is in operative connection with the disc pack,
 a valve, wherein the valve is selectively operative
  to engage the clutch by application of fluid pressure to the piston cavity, wherein application of fluid pressure is operative to axially move the piston and engagingly compress the disc pack such that the clutch discs and the at least one separator disc rotate in engaged relation to rotationally connect the driving device and the driven device,
  to disengage the clutch by release of fluid pressure from the piston cavity such that the disc pack is no longer engagingly compressed and the clutch discs and the at least one separator disc are rotatable independently and the driving device and the driven device are not rotationally connected,
 a circuit,
  wherein the circuit includes a timer and a data store,
   wherein the data store includes data corresponding to a synchronization level value and an engagement time value,
  wherein the circuit is in operative connection with the valve, and is operative to receive
   an input speed signal indicative of rotational speed of the driver device,
   an output speed signal indicative of rotational speed of the driven device, and
   a clutch engage signal,
  wherein the circuit is operative to cause
   engagement of the clutch by delivery of fluid pressure to the piston cavity from the valve responsive at least in part to the clutch engage signal,
   a determination responsive at least in part to the input speed and the output speed signals, that the driving device and the driven device have not achieved coordinated rotational movement at the synchronization level value within a time period corresponding to the engagement time value after the delivery of fluid pressure,
   responsive at least in part to the determination, disengagement of the clutch by reducing fluid pressure delivered to the piston cavity from the valve.

2. The apparatus according to claim 1
 wherein the data store includes at least one clutch temperature limit value,
 wherein the circuit is further operative to receive a temperature signal indicative of clutch temperature,
 wherein the circuit is further operative to
  further determine responsive at least in part to the temperature signal, that the clutch temperature is at least at the at least one clutch temperature limit value, responsive to the further determination, operate the valve to cause the clutch to be disengaged.

3. The apparatus according to claim 2
 wherein the temperature signal received by the circuit is indicative of temperature of fluid used to engage the clutch.

4. The apparatus according to claim 2
 wherein the at least one temperature limit value includes a disengagement limit value and a re-engagement limit value,
 wherein the circuit is operative to make the further determination responsive to the clutch temperature being at least at the disengagement limit value,
 wherein the circuit is further operative to cause the clutch not to be engaged unless the clutch temperature is not greater than the re-engagement limit value.

5. The apparatus according to claim 2
 wherein the data store includes an upper input speed limit engagement value,
 wherein the circuit is operative to make an excess speed determination responsive at least in part to the input speed signal corresponding to a driver speed above the upper input speed limit engagement value, and responsive at least in part to the excess speed determination, not cause clutch engagement responsive to the clutch engage signal.

6. The apparatus according to claim 5
 wherein the data store includes a lower input speed limit engagement value,
 wherein the circuit is operative to make a deficient speed determination responsive at least in part to the input speed signal corresponding to a driver speed below the lower input speed limit engagement value, and responsive at least in part to the deficient speed determination, not cause clutch engagement responsive to the clutch engage signal.

7. The apparatus according to claim 6
wherein the circuit is further operative to
i) determine that during engagement of the clutch responsive to the clutch engage signal, the input speed signal increases, and
ii) disengage the clutch responsive at least in part to the determination in (i).

8. The apparatus according to claim 7
wherein the circuit is further operative to
iii) prior to clutch engagement responsive to the clutch engage signal, and responsive to the input and output speed signals, determine that the speed of the driven device is greater than the speed of the driver device,
iv) responsive at least in part to the determination in (iii), not cause the clutch to engage in response to the clutch engage signal.

9. The apparatus according to claim 7
wherein the circuit is operative to operate the valve to cause the clutch to be disengaged responsive to loss of at least one of the input speed signal, the output speed signal and the temperature signal.

10. The apparatus according to claim 7
wherein the data store further includes
a maximum slip level value, and
a maximum slip duration value,
wherein the circuit is operative after a time after clutch engagement corresponding to the engagement time value, to determine a clutch slip level responsive at least in part to the input speed signal and the output speed signal,
wherein the circuit operates the valve to cause the clutch to be disengaged responsive to an excess slip determination, wherein the excess slip determination is based responsive at least in part on the determined clutch slip level being at least the maximum slip level value continuously during a time period corresponding to at least the maximum slip duration value.

11. The apparatus according to claim 10
wherein the circuit is operative to prevent re-engagement of the clutch after clutch disengagement responsive at least in part to the excess slip determination.

12. The apparatus according to claim 10
wherein the data store further includes an adjust engagement time value,
wherein the circuit is further operative to
make an adjustment determination based on the clutch slip level corresponding to at least the maximum slip level value continuously for a time corresponding to the adjust engagement time value,
responsive at least in part to the adjustment determination, operate the valve to cause greater compression force to be applied by the piston to the disc pack.

13. The apparatus according to claim 11
wherein the data store includes a lock out time value,
wherein the circuit is operative to prevent re-engagement after the excess slip level determination for a time corresponding to the lock out time value.

14. The apparatus according to claim 10
wherein the data store includes at least one actuation fluid pressure value and a pressure time value,
wherein the circuit is configured to receive an actuation fluid pressure signal, wherein the actuation fluid pressure signal corresponds to actuation fluid pressure available to be applied by the valve to the piston cavity,
wherein the circuit is operative to cause the valve to disengage the clutch responsive to the actuation fluid pressure signal corresponding to a fluid pressure at least one of above or below the at least one actuation fluid pressure value continuously for a time corresponding to the pressure time value.

15. The apparatus according to claim 14
wherein the at least one actuation fluid pressure value includes an upper pressure limit value and a lower pressure limit value,
wherein the circuit is operative to cause the clutch to be disengaged responsive to the pressure signal corresponding to pressure above the upper pressure limit value or below the lower pressure limit value, continuously for the time corresponding to the pressure time value.

16. The apparatus according to claim 14
and further including a vibration damper coupling
wherein the coupling is positioned operatively intermediate of the driver device and the clutch,
wherein the coupling includes
a first portion,
a second portion, wherein the first and second portions are rotationally movable relative to each other,
at least one resilient body, wherein the first and second portions are operatively connected through the at least one resilient body,
at least one coupling status sensor, wherein the at least one coupling status sensor is operative to detect at least one condition corresponding to deformation of the at least one resilient body, and wherein the at least one coupling status sensor is operative to output at least one coupling status signal,
wherein the data store includes at least one coupling status value,
wherein the circuit is configured to receive the at least one coupling status signal,
wherein the circuit is operative
to make a coupling status determination based on the at least one coupling status signal and the at least one coupling status value having a predetermined relationship,
to cause the valve to disengage the clutch responsive at least in part to the coupling status determination.

17. The apparatus according to claim 16
wherein the at least one coupling status sensor includes
a first portion sensor configured to sense a rotational position of the first portion,
a second portion sensor configured to sense a rotational position of the second portion,
wherein the at least one coupling status value corresponds to a lag value,
wherein the circuit is operative to determine lag in rotational movement of the second portion relative to the first portion and to make the coupling status determination responsive at least in part to lag in rotational movement of the second portion relative to the first portion being at least as great as the lag value.

18. The apparatus according to claim 16
wherein the data store includes an overload value,
wherein the circuit is operative to receive at least one load signal corresponding to a load force associated with a load on the driver device that is applied through the clutch, wherein the circuit is operative to
   determine an overload condition responsive at least in part to the at least one load signal corresponding to the load force being at least as great as the overload value,
   cause the valve to disengage the clutch responsive to the overload condition determination.
19. The apparatus according to claim 18
wherein the at least one load signal includes the at least one coupling status signal corresponding to deformation of the at least one resilient body.
20. The apparatus according to claim 1
wherein the data store includes an overload value,
wherein the circuit is operative to receive at least one load signal corresponding to a load force associated with a load on the driver device that is applied through the clutch,
wherein the circuit is operative to
   determine an overload condition responsive at least in part to the at least one load signal being indicative that the load force is at least as great as the overload value,
   cause the valve to disengage the clutch responsive at least in part to the overload condition determination.
21. The apparatus according to claim 1
and further including a vibration damper coupling,
wherein the coupling is positioned operatively intermediate of the driver device and the clutch,
wherein the coupling includes
   a first portion,
   a second portion, wherein the first and second portions are relatively rotationally movable,
   at least one resilient body, wherein the at least one resilient body operatively connects the first portion and the second portion,
at least one coupling status sensor, wherein the at least one coupling status sensor is operative to detect data corresponding to deformation of the at least one resilient body,
   wherein the at least one coupling status sensor is operative to output at least one coupling status signal,
wherein the data store includes at least one coupling status value,
wherein the circuit is configured to receive the at least one coupling status signal,
wherein the circuit is operative to
   make a coupling status determination based at least in part on the at least one coupling status signal and the at least one coupling status value having a predetermined relationship,
   cause the valve to disengage the clutch responsive at least in part to the coupling status determination.
22. The apparatus according to claim 1
wherein the data store further includes a maximum slip level value and an adjust engagement time value,
wherein the circuit is operative a time after clutch engagement corresponding to the engagement time value, to determine a clutch slip level responsive to the input and output speed signals,
and wherein the circuit is further operative to
   make an adjustment determination based at least in part on the clutch slip level corresponding to at least the maximum slip level value continuously for a time corresponding to the adjust engagement time value, and
   responsive at least in part to the adjustment determination, operate the valve to cause greater compression force to be applied by the piston to the disc pack.
23. The apparatus according to claim 1
wherein the data store further includes
   a maximum slip level value, and
   a maximum slip duration value,
wherein the circuit is operative after a time after clutch engagement corresponding to the engagement time value, to determine a clutch slip level responsive to the input and output speed signals,
wherein the circuit operates the valve to cause the clutch to be disengaged responsive to an excess slip determination, wherein the excess slip determination is made responsive at least in part to the determined clutch slip level being at least the maximum slip level value continuously during a time period corresponding to at least the maximum slip duration value.
24. Apparatus comprising:
a clutch, wherein the clutch is operative to selectively engage a driver device and a driven device,
wherein the clutch includes
   a disc housing, wherein the disc housing is in fixed operative rotational connection with one of the driver device and the driven device,
   a hub, wherein the hub is in fixed operative rotational connection with the other of the driver device and the driven device,
      wherein the hub extends in concentric relation and radially inward of the disc housing, wherein the hub and the disc housing are relatively rotationally movable,
   a disc pack, wherein the disc pack includes
      at least two axially spaced clutch discs, wherein each clutch disc is in operatively engaged rotational connection with one of the disc housing or the hub, and wherein each clutch disc is relatively axially movable with respect to each of the disc housing and the hub,
      at least one separator disc, wherein each separator disc is axially intermediate of an immediately adjacent pair of clutch discs, wherein each separator disc is in operatively engaged rotational connection with the other of the disc housing or the hub, and wherein each separator disc is axially movable with respect to each of the disc housing and the hub,
   an annular piston, wherein the annular piston is axially movable in a piston cavity responsive to fluid pressure in the piston cavity, wherein the annular piston is in operative connection with the disc pack,
a vibration damper coupling,
wherein the coupling is positioned intermediate of the driver device and the clutch,
wherein the coupling includes
   a first portion,
   a second portion, wherein the first and second portions are relatively rotationally movable,
   at least one resilient body, wherein the at least one resilient body operatively connects the first and second portions,
a valve, wherein the valve is selectively operative
   to engage the clutch by application of fluid pressure to the piston cavity, wherein application of fluid pressure is operative to axially move the piston and engagingly compress the disc pack such that the clutch discs and the at least one separator disc rotate in engaged relation to rotationally connect the driving device and the driven device,
to disengage the clutch by release of fluid pressure from the piston cavity such that the disc pack is no longer engagingly compressed and the clutch discs and the at least one separator disc are rotatable independently and the driving device and the driven device are not rotationally connected,
at least one coupling status sensor, wherein the at least one coupling status sensor is operative to detect at least one condition corresponding to deformation of the at least one resilient body, wherein the at least one coupling status sensor is operative to output at least one coupling status signal,
a circuit,
wherein the circuit includes a data store,
wherein the data store includes data corresponding to at least one coupling status value,
wherein the circuit is in operative connection with the valve, and is operative to receive the at least one coupling status signal,
wherein the circuit is operative to
with the clutch engaged, make a coupling status determination based at least in part on the at least one coupling status signal and the at least one coupling status value having a predetermined relationship,
cause the valve to disengage the clutch responsive at least in part to the coupling status determination.

25. The apparatus according to claim 24
wherein the circuit includes a timer,
wherein the data store further includes a maximum slip level value and an adjust engagement time value,
wherein the circuit is operative to receive
an input speed signal indicative of rotational speed of the driver device, and
an output speed signal indicative of rotational speed of the driven device,
wherein with the clutch engaged the circuit is operative to
determine a clutch slip level responsive at least in part to the input and output speed signals,
make an adjustment determination based on the clutch slip level corresponding to at least the maximum slip level value continuously for a time corresponding to the adjust engagement time value,
responsive at least in part to the adjustment determination, operate the valve to cause greater compression force to be applied by the piston to the disc pack.

26. The apparatus according to claim 24
wherein the circuit further includes a timer,
wherein the data store further includes
a maximum slip level value and a maximum slip duration value,
wherein the circuit is operative to receive
an input speed signal indicative of rotational speed of the driver device, and an output speed signal indicative of rotational speed of the driven device,
wherein with the clutch engaged the circuit is operative to
determine a clutch slip level responsive to the input speed signal and the output speed signal,
operate the valve to cause the clutch to be disengaged responsive to an excess slip determination, wherein the excess slip determination is made responsive at least in part to the determined clutch slip level being at least the maximum slip level continuously for a time period corresponding to at least the maximum slip duration value.

27. The apparatus according to claim 24
wherein the clutch is operative to receive
an input speed signal indicative of rotational speed of the driver device,
an output speed signal indicative of rotational speed of the driven device,
a temperature signal indicative of clutch temperature,
an actuation fluid pressure signal indicative of actuation fluid pressure available to be applied by the valve to the piston cavity,
wherein the circuit is operative to cause the valve to disengage the clutch responsive at least in part to loss of at least one of the input speed signal, the output speed signal, the temperature signal and the actuation fluid pressure signal.

28. The apparatus according to claim 24
wherein the circuit further includes a timer,
wherein the data store further includes data corresponding to a synchronization level value and an engagement time value,
wherein the circuit is further operative to receive
an input speed signal indicative of rotational speed of the driver device,
an output speed signal indicative of rotational speed of the driven device,
a clutch engage signal, wherein the clutch engage signal corresponds to at least one input to change the clutch from being currently disengaged to being engaged,
wherein the circuit is operative to cause
engagement of the clutch by delivery of fluid pressure to the piston cavity from the valve responsive at least in part to the clutch engage signal,
a determination responsive at least in part to the input speed signal and the output speed signal that the driving device and the driven device have not achieved coordinated rotational movement at the synchronization level value within a time period corresponding to the engagement time value after the delivery of the fluid pressure,
responsive at least in part to the determination, disengagement of the clutch by reducing fluid pressure delivered to the piston cavity by the valve.

29. Apparatus comprising:
a clutch, wherein the clutch is configured to selectively rotationally engage a driver device and a driven device,
wherein the clutch includes
a disc housing, wherein the disc housing is configured to be in operative rotational connection with one of the driver device and the driven device,
a hub, wherein the hub is configured to be in operative rotational connection with the other of the driver device and the driven device,
wherein the hub extends in concentric relation and radially inward of the disc housing, wherein the hub and the disc housing are relatively rotationally movable,
a disc pack, wherein the disc pack includes
at least two axially spaced clutch discs, wherein each clutch disc is in operatively engaged rotational connection with one of the disc housing or the hub, and wherein each clutch disc is relatively axially movable with respect to each of the disc housing and the hub,
at least one separator disc, wherein each separator disc is axially intermediate of an adjacent pair of clutch discs, wherein each separator disc is in operatively engaged rotational connection with the other of the disc housing or the hub, and wherein each separator disc is axially movable with respect to each of the disc housing and the hub, an annular piston, wherein the annular piston is axially movable in a piston cavity responsive to fluid pressure in the piston cavity, wherein the annular piston is in operative connection with the disc pack, a valve, wherein the valve is selectively operative
to engage the clutch by application of fluid pressure to the piston cavity, wherein application of fluid pressure is operative to axially move the piston and engagingly compress the disc pack such that the clutch discs and the at least one separator disc rotate together in engaged relation and rotationally engage the disc housing and the hub,
to disengage the clutch by release of fluid pressure from the piston cavity such that the disc pack is no longer engagingly compressed and the clutch discs and the at least one separator disc are rotatable independently and the disc housing and the hub are rotationally disengaged, a circuit,
wherein the circuit includes a timer and a data store,
wherein the data store includes data corresponding to a synchronization level value and an engagement time value,
wherein the circuit is in operative connection with the valve, and is operative to receive
an input speed signal corresponding to rotational speed of the driver device,
an output speed signal corresponding to rotational speed of the driven device, and
a clutch engage signal,
wherein the circuit is operative to cause
engagement of the clutch by delivery of fluid pressure to the piston cavity from the valve responsive at least in part to the clutch engage signal,
a determination responsive at least in part to the input speed and the output speed signals, that the driving device and the driven device have not achieved coordinated rotational movement at the synchronization level value within a time period corresponding to the engagement time value after the delivery of fluid pressure,
responsive at least in part to the determination, disengagement of the clutch by reducing fluid pressure delivered to the piston cavity from the valve.

* * * * *